(12) United States Patent
Yano et al.

(10) Patent No.: US 7,512,874 B2
(45) Date of Patent: Mar. 31, 2009

(54) DOCUMENT INFORMATION MANAGEMENT SYSTEM

(75) Inventors: Takashi Yano, Tokyo (JP); Yasuhiro Tabata, Kanagawa (JP); Hisashi Ishijima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 281 days.

(21) Appl. No.: 11/011,619

(22) Filed: Dec. 15, 2004

(65) Prior Publication Data

US 2005/0114351 A1 May 26, 2005

Related U.S. Application Data

(60) Continuation of application No. 09/709,503, filed on Nov. 13, 2000, now Pat. No. 6,910,184, which is a division of application No. 09/120,032, filed on Jul. 21, 1998, now Pat. No. 6,356,923.

(30) Foreign Application Priority Data

Jul. 25, 1997  (JP)  .................................. 9-215869
Mar. 4, 1998  (JP)  ................................ 10-052522

(51) Int. Cl.
 *G06F 17/00* (2006.01)
(52) U.S. Cl. .......................................... 715/200; 707/3
(58) Field of Classification Search ................ 715/500, 715/530, 808, 810, 200, 255; 707/3
See application file for complete search history.

(56) References Cited

U.S. PATENT DOCUMENTS 4,716,404 A    12/1987  Tabata et al.
4,741,047 A    4/1988   Sharpe, II
4,748,678 A    5/1988   Takeda et al.
5,142,678 A *  8/1992   MacPhail .................... 715/500
5,327,554 A *  7/1994   Palazzi et al. ............... 725/110
5,371,851 A * 12/1994   Pieper et al. ................ 345/501
5,373,371 A   12/1994   Masui
5,410,692 A *  4/1995   Torres ........................... 707/3
5,490,217 A    2/1996   Wang et al.

(Continued)

OTHER PUBLICATIONS

Nowell et al., Visualizing Search Results: Some Alternatives to Query-Document Similarity, ACM 1996, pp. 67-75.*

(Continued)

*Primary Examiner*—Cong-Lac Huynh
(74) *Attorney, Agent, or Firm*—Oblon, Spivak, McClelland, Maier & Neustadt, P.C.

(57) ABSTRACT

The document information management system according to the present invention comprises data base with a plurality of document files previously stored therein, a medium form having a document information section with document information recorded thereon and a bar code information section with electronic information corresponding to contents of the document information converted to bar code information and stored therein, a marking unit for giving a selection mark by selecting a desired word from a medium form, a reading unit for reading a selection mark and bar code information from a medium form with the selection mark given thereto, a retrieving unit for retrieving a corresponding document file from a data base using a word with a selection mark given thereto as a key word according to the selection mark and bar code information, and an output unit for outputting the retrieved document file as related information.

15 Claims, 53 Drawing Sheets

U.S. PATENT DOCUMENTS

| | | | |
|---|---|---|---|
| 5,535,063 A | | 7/1996 | Lamming |
| 5,553,216 A | | 9/1996 | Yoshioka et al. |
| 5,627,979 A | * | 5/1997 | Chang et al. ............. 715/763 |
| 5,640,193 A | | 6/1997 | Wellner |
| 5,642,502 A | | 6/1997 | Driscoll |
| 5,732,398 A | | 3/1998 | Tagawa |
| 5,748,805 A | | 5/1998 | Withgott et al. |
| 5,760,382 A | | 6/1998 | Li et al. |
| 5,768,581 A | * | 6/1998 | Cochran ..................... 707/5 |
| 5,781,176 A | | 7/1998 | Rey et al. |
| 5,787,448 A | * | 7/1998 | Anderson et al. ....... 715/501.1 |
| 5,794,236 A | | 8/1998 | Mehrle |
| 5,805,740 A | | 9/1998 | Takagi et al. |
| 5,812,123 A | | 9/1998 | Rowe et al. |
| 5,848,413 A | | 12/1998 | Wolff |
| 5,873,735 A | | 2/1999 | Yamada et al. |
| 5,877,757 A | * | 3/1999 | Baldwin et al. ............. 715/705 |
| 5,895,470 A | | 4/1999 | Pirolli et al. |
| 5,933,841 A | * | 8/1999 | Schumacher et al. ..... 715/501.1 |
| 5,937,163 A | | 8/1999 | Lee et al. |
| 5,948,040 A | | 9/1999 | DeLorme et al. |
| 5,963,965 A | | 10/1999 | Vogel |
| 5,974,202 A | | 10/1999 | Wang et al. |
| 6,012,073 A | | 1/2000 | Arend et al. |
| 6,014,668 A | | 1/2000 | Tabata et al. |
| 6,035,308 A | | 3/2000 | Yano et al. |
| 6,041,335 A | | 3/2000 | Merritt et al. |
| 6,047,093 A | | 4/2000 | Lopresti et al. |
| 6,070,167 A | | 5/2000 | Qian et al. |
| 6,081,261 A | | 6/2000 | Wolff et al. |
| 6,081,817 A | | 6/2000 | Taguchi |
| 6,094,647 A | * | 7/2000 | Kato et al. ..................... 707/2 |
| 6,094,649 A | * | 7/2000 | Bowen et al. ................. 707/3 |
| 6,134,338 A | | 10/2000 | Solberg et al. |
| 6,154,214 A | * | 11/2000 | Uyehara et al. ............. 715/863 |
| 6,173,295 B1 | | 1/2001 | Goetz et al. |
| 6,181,344 B1 | * | 1/2001 | Tarpenning et al. ......... 715/863 |
| 6,189,019 B1 | | 2/2001 | Blumer et al. |
| 6,219,670 B1 | * | 4/2001 | Mocek et al. ............... 707/102 |
| 6,292,806 B1 | * | 9/2001 | Sandifer .................. 707/104.1 |
| 6,304,907 B1 | | 10/2001 | Keronen et al. |
| 6,322,366 B1 | * | 11/2001 | Bergan et al. ............... 434/118 |
| 6,330,976 B1 | | 12/2001 | Dymetman et al. |
| 6,356,287 B1 | * | 3/2002 | Ruberry et al. ............. 715/864 |
| 6,363,379 B1 | * | 3/2002 | Jacobson et al. ................ 707/5 |
| 6,393,428 B1 | * | 5/2002 | Miller et al. ................ 707/102 |
| 6,401,131 B1 | | 6/2002 | Haverstock et al. |
| 6,438,545 B1 | * | 8/2002 | Beauregard et al. ............ 707/6 |
| 6,446,099 B1 | | 9/2002 | Peairs |
| 6,486,895 B1 | | 11/2002 | Robertson et al. |
| 6,522,999 B2 | | 2/2003 | Fuji |
| 6,523,022 B1 | * | 2/2003 | Hobbs ......................... 707/3 |
| 6,683,631 B2 | * | 1/2004 | Carroll ....................... 715/821 |
| 6,725,429 B1 | * | 4/2004 | Gardner et al. ............. 715/530 |
| 6,859,799 B1 | * | 2/2005 | Yuen ........................... 707/3 |
| 7,155,449 B2 | * | 12/2006 | Pingel et al. ................ 707/102 |
| 7,181,438 B1 | * | 2/2007 | Szabo .......................... 707/2 |
| 2003/0208472 A1 | * | 11/2003 | Pham .......................... 707/2 |
| 2005/0114351 A1 | * | 5/2005 | Yano et al. .................... 707/10 |

OTHER PUBLICATIONS

Capobianco et al., Looking for Convenient Alternatives to Forms for Querying Remote Databases on the Web: A New Iconic Interface for Progressive Queries, ACM 1996, pp. 119-124.*
C. Apte, et al., ACM Transactions on Information Systems, vol. 12, No. 3, pp. 233-251, "Automated Learning of Decision Rules for Text Categorization", Jul. 1994.
C. Chekuri, et al., 6th www Conference, pp. 1-11, "Web Searchy Using Automatic Classification", 1996.
T. Darnell, Health Management Technology, vol. 18, No. 2, 5 pages, "Devices as Dynamic as the People Who Use Them", Feb. 1997.
J. G. Spooner, PC Week, vol. 14, No. 42, 2 pages, "Penright Boosts OS Support", Oct. 6, 1997.
Price et al., Linking by Inking: Trailblazing in a Paper-Like Hypertext, ACM 1998, pp. 30-39.
Rhee et al., Intelligent Document Assistant Processor for Pen-Based Computing Systems, IEEE 1995, vol. 2 pp. 1065-1068.
Julia et al., Pattern Recognition and Beautification for a Pen Based Interface, IEEE 1995, pp. 58-63.
Chris, Hitachi Software Introduces Smartview, Compatible With Visio Product Line, PR Newswire, Feb. 13, 1995, p. 1.
Caesar et al., Preprocessing and Feature Extraction for a Handwritten Recognition System, IEEE 1993, pp. 408-411.
Shaw et al., Microsoft Office 6 in 1, Que Corporation 1994, pp. 391-393.
Foreign Patent, 9-91301, Apr. 4, 1997, Japan.

* cited by examiner

MEDIUM FORM 102

DOCUMENT INFORMATION SECTION 131

BAR CODE INFORMATION SECTION 132

LINKING
INFORMATION

| INFORMATION CONCERNING DESCRIBED POSITION | ADDRESS INFORMATION (ADDRESS OF RELATED INFORMATION FILE) |
|---|---|
| 01 | 002002 |
| 02 | 004588 |
| 03 | 003224 |
| 04 | 009896 |
| 05 | 001124 |
| . | . |
| . | . |
| 17 | 006520 |

DOCUMENT INFORMATION MANAGEMENT SYSTEM

CROSS REFERENCE TO RELATED APPLICATIONS

The present application is a continuation of U.S. patent application Ser. No. 09/709,503, filed Nov. 13, 2000, which is now issued as U.S. Pat. No. 6,910,184 and which is a divisional of U.S. patent application Ser. No. 09/120,032, filed Jul. 21, 1998, which is now issued as U.S. Pat. No. 6,356,923 and claims priority under 35 U.S.C § 119 to Japanese Patent Application No. 9-215869 filed on Jul. 25, 1997 and to Japanese Patent Application No. 10-052522 filed on Mar. 4, 1998, the entire contents of each being Incorporated by reference.

FIELD OF THE INVENTION

The present invention relates to a document information management system with improved HCI (Human-Computer-Interaction using paper (medium form) with a document recorded thereon as a medium, and a document information management system with improved HCI enabling a document handling manner through computer operation (virtual world) like that for paper document in the actual world.

BACKGROUND OF THE INVENTION

The present applicant proposed in Japanese Patent Laid-Open Publication No. HEI 9-91301 a document information management system and a document information management method each enabling direct access to a digital world by realizing continuity and correlation between a digital world such as a computer and a paper document to incorporate a paper document into a document information management system in the digital world and also by using a paper document as a medium and further each for realizing a hypertext (paper hypertext) using a paper document.

Namely, this document information management system comprises a file unit with information relating to particular words, texts, symbols, and graphic previously stored as a related information file; a medium form with at least one described information consisting of any of a word, a text, a symbol, and graphics, linking information for linking described information to a related information file in the file unit, and selection information for selecting particular described information from the described information recorded therein; a reading unit for reading the selection information and linking information from a medium form; a retrieving unit for retrieving a corresponding related information file from the file unit according to the selection information and the linking information read by the reading unit; and an output unit for outputting the related information file retrieved by the retrieving unit, and in the document information management system, selection information and linking information are read with the reading unit from the medium form, a corresponding related information file is retrieved from a related information file stored in the file unit according to the read selection information and linking information, and the retrieved related information file is outputted to recording paper or to an output unit such as a display screen.

In other words, in this document information management system, related information (related information file) stored in a file unit is retrieved from described information recorded at an arbitrary position on a medium form and the retrieved information can be outputted.

In recent years, however, personal computers have been used in an extremely wide range, because the operating method is very simple and easy because of its object-oriented GUI (Graphic User Interface). The GUI was realized by introducing paper, a pencil, and their handling manner in the actual world into a virtual world on a display unit as metaphor. With this feature, everybody can easily manipulate a computer without preparing a program.

With the Japanese Patent Laid-Open Publication No. HEI 9-91301, however, a related information file can be retrieved and outputted by selecting one or a plurality of described information using selection information from described information recorded on a medium form, and with this feature, direct access to the digital world can be executed by using a paper document as a medium, but to access from a paper document to the digital world, it is necessary to use a paper hypertext (a medium form) with a linkage (linking information) previously prepared, and for this reason there are restrictions such as impossibility of direct access from a paper document not having been converted to a hypertext yet to the digital world or impossibility of access to the digital world using a word other than a button (described information) even in case of paper hypertext document.

Also in the conventional technology, with introduction of GUI enabling paper, a pencil, and their handling manner in the actual world into the virtual world as metaphor, operability of computers has substantially been enhanced, but there has not been a computer operating system in which a computer is directly controlled by using paper and a pencil in the actual world as a manner for controlling a computer.

Also in the conventional technology, to operate a button on a hypertext, when a button on the hypertext is specified, operation is immediately started and related information at a destination for linkage is taken out, but a plurality of related information can not be taken out in batch by specifying a plurality of buttons, and the operability and convenience are disadvantageously poor. In other words, such operations as taking out related information in batch by specifying a plurality of buttons can not be executed, and use of a hypertext has been limited to operations executable through a simple operating sequence.

SUMMARY OF THE INVENTION

It is an object of the present invention to enable direct access from a paper document not having been converted to a hypertext to the digital world for insuring enhanced convenience.

It is another object of the present invention to enable direct access to the digital world using a word or words other than a button (described information) on a paper hypertext for insuring enhanced convenience.

It is another object of the present invention to provide a document information management system in which a computer can directly be controlled by paper and a pencil used in the actual world as a manner for operating the computer.

It is another object of the present invention to provide a document information management system in which batch processing can be executed, as a way of using a hypertext, by specifying a plurality of buttons.

In the document information management system according to the present invention, only by selecting a desired word or words from a paper document (a medium form) in the actual world, giving a selection mark to each of the selected words and making the system read the marked word or words, a corresponding document (related information) can easily be retrieved by using the words as key words, so that direct access from a paper document not having been converted to a hypertext to the digital world is possible, which insures further enhanced convenience.

Also as electronic information corresponding to contents of document information is recorded on a medium form, identification (recognition) of a given selection mark can easily be executed by extracting difference between laster information in a document information section and that in the electronic information. For this reason, as a selection mark is identified by extracting difference, it is not necessary to provide any specific restrictions over a type or a color of a pen as a marker for giving a selection mark, which insures improved workability. Further, as electronic information corresponding to contents of document information can be obtained from a medium form, a word with a selection mark given thereto can easily and accurately be identified (extracted).

The document information management system according to the present invention determines whether information with a selection mark given thereto is described information or word information, and if it is determined that the information with a selection mark given thereto is described information, the system retrieves a corresponding related information file according to the selection mark as well as to linking information in bar code information, and if it is determined that the information is word information, it retrieves a corresponding document file using the information with a selection mark given thereto according to the selection mark as well as to electronic information in bar code information, so that direct access to the digital world can be made by using a word or words other than a button (described information) on a paper hypertext, which insures enhanced convenience.

In the document information management system according to the present invention, selection marks each consisting of a different marking pattern for described information and a different marking pattern for word information respectively are prepared as selection marks given to described information and those given to word information, so that retrieval using described information as a key word can be made, which insures further enhanced convenience.

In the document information management system according to the present invention, a computer can directly be controlled by using paper (medium form) and a pencil (a marker) in the actual world as a method of operating a computer, so that the operability and convenience can further be enhanced. Further as corresponding related information or a bibliographic item for the related information can be retrieved only by giving a marking command with such a device as a pen to described information (button) or word information other than the described information on a paper hypertext document and having the information with the marking command given thereto read by the system, so that the workability and convenience can further be enhanced.

As electronic information corresponding to contents of document information is recorded on a medium form, a selection mark given thereto can easily be identified (recognized) by extracting difference between laster information in a document information section and that in electronic information. Also as a marking command is extracted for extracting difference, it is not necessary to provide any specific restriction over a type of a color of a pen for giving a marking command as a marker, and a marking command can easily be given with a pen daily used.

As electronic information corresponding to contents of document information can be obtained from a medium form, so that a word with a marking command given thereto can easily and accurately be identified (extracted).

In the document information management system according to the present invention, retrieval conditions and output conditions can directly be written on a medium form by using a dialog marking command, an identification marking command, and retrieval/output condition marking command, so that more complicated retrieval conditions and output conditions can be specified.

In the document information management system according to the present invention, retrieval conditions and output conditions can be written on a retrieval sheet with a list of retrieval conditions and output conditions recorded thereon, so that retrieval conditions or output conditions can be entered with code, and for this reason the operation is easy and complicated retrieval conditions and output conditions can be specified.

In the document information management system according to the present invention, retrieval conditions and output conditions can be specified by using an operation display unit, so that more complicated retrieval conditions and output conditions can be specified. Further various types of operating environment such as drug & drop and a pop-up menu can be provided by using such a device as a marking pen or a mouse. Especially, when a marking pen is used, an operating way on a medium form and that on a display unit are integrated, so that the workability, operability, and convenience are further enhanced.

In the document information management system according to the present invention, a marking command can be given with a display unit as well as with a marking pen unit on a screen, so that batch processing can be executed by specifying a plurality of buttons as a method of using a hypertext. Also the computer can be operated like handling paper and a pencil in the actual world, so that the workability and convenience can further be enhanced.

Also as related information or a bibliographic item for related information can easily be taken out from both a hypertext document and a non-hypertext document, which insures excellent convenience. Further more complicated retrieval conditions and output conditions can easily be specified, and various types of operating environment such as a pop-up menu can be provided by using a marking pen. Also a method of handling paper (medium form) and that on a display unit are unified with a marking pen, so that the workability, operability, and convenience can are enhanced.

In the document information management system, as a marking command can be given on a screen by using a display unit and an mouse operating unit, batch processing can be executed by specifying a plurality of buttons as a method of using a hypertext. Also the computer can be operated like handling paper and a pencil in the actual world, so that the workability and convenience can further be enhanced.

Further, as related information or a bibliographic item for the related information can easily be taken out from both of a hypertext document and a non-hypertext document, so that the excellent convenience is insured. Further more complicated retrieval conditions and output conditions are easily be specified, and various types of operating environment such as a pop-up menu can be provided by using a mouse.

In the document information management system according to the present invention, a hypertext document can be used as a non-hypertext document with the simple configuration. In other words, retrieval using a key word can easily be made by using a hypertext document or a non-hypertext document.

Other objects and features of this invention will become understood from the following description with reference to the accompanying drawings.

DESCRIPTION OF THE PREFERRED EMBODIMENTS

Detailed description is made hereinafter for a document information management system according to the present invention in the order of Embodiment 1 to Embodiment 11 with reference to the related drawings.

A document information management system according to Embodiment 1 is designed to enable retrieval of only by selecting a desired word from a paper document in the real world, giving a selection mark thereto with a pen or the like and making the system read the marked word, a corresponding document (related information) by using the marked word as a key word. In other words, direct access can be made from a paper document which has not been converted to a hypertext to a digital world.

Figure 1:
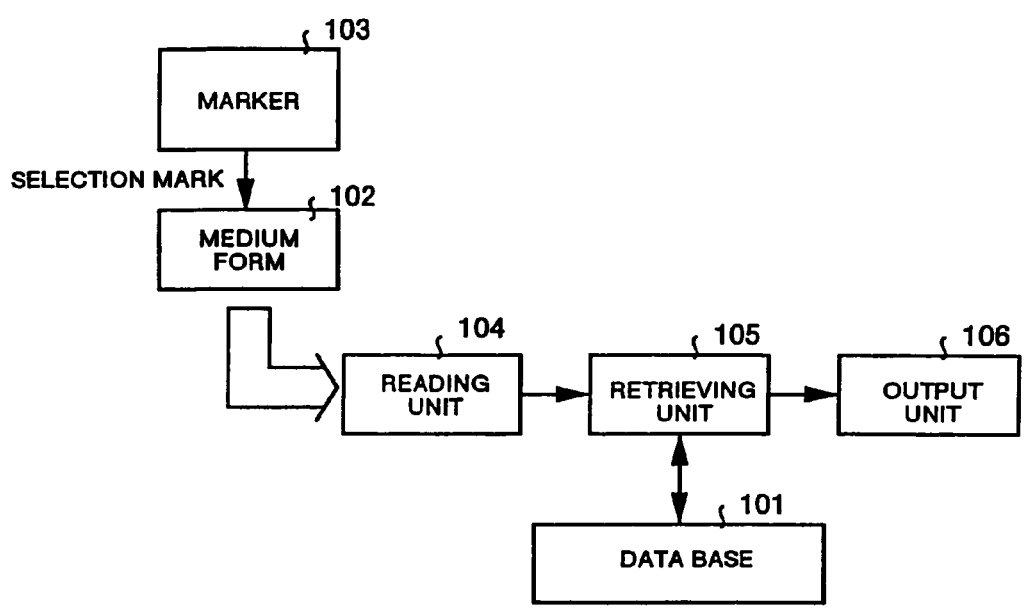
FIG. 1 is a view showing a document information management system according to Embodiment 1.

FIG. 1 is a view showing the document information management system according to Embodiment 1, and the document information management system comprises a data base 101 with a plurality of document files previously stored therein; a medium form 102 having a document information section with document information including at least a word recorded therein and a bar code information section with electronic information equivalent to contents of the document information having been converted to bar code information recorded therein; a marker 103 for selecting a desired word from the document information on the medium form 102 and giving a selection mark thereto; a reading unit 104 for reading, from the medium form 102 with selection marks having been given thereto by the marker 103, the selection marks and bar code information; a retrieving unit 105 for retrieving a corresponding document file from the data base 101 by referring to the selection marks and bar code information read with the reading unit 104 and using the words with the selection marks given respectively as key words; and an output unit 106 for outputting a document file retrieved with the retrieving unit 105 as related information. It should be noted that electronic information here indicates information described with HTML (hypertext description language). However, there are, for example, PDF and XML other than the HTML as a hypertext description language, and for this reason it is needless to say that the hypertext description language is not limited to the HTML.

Figure 2:
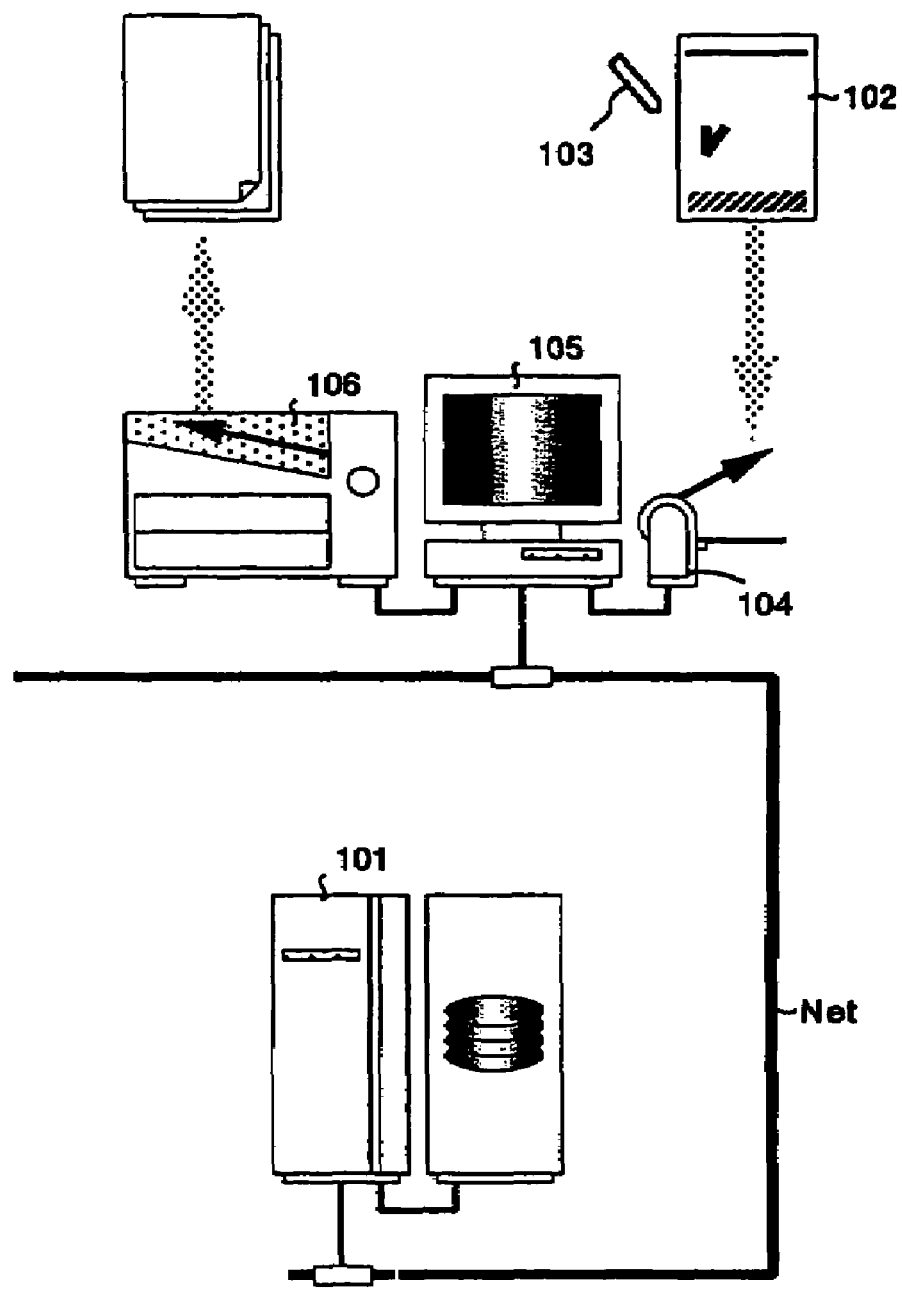
FIG. 2 is an explanatory view showing particular hardware configuration of the document information management system according to Embodiment 1.

FIG. 2 shows particular hardware configuration of the document information management system according to Embodiment 1, and in this document information management system, a file server 101 connected to a network NET such as Intranet can be used as the data base 101. This file server 101 has a large capacity hard disk unit, and document files used in the system are stored in this hard disk unit.

The medium form 102 is obtained, although details thereof are described later, by recording a document information section as well as a bar code information section on ordinary recording paper.

The marker 103 which can give a selection mark to the medium form 102 is allowable, and a pen 103 is used here. However, the marker 103 is not limited thereto, and, for instance, a selection mark may be given by adhering a dedicated seal or the like to the medium form, and a selection mark may be given by punching a hole at a position of a desired word on the medium form 102, so that it is obvious that anything capable of giving a selection mark thereto can be used as the marker 103. Namely, it is understood that various changes and modifications to the marker 103 may be made in the invention without departing from the spirit and scope thereof.

As the reading unit 104, any of existing scanners 104 can be used. A digital copier or the like may also be used as the reading unit 104.

As the retrieving unit 105, an ordinary personal computer 105 comprising a display unit, an operation input section such as a keyboard/a mouse, a storage device such as a hard disk/a floppy disk, and a basic system of the personal computer (control unit) can be used. It should be noted that, in Embodiment 1, software such as two-dimensional bar code/decoding software and HTML source code expansion software (such as a browser for the Internet/Intranet) is incorporated in the personal computer (retrieving unit) 105.

As the output unit 106, an ordinary printer 106 can be used.

Figure 3:
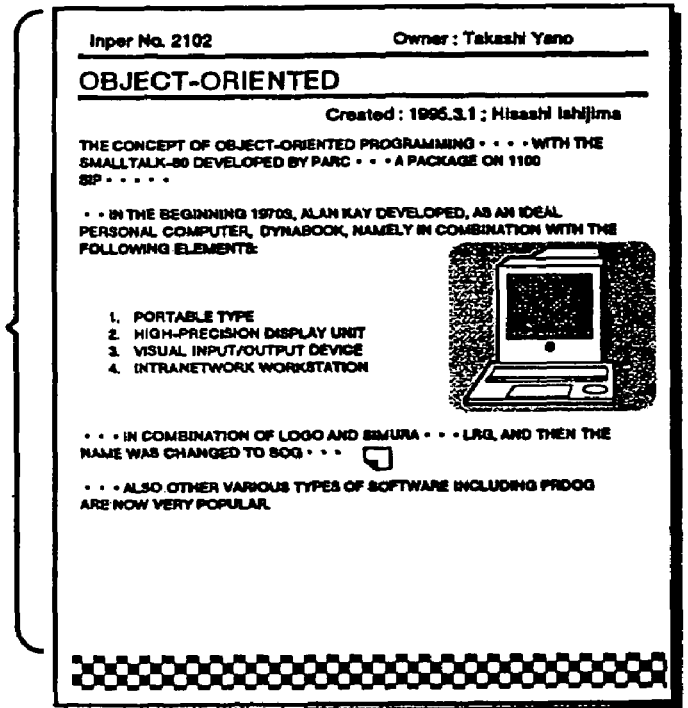
FIG. 3 is an explanatory view showing a structure of a medium form according to Embodiment 1.

Concrete description is made hereinafter for a structure of the medium form 102 according to Embodiment 1 with reference to FIG. 3. Provided on the medium form 102 are, as shown in the figure, a document information section 131 with document information including at least a word recorded therein, and a bar code information section 132 with electronic information equivalent to contents of the document information having been converted to bar code information recorded therein.

The document information recorded in the document information section 131 is ordinary information outputted to paper (recording paper) by a printer or the like, on which, as shown in the figure, sentences (text) and graphics (pictures) or the like are recorded.

The bar code information in the bar code information section 132 is used for specifying information recorded in the document information section 131. Accordingly, electronic information equivalent to contents of the document information is recorded therein as bar code information.

As clearly understood from the description above, the medium form 102 is visually the same as an ordinary document having been outputted on recording paper. Accordingly, it is needless to say that the medium form 102 can be used as an ordinary document.

Figure 4:
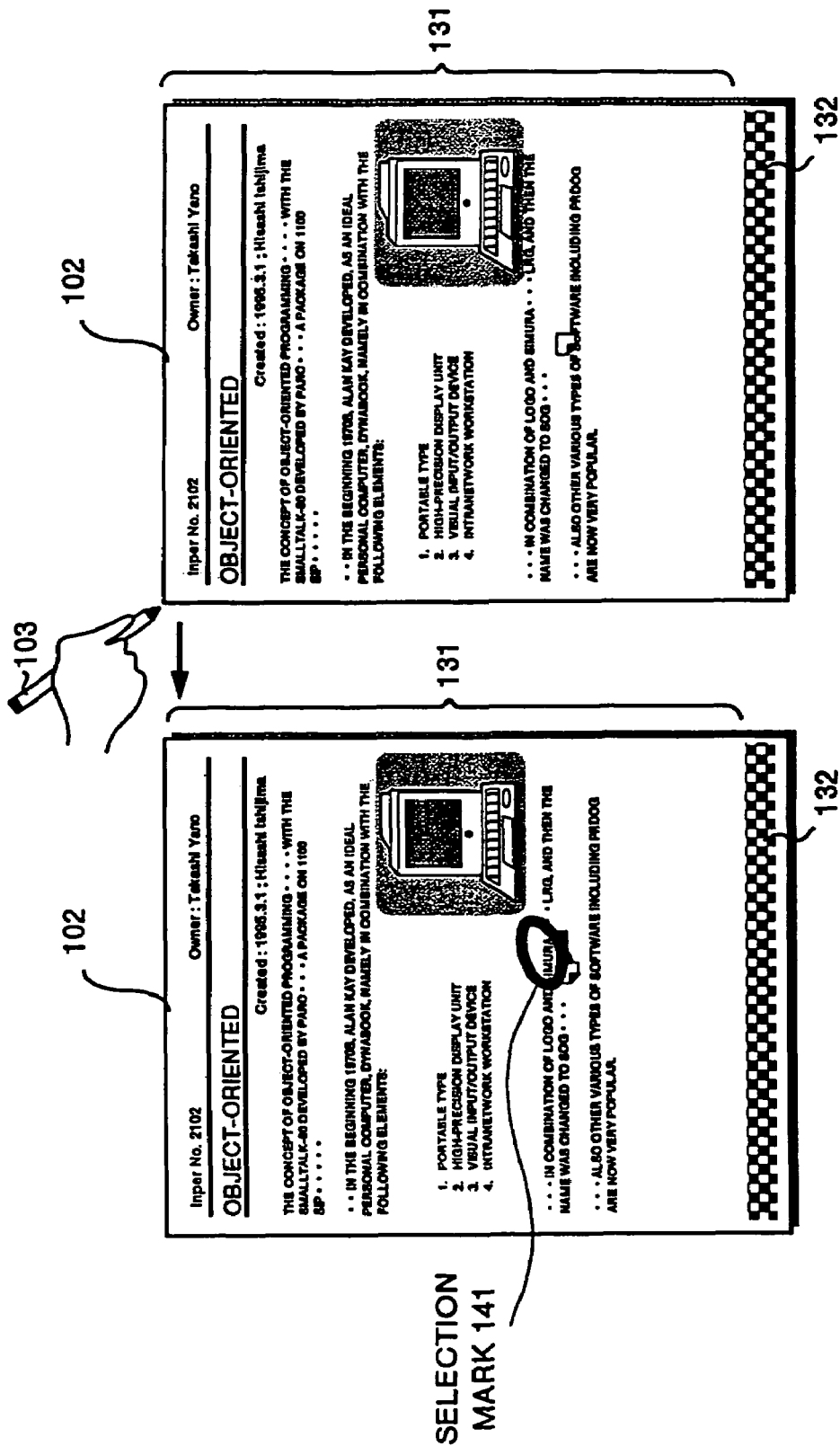
FIG. 4 is an explanatory view showing a method of selecting a word on a medium form with a pen (marker) in Embodiment 1.

FIG. 4 is an explanatory view showing a method of selecting a word on the medium form 102 with a pen (marker) 103. As shown in the figure, by giving (marking) a selection mark 141 with a pen 103 to a desired word among words recorded in the document information section 131 on the medium form 102, the word (a key word described later) is selected. For giving (marking) the selection mark 141, any tool with which a mark can be made so that the mark can optically be read by a scanner (reading unit) 104 may be used, and particular limitation is not made. However, it is obvious that marking comes in more handy if any ordinary and daily-used pen 103 can be made use of.

Figure 5:
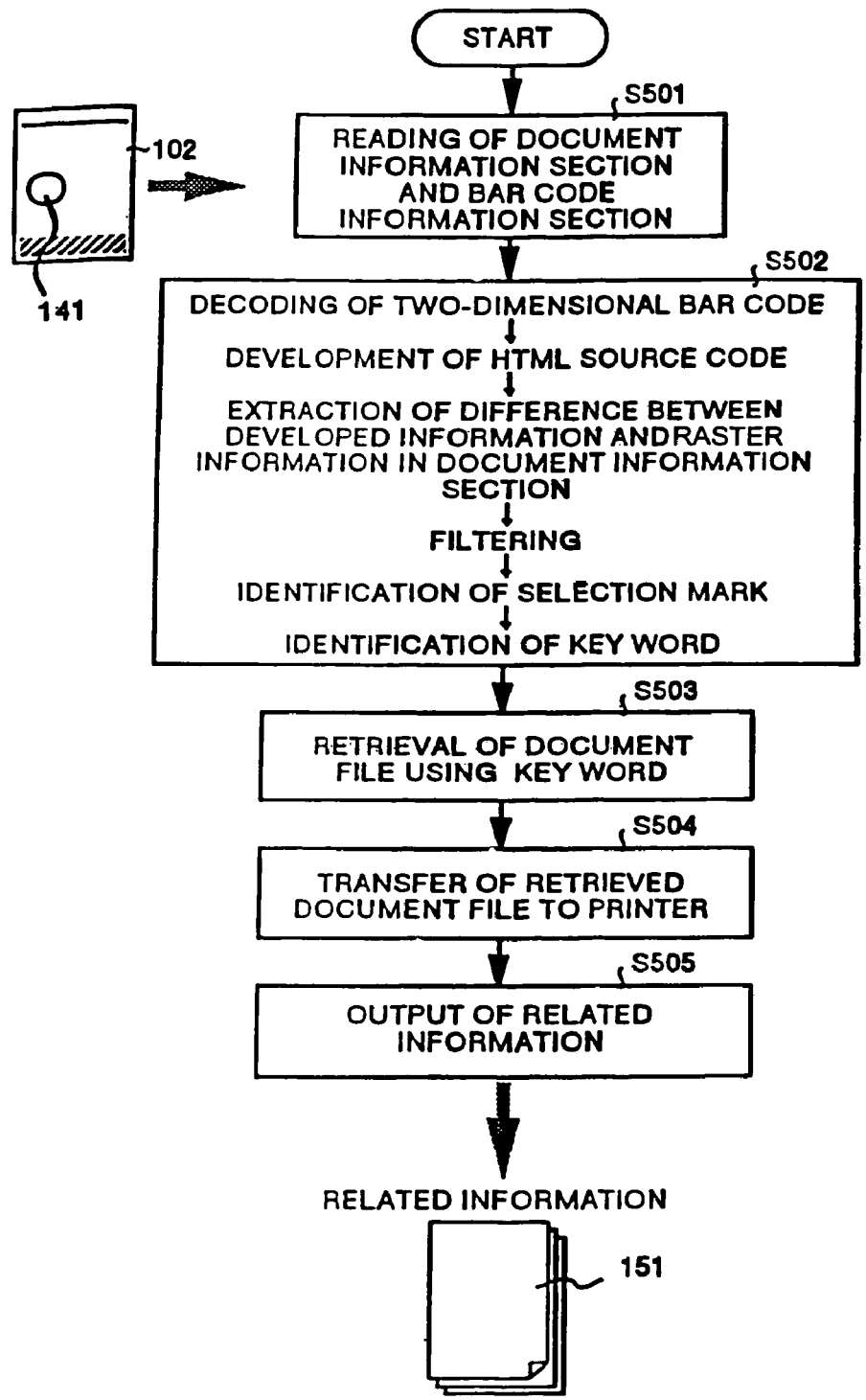
FIG. 5 is a general flow chart of processing for retrieving/outputting related information by using the medium form according to Embodiment 1.

With the above structure, concrete description is made for the operations with reference to the general flow chart of processing for retrieving/outputting related information by using the medium form 102 according to Embodiment 1 shown in FIG. 5.

At first, as shown in FIG. 4, a selection mark 141 is previously given to a desired word on the medium form 102 with a pen (marker) 103.

Then, the medium form 102 with the selection mark 141 given thereto is read by the scanner (reading unit) 104 (S501). During the processing, the scanner 104 reads the document information section 131 with the selection mark 141 given thereto as well as the bar code information section 132 from the medium form 102 as raster information (image information).

The personal computer (retrieving unit) 105 decodes, when having received image information for the document information section 131 and bar code information section 132 read by the scanner 104, two-dimensional bar code (bar code information) in the bar code information section 132 by using the two-dimensional bar code/decoding software and converts the decoded code to original HTML source code (electronic information), then, expands the decoded HTML source code to raster information with the HTML source code expansion software, extracts a difference between the expanded raster information and the raster information for the read document information section 131, obtains an image of the selection mark 141 and a noise image (slight displacement between the two raster information), further, filters and removes the noise image, and specifies the selection mark 141. Then, personal computer identifies the selected word from the coordinate values of the selection mark 141 as a key word (S502).

Then, the personal computer (retrieving unit) 105 retrieves a corresponding document file from the file server (data base) 101 by using the specified key word, and transfers the retrieved document file to the printer (output unit) 106 (S503, S504).

The printer 106 outputs the received document file to recording paper as related information 151 (S505).

As described above, with the document information management system according to Embodiment 1, only by selecting a desired word from a paper document in the real world, giving a selection mark thereto with a pen or the like, and making the system read the marked word, a corresponding document (related information) can be retrieved by using the marked word as a key word, and for this reason, direct access can be made from a paper document which has not been converted to a hypertext to a digital world, which insures further improved convenience.

In Embodiment 1, electronic information equivalent to contents of document information is recorded in the bar code information section 132 on the medium form 102 as bar code information, so that specification (identification) of a given selection mark 141 can easily be carried out by extracting a difference between raster information in the document information section 131 and raster information for electronic information read by the scanner 104 as described above. Also, as a selection mark 141 is specified by means of extraction of the difference, any restriction does not need to be provided especially to a type of a pen or color of a pen as the pen (marker) 103 for giving a selection mark 141, which allows a selection mark 141 to easily be given with any of daily-used pens.

As electronic information equivalent to contents of document information can be obtained from a medium form 102, any word with a selection mark 141 given thereto can easily and accurately be identified (extracted). On the other hand, when electronic information corresponding to document information is not stored therein, a method of fetching a corresponding word from document information read as image information with OCR processing is conceivable, but in this case, there may be some problems in precision of the OCR processing and a time required for processing, or there may be necessity of checking so that a selection mark 141 is not superimposed on a word.

In a document information management system according to Embodiment 2, direct access to a digital world can be made by using a word other than a button (described information) on a paper hypertext used in a document information management system with a conventional type of paper hypertext (the document information management system disclosed in Japanese Patent Laid-Open Publication No. HEI 9-91301), which insures further improved convenience.

Figure 6:
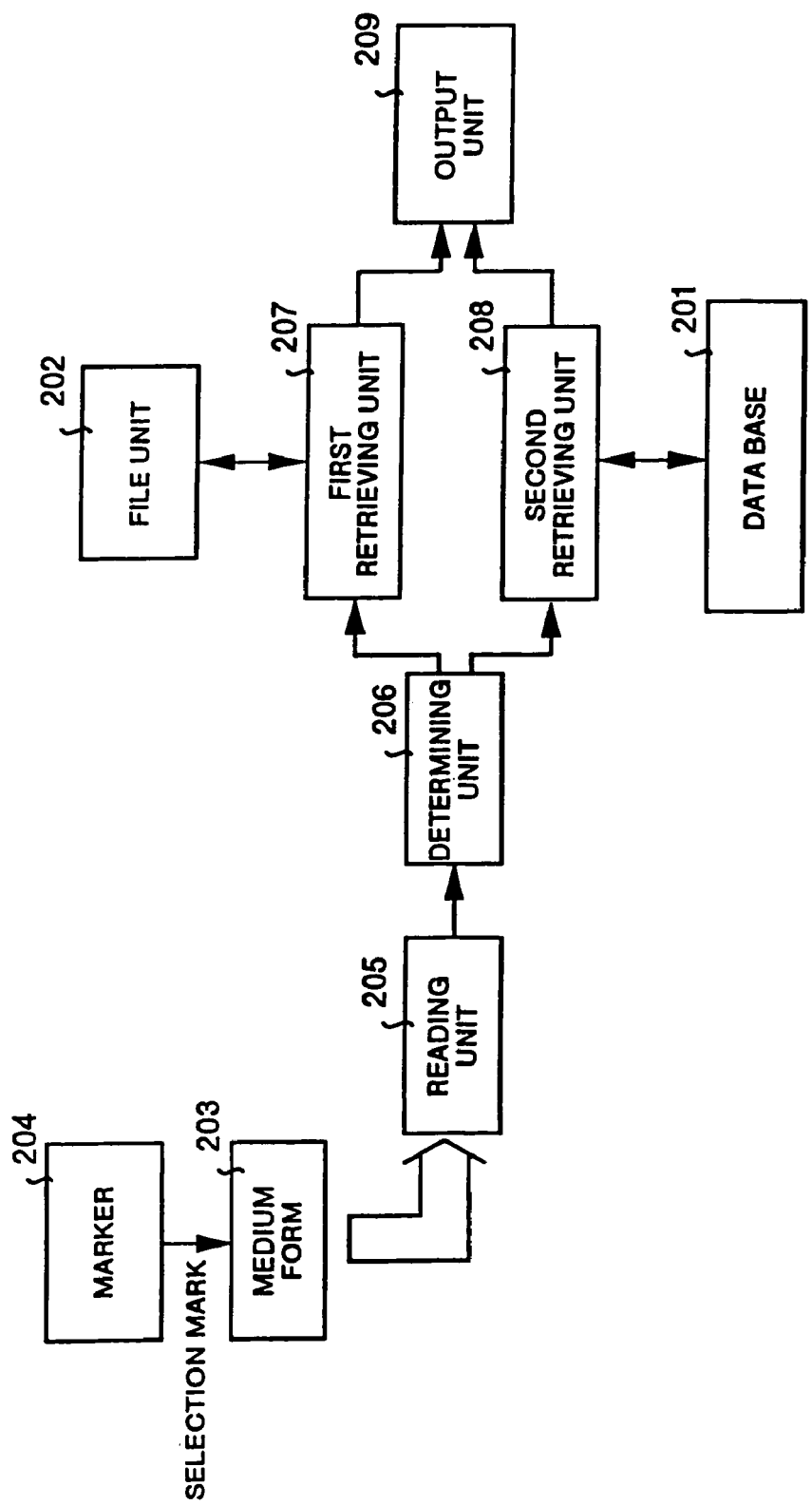
FIG. 6 is a view showing a document information management system according to Embodiment 2.

FIG. 6 is a view showing the document information management system according to Embodiment 1, and the document information management system comprises a data base 201 with a plurality of document files previously stored therein; a file unit 202 with information relating to a particular word, text, symbol, or graphics previously stored as a related information file therein; a medium form 203 having a document information section with at least described information composed of any of a word, a text, a symbol, or graphics and word information comprising words other than the described information recorded therein, and a bar code information section with linking information for linking the described information to a related information file in the file unit 202 and electronic information equivalent to contents of the document information section each converted to bar code information and recorded therein; a marker 204 for selecting desired described information and/or word information from described information and word information described on the medium form 203 and giving at least a selection mark to each described information or each word information; a reading unit 205 for reading the selection marks and bar code information from the medium form 203 with selection marks given thereto by the marker 204; a determining unit 206 for determining whether information with the selection mark is described information or word information according to the selection marks and bar code information read with the reading unit 205; a first retrieving unit 207 for retrieving, when a result of determination by the determining unit 206 indicates described information, a corresponding related information file from the file unit 202 according to the selection marks and linking information in the bar code information; a second retrieving unit 208 for retrieving, when a result of determination by the determining unit 206 indicates word information, a corresponding document file from the data base 201 using the information with a selection mark given thereto as a key word according to the selection marks and electronic information in the bar code information; and an output unit 209 for outputting the related information file and/or document file retrieved with the first retrieving unit 207 and/or second retrieving unit 208.

Figure 7:
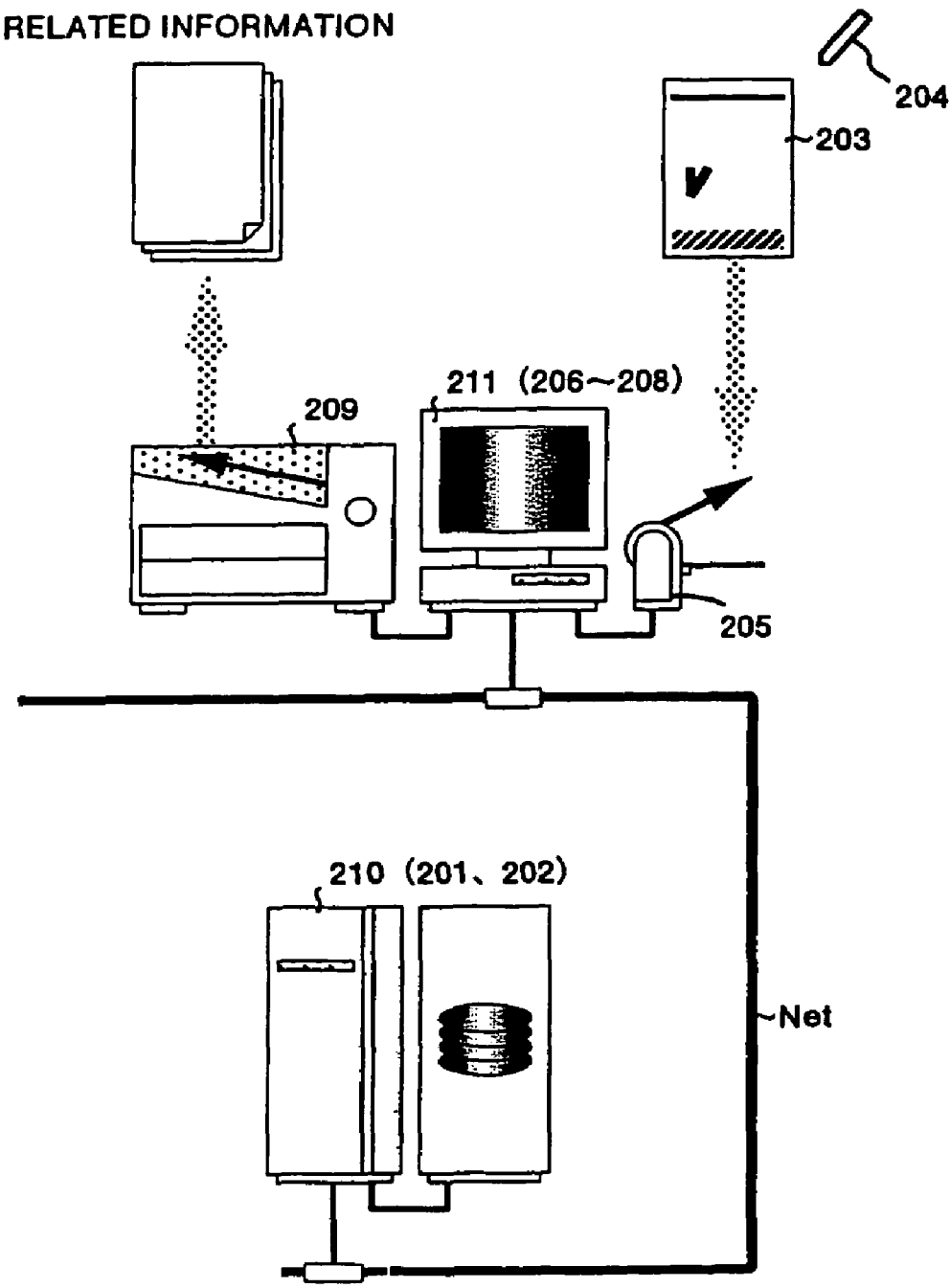
FIG. 7 is an explanatory view showing particular hardware configuration of the document information management system according to Embodiment 2.

FIG. 7 shows particular hardware configuration of the document information management system according to Embodiment 2, and in this document information management system, a file server 210 connected to a network Net such as Intranet can be used as the data base 201 and file unit 202. This file server 210 has a large capacity hard disk unit, and document files and related information files used in the system are stored in this hard disk unit.

The medium form 203 is a paper hypertext, although details thereof are described later, and has a document information section including described information equivalent to a button on the hypertext and word information other than the described information, and a bar code information section including linking information for realizing a linking function on the hypertext as well as electronic information equivalent to contents of the document information section each provided thereon.

The marker 204 which can describe a selection mark to the medium form. 203 is allowable, and a pen 204 is used here.

As the reading unit 205, any of existing scanners 205 can be used. A digital copier or the like may also be used as the reading unit 205.

As the determining unit 206, first retrieving unit 207 and second retrieving unit 208, an ordinary personal computer 211 comprising a display unit, an operation input section such as a keyboard/a mouse, a storage device such as a hard disk/a floppy disk, and a basic system of the personal computer (control unit) can be used. It should be noted that, in Embodiment 2, software such as two-dimensional bar code/decoding software and HTML source code expansion software (such as a browser for the Internet/Intranet) is incorporated in the personal computer 211.

As the output unit 209, an ordinary printer 209 can be used.

Figure 8:
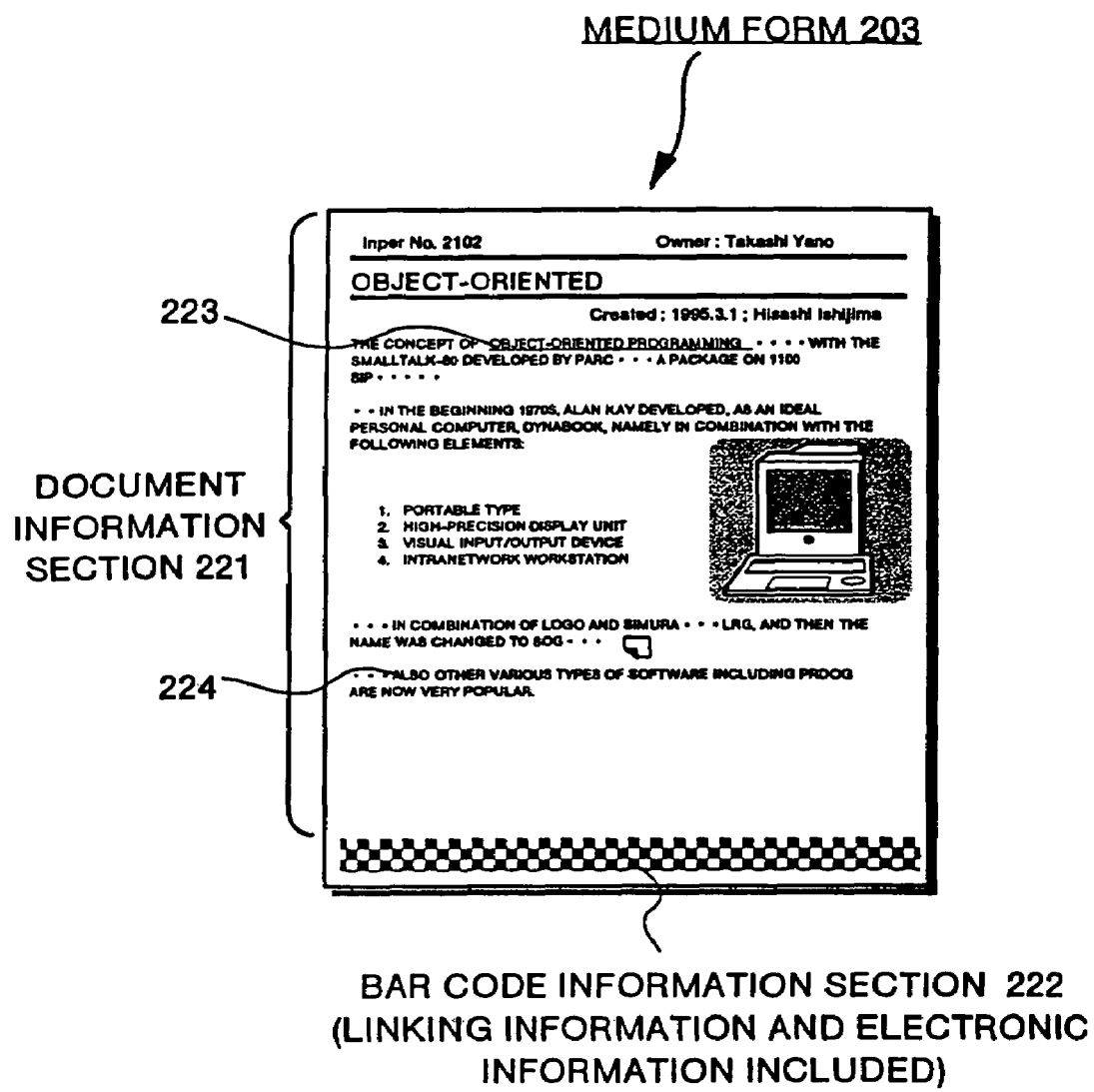
FIG. 8 is an explanatory view showing a structure of a medium form according to Embodiment 2.

Next description is made for a structure of the medium form 203 according to Embodiment 2 with reference to FIG. 8. Provided on the medium form 203 are, as shown in the figure, a document information section 221 and a bar code information section 222.

Described in the document information section 221 are at least described information (a word underlined in the figure) 223 equivalent to a button on the hypertext and word information 224 other than the described information 223. As other information to be described in the document information section 221, ordinary information outputted to paper (recording paper) by a printer or the like can be described therein, and as shown in the figure, sentences (text) and graphics (pictures) or the like are described therein.

The bar code information section 222 has linking information for realizing a linking function of the hypertext and electronic information equivalent to contents of the document information section 221. It should be noted that the electronic information in the bar code information section 222 is used for identifying information recorded in the document information section 221.

As clearly understood from the above description, the medium form 203 is visually the same as an ordinary document having been outputted on recording paper. Accordingly, it is needless to say that the medium form 203 can be used as an ordinary document.

Figures 9, 10:
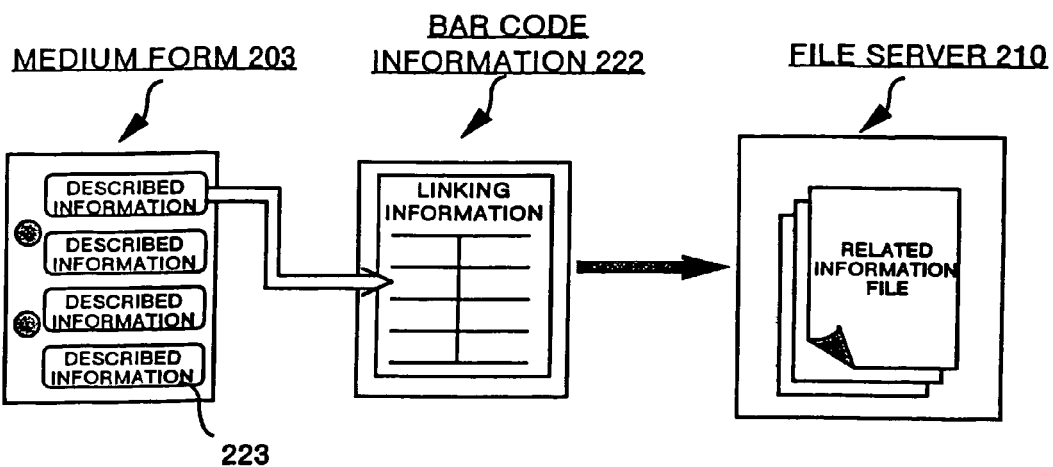
FIG. 9 is an explanatory view showing a roll of linking information according to claim 2.
FIG. 10 is an explanatory view showing an example of a structure of the linking information according to claim 2.

Brief description is made herein for linking information with reference to FIG. 9 and FIG. 10. The linking information is described as second-dimensional bar code together with electronic information in the bar code information section 222 as described above, and is information, as shown in FIG. 9, is for linking described information 223 to the related information file in the file server 210 (file unit 202).

The linking information may comprise, more specifically, described position information for each described information 223 on the medium form 203, and address information for correlating the described position information to the related information file. As described position information here, for example, an order of described information 223 to appear in a text on the medium form 203 can be used. FIG. 10 shows an example of linking information comprising those described position information and address information. As clearly shown from the linking information, if any described position information is specified, an address of a correlating related information file is identified. Namely, when particular described information 223 is selected with a selection mark or the like as shown in FIG. 9, described position information can be specified from positions of coordinates of the selection mark, and for this reason, a related information file correlating to the described position information specified with the related information can be retrieved. Accordingly, described information 223 and a related information file can be linked to each other with the linking information.

Determination is made as to whether the information with a selection mark given thereto is described information or word information according to the selection mark and bar code information read with the reading unit 205.

More specific description is made for the operation in the configuration described above with reference to FIG. 11 and FIG. 12. It should be noted that FIG. 11 shows an example of giving a selection mark to the medium form 203, and FIG. 12 shows a general flow chart of processing for retrieving/outputting related information using the medium form 203 according to Embodiment 2.

Figure 11:
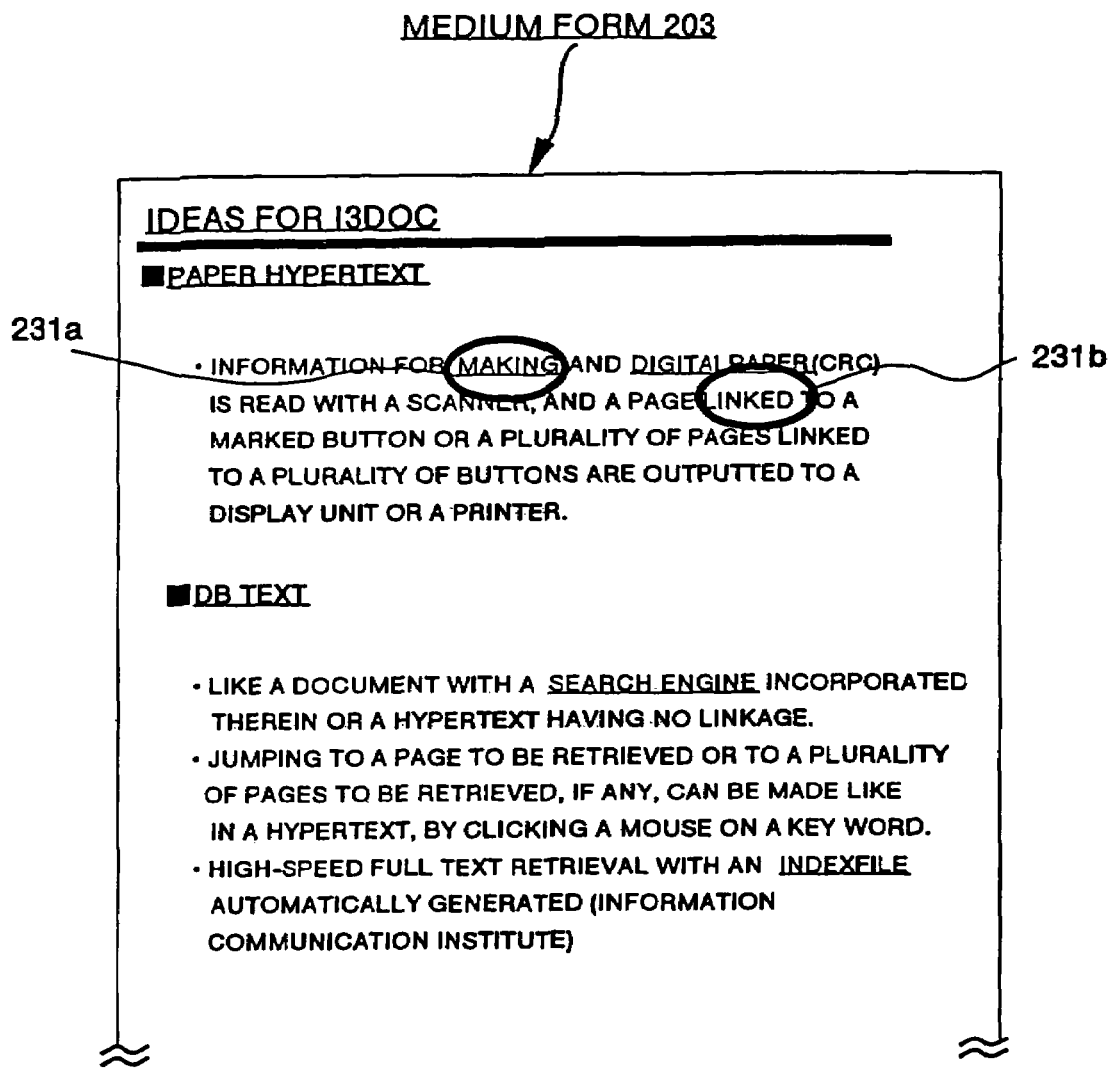
FIG. 11 is an explanatory view showing an example of giving a selection mark to the medium form according to claim 2.
Figure 12:
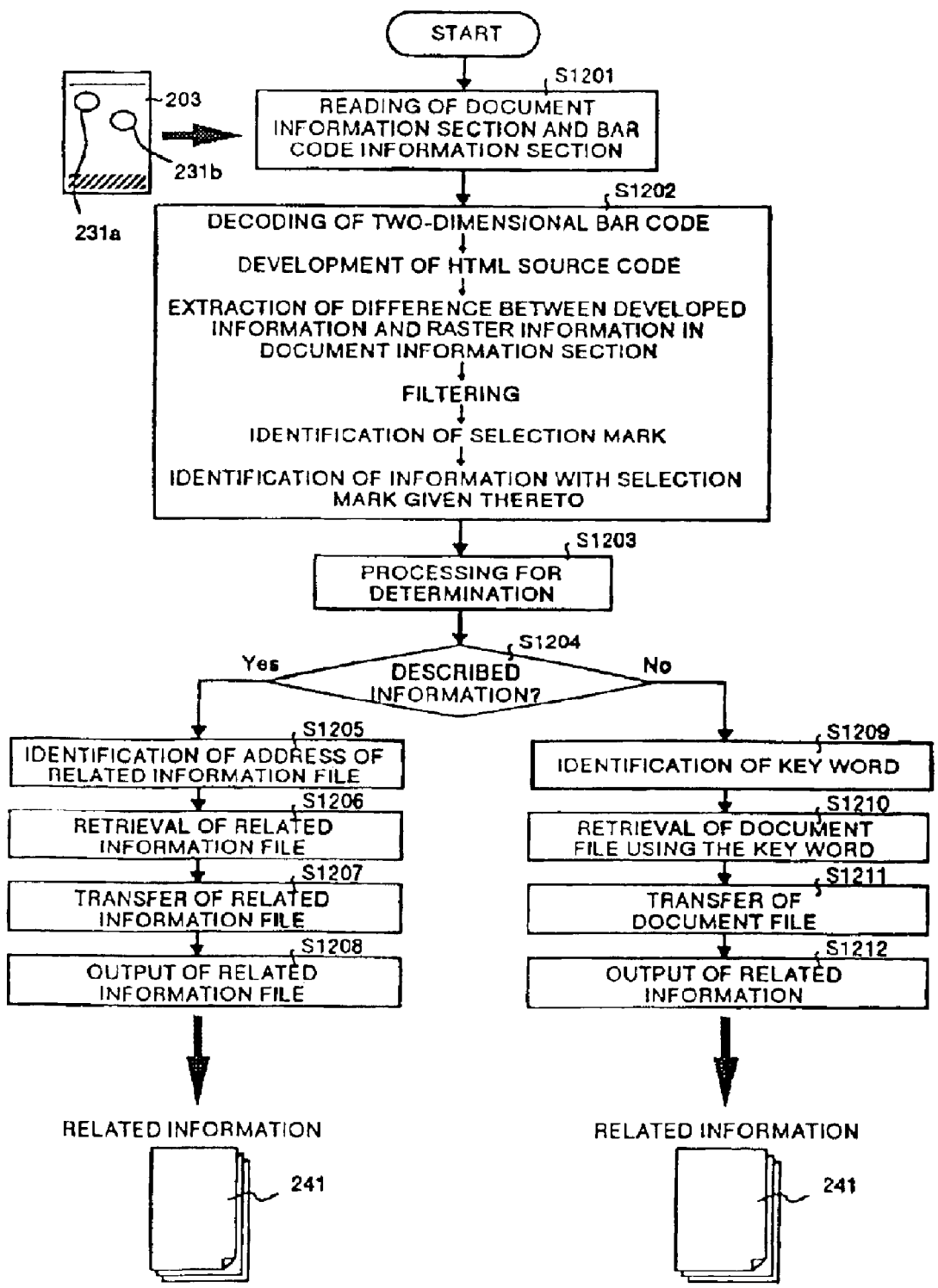
FIG. 12 is a general flow chart of processing for retrieving/outputting related information by using the medium form according to Embodiment 2.

At first, as shown in FIG. 11, described information 223 or any word related to desired information is selected from the described information 223 (words underlined in the figure) and words other than the described information 223 (corresponding to word information 224) on the medium form 203, and a selection mark 231 is given to a corresponding desired described information 223 or word with a pen (marker) 204. As selection marks here, there is shown an example of that a selection mark 231a is given to the described information 223 of "Marking" and a selection mark 231b is given to the word of "Link" which does not belong to description information 223. Namely, the figure shows that the selection marks 231 are given both to the described information and the word (word information 224) at the same time.

Then, the medium form 203 with the selection marks 231a and 231b given thereto is read by the scanner (reading unit) 205 (S1201). During the processing, the scanner 205 reads the document information section 221 with the selection marks 231a and 231b given thereto as well as the bar code information section 222 from the medium form 203 as raster information (image information).

The personal computer (determining unit 206) 211 decodes, when having received image information for the document information section 221 and bar code information section 222 read by the scanner 205, two-dimensional bar code (bar code information) in the bar code information section 222 by using the two-dimensional bar code/decoding software and converts the decoded code to original HTML source code (electronic information), then, expands the decoded HTML source code to raster information with the HTML source code expansion software, extracts a difference between the expanded raster information and the raster information for the read document information section 221, obtains images of the selection marks 231a, 231b and noise images (each slight displacement between the two raster information), further, filters and removes the noise images, and specifies the selection marks 231a and 231b. Then, personal computer identifies the information (described information and word information) with the selection marks from the coordinate values of the selection marks 231a and 231b respectively (S1202).

Then, the personal computer (determining unit 206) 211 performs processing for determination, and determines whether the information with a selection mark given thereto is described information or word information (S1203). This processing for determination is performed, for instance, by referring to linking information and depending on whether there is any described position information corresponding to the information with a selection mark given thereto in the linking information or not, in which it is determined, if the described position information exists therein, that the information is described information, and it is determined that the information is word information if the described position information does not exist therein.

Then, determination is made as to whether the information is described information or not according to a result of the determination in step S1203 (S1204), and if it is determined that the information is described information, the personal computer (first retrieving unit 207) 211 specifies, as shown in FIG. 9 and FIG. 10, an address of a related information file from the linking information (S1205), retrieves a corresponding related information file from the file server (file unit 202) 210, and transfers the retrieved related information file to the printer (output unit) 209 (S1206, S1207). The printer 209 outputs the received related information file to recording paper as related information 241 (S1208).

On the other hand, if it is determined in step S1204 that the information is not described information, in other word, it is word information, the personal computer (second retrieving unit 208) 211 specifies the information (word information) with a selection mark given thereto as a key word (S1209), retrieves a corresponding document file from the file server (data base) 210 by using the specified key word, and transfers the retrieved document file to the printer (output unit) 209 (S1210, S1211). The printer 209 outputs the received related information file to recording paper as related information 241 (S1212).

As described above, with the document information management system according to Embodiment 2, only by giving a selection mark to described information (button) and word information other than the described information on a paper hypertext with a pen or the like, and by making the system read the marked word, a corresponding related information can be retrieved, so that the workability and convenience can further be enhanced.

In Embodiment 2, electronic information equivalent to contents of document information is recorded in the bar code information section on the medium form as bar code information, so that specification (identification) of a given selection mark can easily be carried out by extracting a difference between raster information in the document information section and raster information for electronic information read by the scanner as described above. Also, as a selection mark is specified by means of extraction of the difference, any restriction does not need to be provided especially to a type of a pen or color of a pen as the pen (marker) for giving a selection mark, which allows a selection mark to easily be given with any of daily-used pens.

As electronic information equivalent to contents of document information can be obtained from a medium form, any word with a selection mark given thereto can easily and accurately be specified (extracted).

It should be noted that only a word is shown as described information to make description simpler in Embodiment 2, but described information is not particularly limited thereto, and it is needless to say that a text, a symbol or graphics can be used as described information similarly to that based on the conventional technology (the document information management system disclosed in Japanese Patent Laid-Open Publication No. HEI 9-91301).

A document information management system according to Embodiment 3 has the same configuration as that of the document information management system according to Embodiment 2, and in the document information management system, selection marks comprising a marking pattern for described information and a marking pattern for word information discretely specified as a selection mark given to described information and as a is selection mark given to word information respectively are prepared. It should be noted that the basic configuration and operations in Embodiment 3 are the same as those in Embodiment 2, and description is made herein only for different portions.

Figure 13:
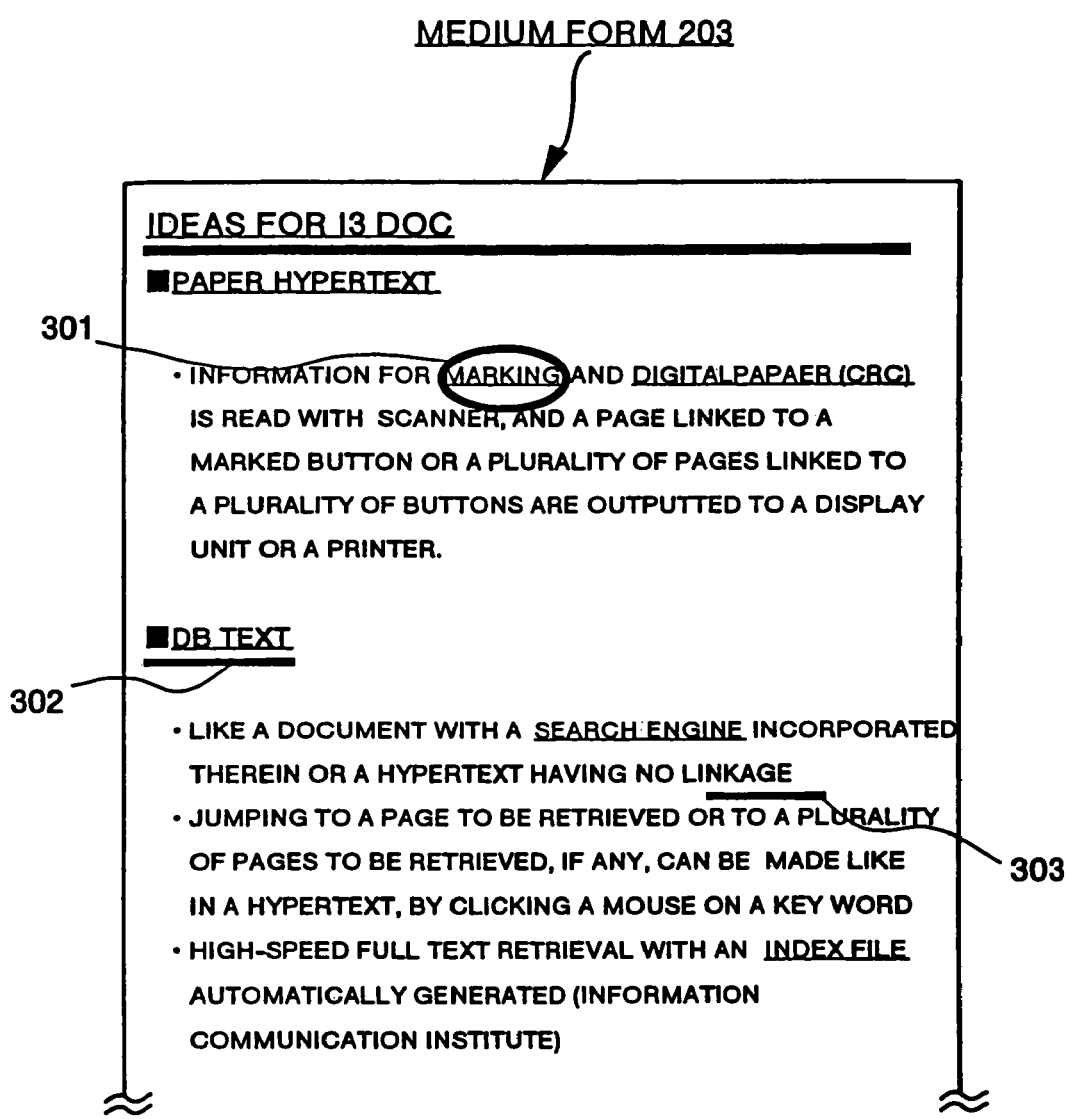
FIG. 13 is an explanatory view showing two types of marking pattern as a selection marking used in Embodiment 3.

FIG. 13 shows two types of marking pattern as a selection mark used in Embodiment 3, and there exist information specified by the marking pattern for described information (○ in the figure) as indicated by a selection mark 301 and information specified by the marking pattern for word information (a thick underline in the figure) as indicated by selection marks 302 and 303.

Although the described information is used only for fetching linked (linked by linking information) related information similarly to the button on the hypertext in Embodiment 2, by giving the marking pattern for word information (thick underline in the figure) to described information (e.g., the word of "DB text" in the figure) as indicated by the selection mark 302, the described information can be specified as word information. With this operation, retrieval (retrieval by the second retrieving unit 208) using the word "DB text" as a key word can be specified.

It should be noted that, as the marking pattern for described information, any pattern may be used if described information can be selected thereby, but as the marking pattern for word information, a pattern capable of specifying a length of a character string (namely, a length of a word) in word information is desirable.

In the configuration described above, the personal computer (determining unit 206) 211 determines, when there are selection marks 301 to 303, that the information with the selection marks each as a marking pattern for word information (selection marks 302, 303 herein) given thereto is word information, and determines, if the selection mark (selection mark 301 herein) is the marking pattern for described information, whether the information is described information or word information according to whether any linking information correlated to the information with the selection mark 301 given thereto exists in the described information or not.

Through the processing for determination as described above, when the marking pattern for described information is given to described information on the medium form 203, retrieval using linking information (retrieval by the first retrieving unit 207) is executed, and in a case other than the above case, retrieval using the selected described information or word information as a key word (retrieval by the second retrieving unit 208) is executed.

With Embodiment 3 as described above, in addition to the effect of Embodiment 2, retrieval using described information as a key word can further be performed, which insures further improved convenience.

In a document information management system according to Embodiment 4, direct access to a digital world can be made using a word other than a button (described information) on a paper hypertext in the document information management system using a conventional type of paper hypertext (the document information management system disclosed in Japanese Patent Laid-Open Publication No. HEI 9-91301), so that the convenience can further be enhanced, and a computer can directly be controlled with paper and a pencil in the actual world as a method of operating the computer.

Figure 14:
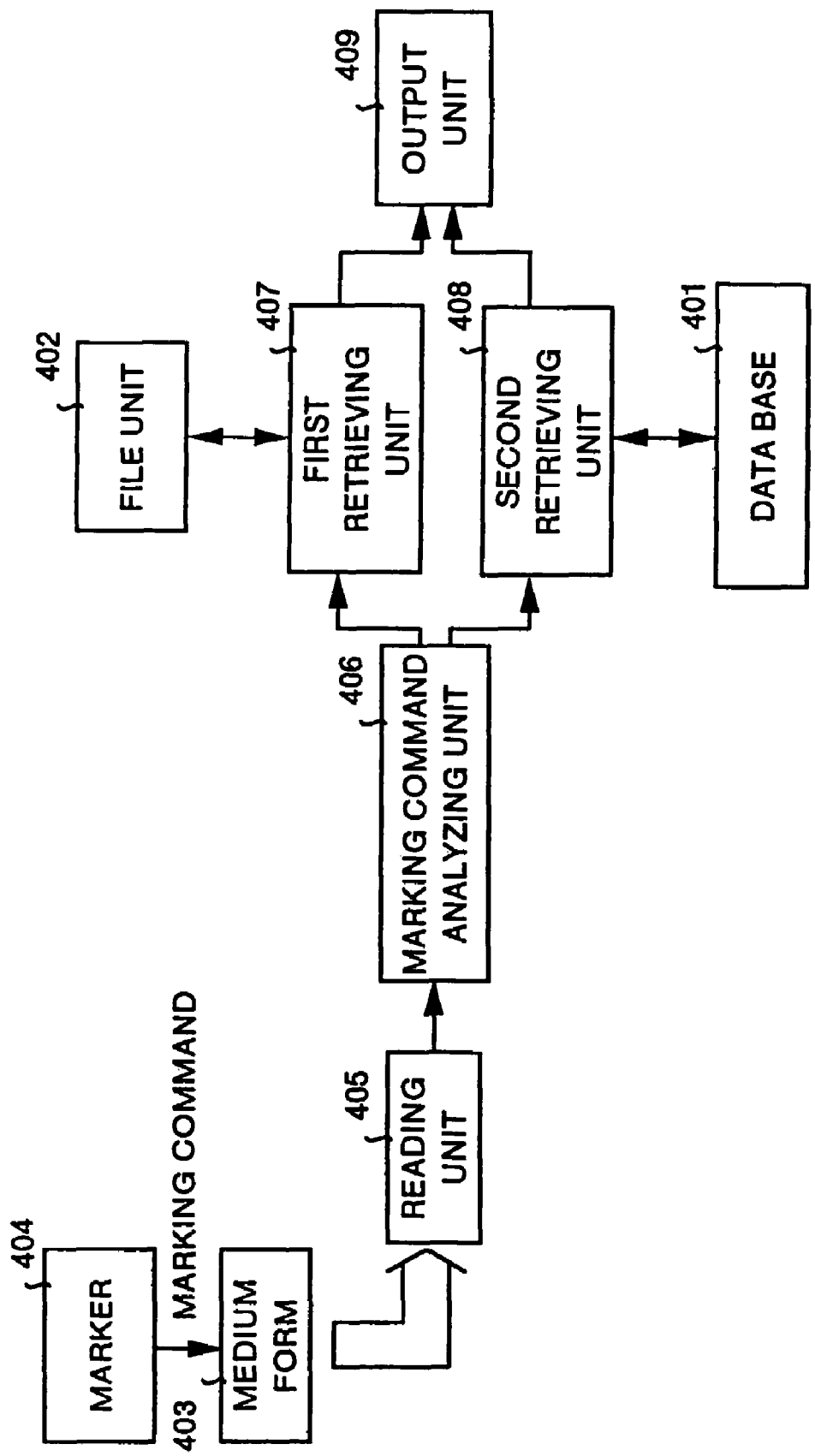
FIG. 14 is a view showing a document information management system according to Embodiment 4.

Detailed description is made below for the document information management system according to Embodiment 4 in the following order:

1) General configuration of the system
2) Types of marking command in retrieval using a linking function
3) Types of marking command in retrieval using a key word
4) Particular operations 1) General Configuration of the System FIG. 14 is a view showing the document information management system according to Embodiment 4, and the document information management system comprises a data base 401 with a plurality of document files previously stored therein; a file unit 402 with information relating to a particular word, text, symbol, or graphics previously stored as a related information file therein; a medium form 403 having a document information section with at least described information composed of any of a word, a text, a symbol, or graphics and word information comprising words other than the described information recorded therein, and a bar code information section with linking information for linking the described information to a related information file in the file unit and electronic information equivalent to contents of the document information section each converted to bar code information and recorded therein; a marker 404 for giving at least one marking command consisting of a previously specified pattern to a desired position on a medium form 403; a reading unit 405 for reading the marking command and bar code information from the medium form 403 with the marking command given thereto by the marker 404; a marking command analyzing unit 406 for analyzing, according to the marking command and bar code information read by the reading unit 405, contents of the marking command; a first retrieving unit 407 for retrieving, when a result of analysts by the marking command analyzing unit 406 indicates retrieval of described information, a related information file corresponding to the described information with the marking command given thereto from the file unit 402 according to linking information in the bar code information; a second retrieving unit 408 for retrieving, when a result of analysis by the marking command analyzing unit 406 indicates retrieval of word information, a corresponding document file from the data base 401 by using the word information with the marking command given thereto as a key word according to electronic information in the bar code information; and an output unit 409 for outputting the related information file and/or document file retrieved with the first retrieving unit 407 and/or second retrieving unit 408 as related information.

Figure 15:
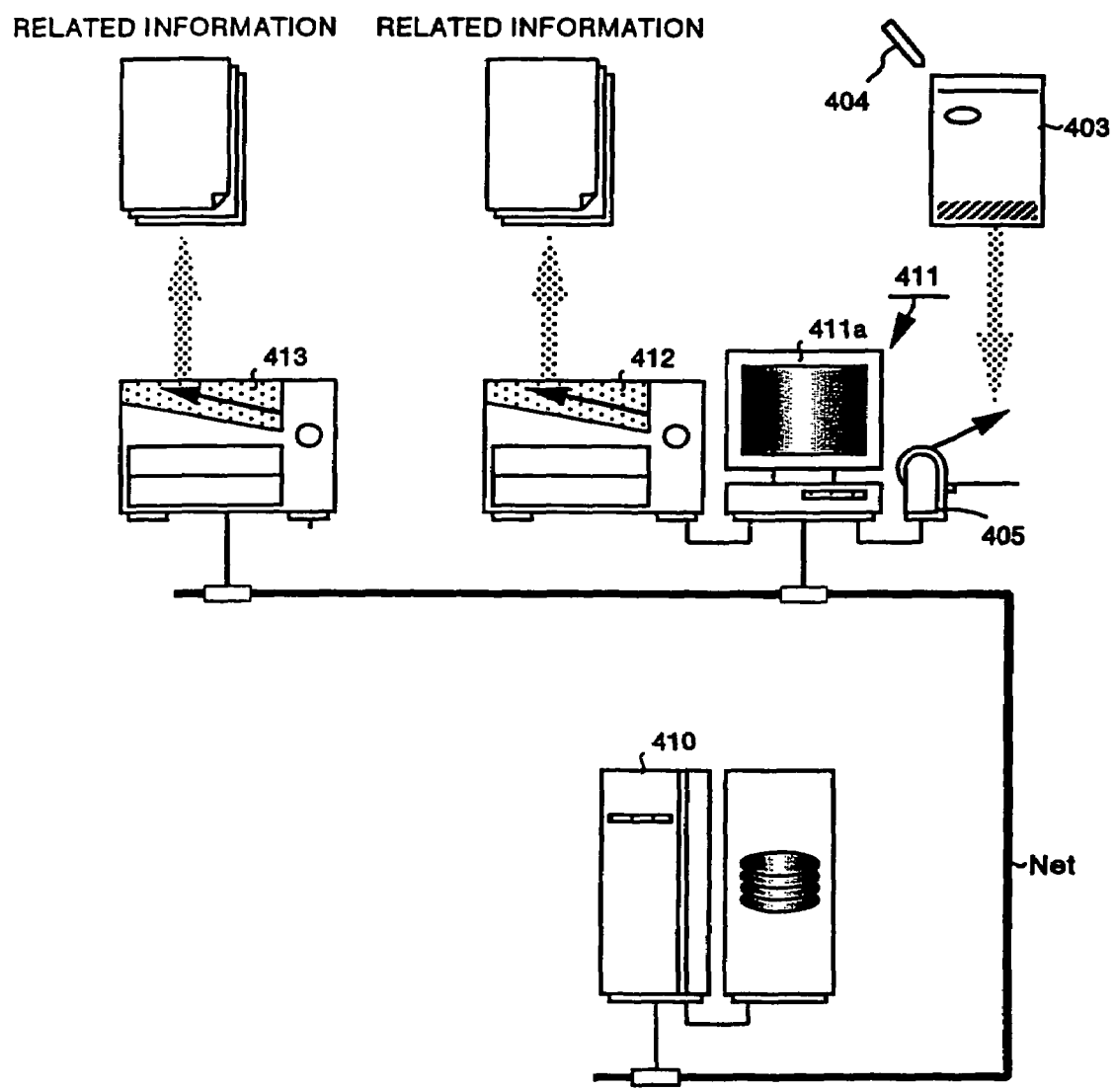
FIG. 15 is an explanatory view showing particular hardware configuration of the document information management system according to Embodiment 4.

FIG. 15 shows particular hardware configuration of the document information management system according to Embodiment 4, and in this document information management system, a file server 410 connected to a network Net such as Intranet can be used as the data base 401 and file unit 402. This file server 410 has a large capacity hard disk unit, and document files and related information files used in the system are stored in this hard disk unit.

The marker 404 which can describe a marking command to the medium form 403 is allowable, and a pen 404 is used here.

As the reading unit 405, any of existing scanners 405 can be used. A digital copier or the like may also be used as the reading unit 405.

As the marking command analyzing unit 406, first retrieving unit 407 and second retrieving unit 408, an ordinary personal computer 411 comprising a display unit, an operation input section such as a keyboard/a mouse, a storage device such as a hard disk/a floppy disk, and a basic system of the personal computer (control unit) can be used. It should be noted that, in Embodiment 4, software such as two-dimensional bar code/decoding software and HTML source code expansion software (such as a browser for the Internet/Intranet) is incorporated in the personal computer 411.

As the output unit 409, a plurality of output units are provided, and as shown in the figure, the output unit comprises a first printer 412 connected to the personal computer 411, a second printer 413 connected to a network Net, and further a display unit 411a for the personal computer 411.

It should be noted that the medium form 403 has basically the same structure as that of the medium form 203 shown in Embodiment 2, and description is made herein only for different portions. Provided on the medium form 403 according to Embodiment 4 is a specification column for specifying which of described information and word information is to be retrieved.

Figure 16:
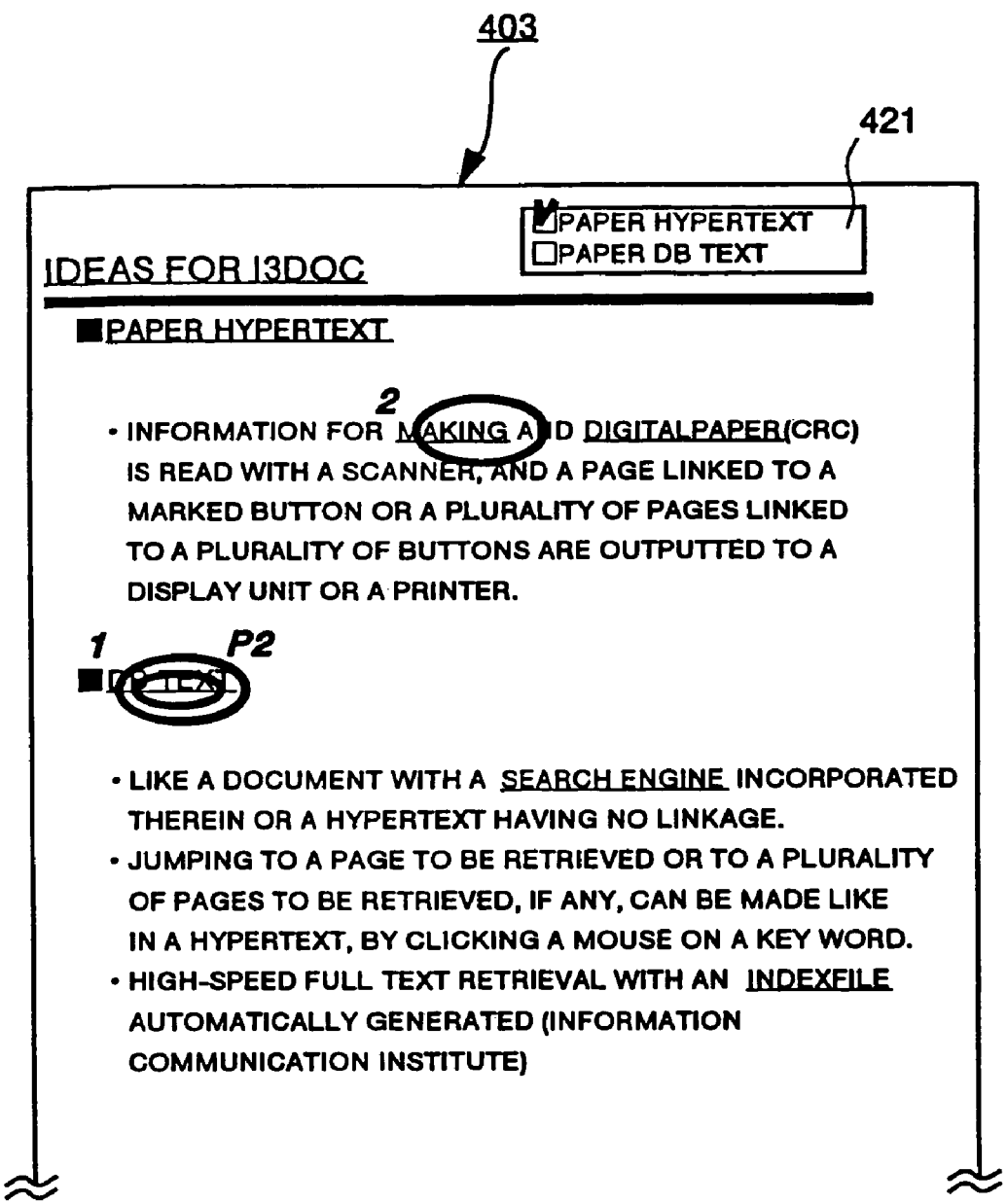
FIG. 16 is an explanatory view showing an example of using a specification column as well as a marking command on a medium form according to Embodiment 4.

More specifically, as shown in FIG. 16, for instance, a check box 421 is provided on a header portion of the medium form 403, and when described information is to be retrieved, "Paper hypertext" is checked (marking command indicated by a mark ✓ is given thereto), and "Paper DB text" is checked (marking command indicated by the mark ✓ is given thereto) when word information is to be retrieved.

Figure 17A:
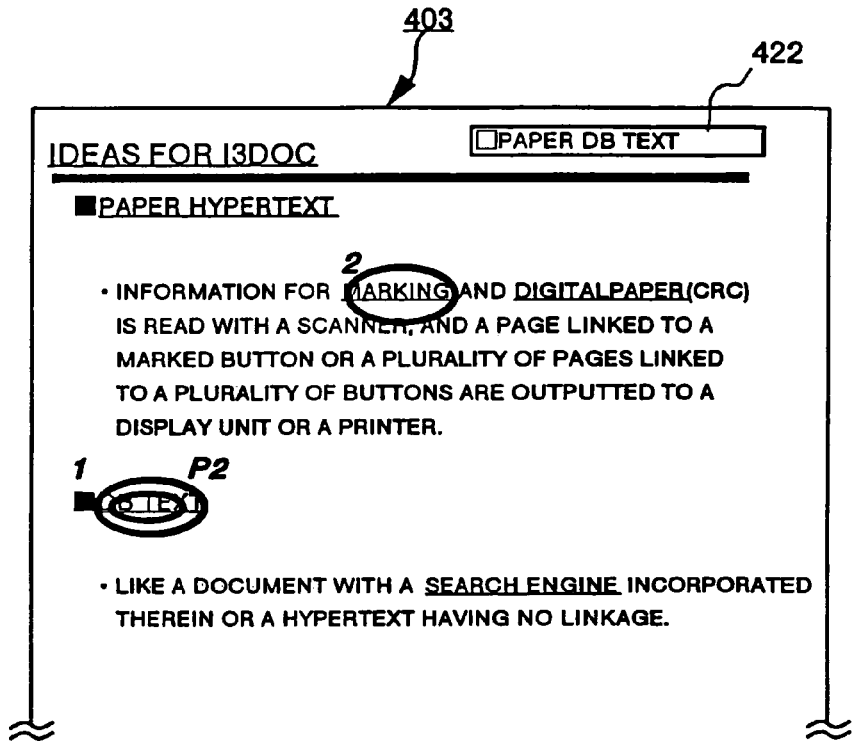
FIG. 17A and FIG. 17B are explanatory views each showing an example of using a specification column as well as a marking command on the medium form according to Embodiment 4.
Figure 17B:
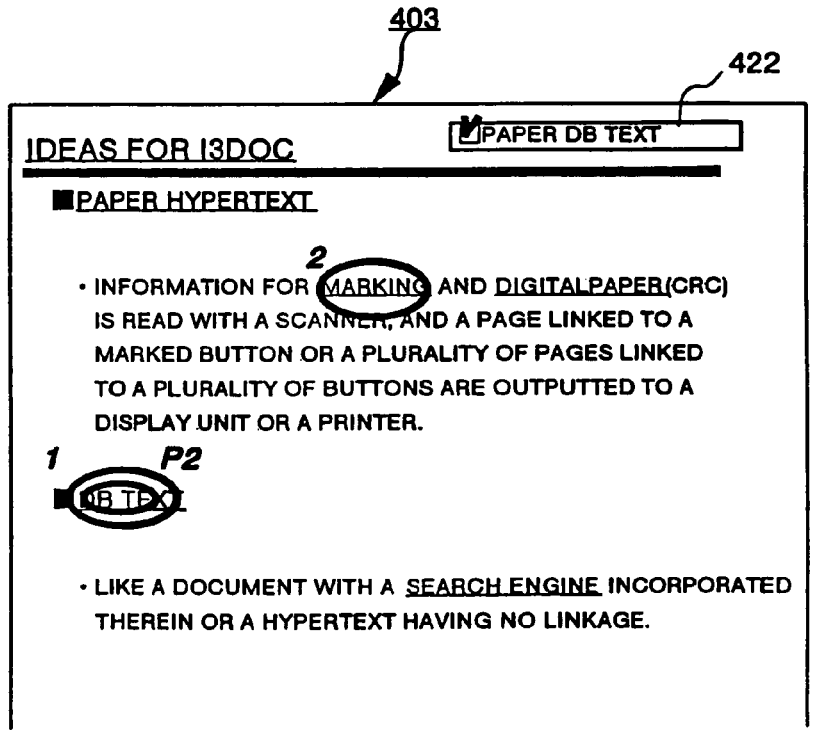

Alternatively, as other method, as shown in FIGS. 17A and 17B, the retrieval of described information is set as the default, and whether or not the retrieval of word information (option) is to be carried out may be checked as indicated by a check box 422.

Accordingly, the marking command analyzing unit 406 can analyze which of described information and word information is to be retrieved according to whether the marking command has been given to the specification column (check box 421 or 422) or not.

2) Types of Marking Command in Retrieval Using a Linking Function

Description is made herein for types of marking command usable when described information on the medium form 403 is to be retrieved (retrieval using the linking function) by using the specification column (check box 421 or 422).

A marking command comprises, as shown in Table 1, a selection marking command for selecting desired described information from described information recorded on the medium form 403, an output destination marking command for specifying an output unit as a destination for output of the selected described information, an output order marking command for specifying an output order of the selected described information, and an output condition marking command for specifying, as information for output by the output unit 409 (the first printer 412, second printer 413, or display unit 411a), which of the related information and a bibliographic item for the related information is to be outputted.

It should be noted that a bibliographic item for related information includes information such as directory information (a title, the name of creator, date of creation, classification, etc), the number of pages of related information, and abstract of related information as required.

It is assumed, in Embodiment 4, that all the marking commands excluding the selection marking command function as marking commands each under the condition of combination with the selection marking command.

TABLE 1

| Type of marking Command | Marking pattern and meaning of command |
|---|---|
| Selection marking command |  : Selection of described information |
| Output destination marking command |  : Display unit <br>  P1 : First printer <br>  P2 : Second printer |

TABLE 1-continued

| Type of marking Command | Marking pattern and meaning of command | |
|---|---|---|
| Output order marking command | 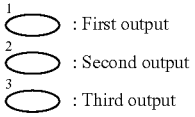 | : First output |
| | 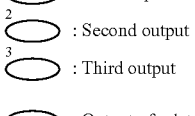 | : Second output |
| | 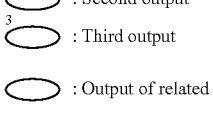 | : Third output |
| Output condition marking command | 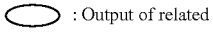 | : Output of related information |
| | 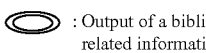 | : Output of a bibliographic item for related information |

Description is made herein for an example of using marking commands in retrieval with the linking functions shown in Table 1 with reference to FIG. 16 and FIGS. 17A and 17B. At first, as shown in FIG. 16 or FIG. 17A, it is assumed that retrieval of described information on the medium form 403 (retrieval using the linking function) is previously specified by using the specification column (check box 421 or 422).

Then, a user gives a desired marking command with a pen 404 to desired described information using any of the marking commands in Table 1. For instance, the described information "Marking" and described information "DB text" are selected as shown in FIG. 16 or FIG. 17A, and the selection marking commands are given thereto.

In this status, selection of the described information "Marking" and described information "DB text" is specified, and at the same time the display unit 411a as the default of the output destination marking command is specified and output of the related information as the default of the output condition marking command is specified.

Then, as an output order of the two described information, in order to output the described information "DB text" in the first order and output the described information "Marking" in the second order, the output order marking command is given by recording a number (order) on the left side above each of the selection marking commands thereof as shown in Table 1.

When an output unit as a destination for output is to be specified, the output destination marking command is given by recording a specification character (e.g., P1, P2) on the right side above each of the selection marking commands thereof as shown in Table 1. Herein, the described information "DB text" is specified so as to be outputted to the second printer 413 indicated by the specification character P2.

Further, when a bibliographic item for the related information is to be outputted, output of the bibliographic item is specified by drawing another circle inside the selection marking command like the output condition marking command given to the described information "DB text".

It should be noted that, although retrieval of described information on the medium form 403 (retrieval using a linking function) is not specified by using the specification column (check box 422) as shown in FIG. 17B, if the marking command for the above retrieval shown in Table 1 is used thereon, the given marking command may be processed as a corresponding marking command among types of marking command (Refer to Table 2) in retrieval using a key word described later, or the marking command itself may be invalidated.

The order to give the marking commands is not limited in particular, so that it is needless to say that giving a command or addition thereof to information at any point of time desired by a user is possible.

3) Types of Marking Command in Retrieval Using a Key Word

Description is made below for types of marking command usable when word information (retrieval using a key word) on the medium form 403 is to be retrieved by using the specification column (check box 421 or 422).

A marking command comprises, as shown in Table 2, a selection marking command for selecting desired described information from described information recorded on the medium form 403, an output destination marking command for specifying an output unit as a destination for output of the selected described information, an output order marking command for specifying an output order of the selected described information, an output condition marking command for specifying, as information for output by the output unit 409 (the first printer 412, second printer 413, or display unit 411a), which of the related information and a bibliographic item for the related information is to be outputted, and an AND retrieval marking command for specifying AND retrieval by linking a plurality of selection marking commands.

It is assumed, in Embodiment 4, that all the marking commands excluding the selection marking command function as marking commands each under the condition of combination with the selection marking command.

TABLE 2

| Type of marking command | Marking pattern and meaning of command | |
|---|---|---|
| Selection marking command |  | : Selection of described information |
| Output destination marking command |  | : Display unit |
| |  | : First printer |
| |  | : Second printer |
| Output order marking command |  | : First output |
| |  | : Second output |
| |  | : Third output |
| Output condition marking command |  | : Output of related information |
| |  | : Output of a bibliographic item for related information |
| AND retrieval marking command |  | : Two key words linked to each other with AND |
| |  | : A plurality of key words linked to each other with AND |
| |  | : OR retrieval in default (Independent processing) |

Figure 18:
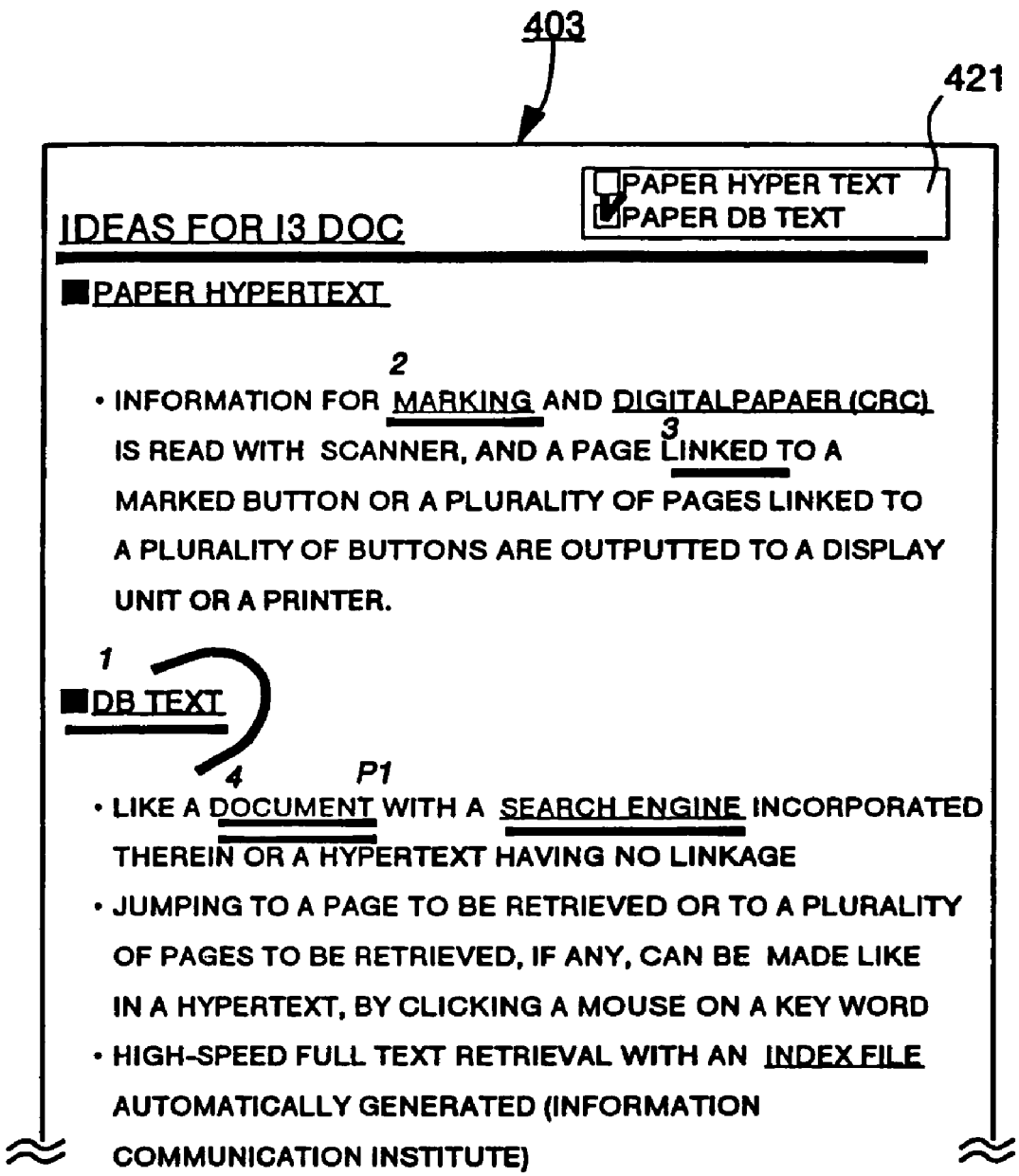
FIG. 18 is an explanatory view showing an example of using a marking command according to Embodiment 4.

Description is made herein for an example of using marking commands in retrieval using a key word shown in Table 2 with reference to FIG. 18. At first, as shown in FIG. 18, it is assumed that retrieval of word information on the medium form 403 (retrieval using a key word) is previously specified by using the specification column (check box 421).

Then, a user gives a desired marking command with a pen 404 to desired word information (or described information) using any of the marking commands in Table 2. For instance, as shown in FIG. 18, the described information "Marking", word information "Link", described information "DB text", word information "Search engine", and word information "Document" are selected, and the selection marking commands are given thereto.

In this status, selection of the described information "Marking", word information "Link", described information "DB text", word information "Search engine", and word information "Document" are specified, and at the same time the display unit 411*a* as the default of the output destination marking command is specified, and output of the related information as the default of the output condition marking command and OR retrieval (independent processing) as the default of the AND retrieval marking command are specified. It should be noted that the described information selected herein is handled as word information thereafter and on.

Then, when any combination as an object for AND retrieval exists in the word information with selection marking commands given thereto, a corresponding word information is linked to each other by using the AND retrieval marking command. For instance, when the "DB text" and "Search engine" are to be retrieved with AND, as shown in the figure, the two pieces of word information are made linked. Using of the AND retrieval marking command as described above results in that an equation of retrieval is directly written in the medium form 403.

As an output order of the 5 pieces of word information, a result of AND retrieval between "DB text" and "Search engine" is first to be outputted, a result of retrieval of "Marking" is second, a result of retrieval of "Link" is third, and a result of retrieval of "Document" is fourth, and for this reason, the output order marking command is given by recording a number (order) on the left side above each of the selection marking commands thereof as shown in Table 2.

When an output unit as a destination for output is to be specified, the output destination marking command is given by recording a specification character (e.g., P1, P2) on the right side above each of the selection marking commands thereof as shown in Table 2. Herein, the word information "Document" is specified so as to be outputted to the first printer 412 indicated by the specification character P1.

Further, when a bibliographic item for the related information is to be outputted, output of the bibliographic item is specified by drawing another underline below the selection marking command like the output condition marking command given to the word information "Document".

It should be noted that the order to give the marking commands is not limited in particular, so that it is needless to say that giving a command or addition thereof to information at any point of time desired by a user is possible.

4) Particular Operations

Figure 19:
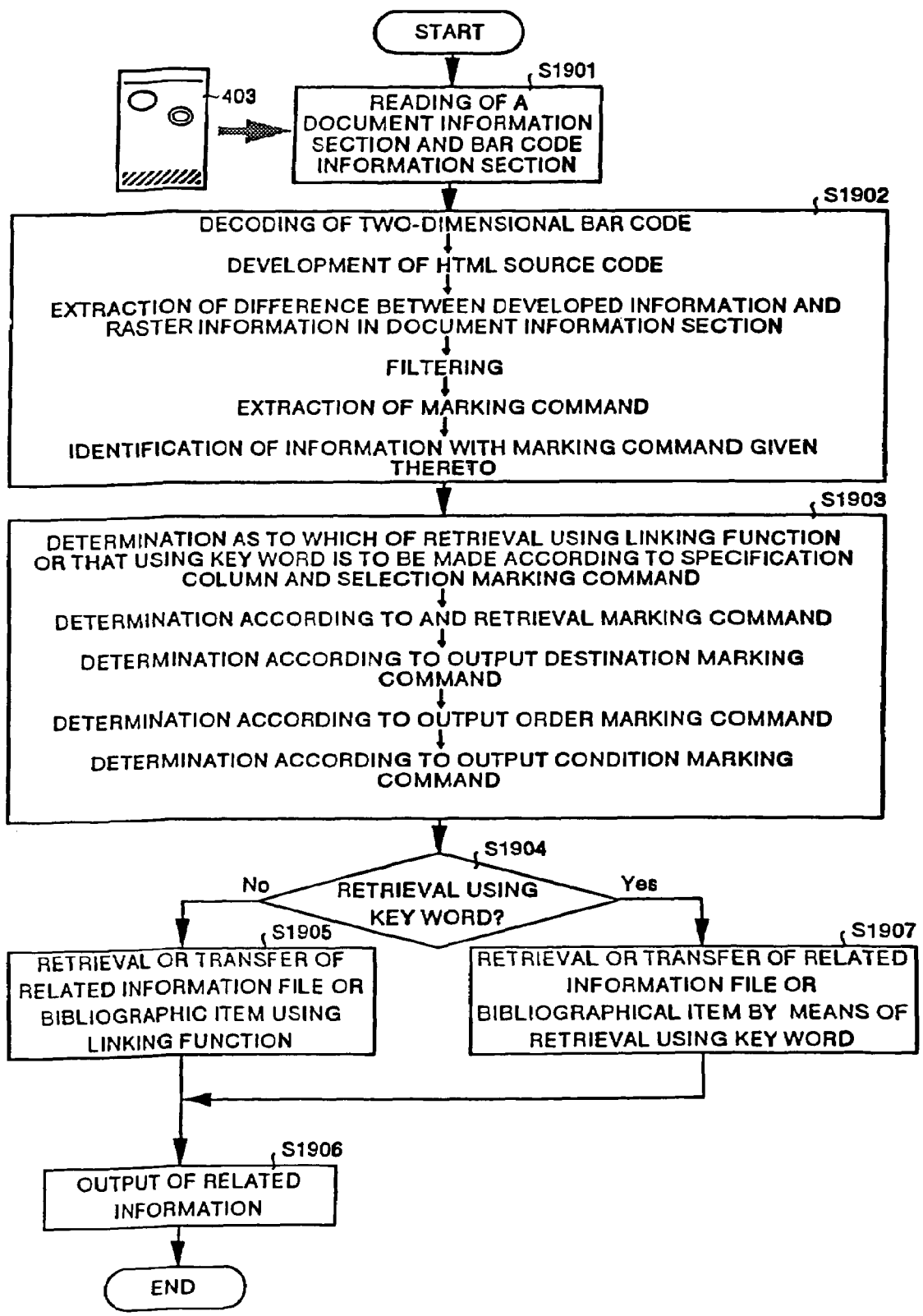
FIG. 19 is a general flow chart of retrieval/output processing by using the medium form and the marking command according to Embodiment 4.

FIG. 19 is a general flow chart of retrieval/output processing by using the medium form and the marking command according to Embodiment 4. Marking commands are previously given to the medium form 403 as shown in FIG. 16 to FIG. 18.

Then, the medium form 403 with the marking commands given thereto is read by the scanner (reading unit) 405 (S1901). During the processing, the scanner 405 reads the document information section 221 with the marking commands given thereto as well as the bar code information section 222 from the medium form 403 as raster information (image information).

The personal computer (marking command analyzing unit 406) 411 decodes, when having received image information for the document information section 221 and bar code information section 222 read by the scanner 405, two-dimensional bar code (bar code information) in the bar code information section 222 by using the two-dimensional bar code/decoding software and converts the decoded code to original HTML source code (electronic information), then, expands the decoded HTML source code to raster information with the HTML source code expansion software, extracts a difference between the expanded raster information and the raster information for the read document information section 221, obtains each image of the marking commands and each noise image (slight displacement between the two raster information), further, filters and removes the noise images, and extracts the marking commands. Then, the personal computer identifies the information with the marking commands given thereto (described information and word information) from each of the coordinate values of the marking commands respectively (S1902).

Then, the personal computer (marking command analyzing unit 406) 411 executes marking command analyzing processing (S1903). This marking command analyzing processing can be executed by using pattern matching or the like according to the types of marking command in Table 1 and Table 2.

More specifically, at first, determination is made as to which of described information (retrieval using a linking function) and word information (retrieval using a key word) is to be retrieved according to whether the marking command has been given to the specification column or not. Then, determination is made as to which of described information and word information is to be retrieved according to a form (marking pattern) of the selection marking command. It should be noted that, when a result of determination by checking this selection marking command and a result of determination by checking the specification column are not coincident with each other, it is determined as the retrieval of word information.

Then, when the AND retrieval marking command is used, it is determined that the retrieval is AND retrieval using the described information and/or word information selected with each of a plurality of selection marking commands linked with the AND retrieval marking command as a key word, and an output unit as a destination for output is specified according to the output destination marking command given around the selection marking command, an output order of the related information to be outputted in response to each of the selection marking commands is determined according to the output order marking command, and it is determined which of the related information and bibliographic items for the related information is to be outputted for each of the selection marking commands according to the output condition marking command.

Then, determination is made as to whether the retrieval is retrieval using a key word or not according to a result of analysis in step S1903 (S1904).

When it is determined that the retrieval is not retrieval using a key word, the personal computer (first retrieving unit 407) 411 identifies an address of a related information file from the linking information in the medium form 403, retrieves a corresponding related information file or bibliographic item from the file server (file unit 402) 410 according to the output order specified by the output order marking command as well as to the output condition specified by the output condition marking command, and transfers the retrieved related information file or bibliographic item to the output unit specified by the output destination marking command (S1905).

The output unit (first printer 412, second printer 413 and/or display unit 411*a*) having received the related information file outputs the received related information file or a bibliographic item as related information (S1906).

On the other hand, if it is determined in step S1904 that the retrieval is retrieval using a key word, the personal computer (second retrieving unit 408) 411 specifies the word information with the marking command given thereto as a key word, generates an equation of retrieval according to the specified key word and AND retrieval marking command, retrieves using key words a corresponding related information file (document file) from the file server (data base 401) 410 according to the output order specified by the output order marking command as well as to the output condition specified by the output condition marking command, and transfers the retrieved related information file or bibliographic item to the output unit specified by the output destination marking command (S1907), and system control shifts to step S1906.

As described above, with the document information management system according to Embodiment 4, a computer can directly be controlled by using paper (medium form 403) and a pencil (pen 404) in the actual world as a handling method of the computer, so that the operability and convenience can further be enhanced.

Also, only by giving a marking command with a pen or the like to described information (button) and word information other than the described information on a paper hypertext, and by making the system read the marked information, a corresponding related information or bibliographic item can be retrieved, which insures further improved workability and convenience.

In Embodiment 4, electronic information equivalent to contents of document information is recorded in the bar code information section on the medium form as bar code information, so that extraction of a given marking command can easily be carried out by extracting a difference between raster information for the document information section and raster information for electronic information read by the scanner as described above. Also, a marking command is extracted by extracting difference described above, so that any limitation does not need to be given in particular to a type of a pen or color of a pen as the pen (marker) for giving a marking command, which allows a marking command to easily be given with any of daily-used pens.

As electronic information equivalent to contents of document information can be obtained from a medium form, any word with a marking command given thereto can easily and accurately be identified (extracted).

Further, the types of marking command are not limited to those in Table 1 and Table 2, and for instance, a retrieval condition marking command for specifying a category of retrieval used for retrieval using a key word or key words (retrieval by the second retrieving unit 408) as a retrieval condition may be provided therein. More specifically, as a correlation table between categories of retrieval and retrieval condition marking commands, for instance, a correlation table like a category of technological report: A (A is given to the right side above the selection marking command), and a category of patent application: B (B is given to the right side above the selection marking command) is previously prepared, and a desired category is selected from the correlation table and a corresponding retrieval condition marking command is given to a medium form.

This marking command analyzing unit 406 analyzes the retrieval condition of the related information outputted in response to each of the selection marking commands according to the retrieval condition marking command, and the second retrieving unit 408 retrieves a corresponding document file from the data base 401 according to the analyzed retrieval condition (category).

As the marking commands, as shown in Table 1 and Table 2, a selection marking command (first selection marking command) for retrieving described information and a selection marking command (second selection marking command) for retrieving word information are provided each in a different pattern, and for this reason, in the medium form 403 having a specification column (check box 421) shown in FIG. 16, for instance, a case where a marking command is not given to the specification column therein is defined as a mixed mode, and as shown in Embodiment 3, retrieval using a linking function and retrieval using a key word may concurrently be executed. In this case, the marking command analyzing unit 406 analyzes which of described information and word information is to be retrieved according to whether the marking command is the first selection marking command or second selection marking command.

A document information management system according to Embodiment 5 has the same configuration as that of the document information management system according to Embodiment 4, and in the document information management system, an arbitrary area (dialog) is set on a medium form, and a mode of directly writing retrieval conditions and output conditions in the area (described as a medium form dialog mode hereinafter) is provided. It should be noted that the basic configuration and operations in Embodiment 5 are the same as those in Embodiment 4, and description is made herein only for different portions.

A marking command in Embodiment 5 includes, as shown in Table 3, a dialog marking command for setting an arbitrary area (dialog) on the medium form 403 as a command description area, an identification marking command for discretely identifying described information and/or word information with a selection making command given thereto, and a retrieval/output condition marking command for describing retrieval conditions and output conditions in the command described area set by the dialog marking command.

TABLE 3

| Type of marking command | Marking pattern and meaning of command |
|---|---|
| Selection marking command |  : Selection of described information |
| Dialog marking command |  : Set as a command description area Arbitrary closed area is made as a form like ◯ or ▢. |
| Identification marking command |  : First key word <br>  : Second key word <br>  : Third key word |
| Retrieval/output condition marking command |  <br> 1. (Retrieval → (Category) → (Output unit) condition) <br> a: Corresponding to identification marking command <br> b: Partitioning identifer ("." or "→") <br> c: Specification of a retrieval condition with a character <br> d: Specification of a category with a character <br> e: Specification of a output unit with a character |

Description is made below for an example of using marking commands shown in Table 3 with reference to FIG. 20. At first, a user gives selection marking commands with a pen 404 to desired word information. For instance, "Marking", "Link", "DB text", "Search", and "Document" are selected and selection marking commands are given thereto.

Then a command description area is set at an arbitrary place on the medium form 403 by using the dialog marking command.

Then an identification marking command for discretely identifying word information (key word) with a selection marking command given thereto is given. More specifically, an identification number (an identification character may be used) is given on the right side above each of the selection marking commands as shown in Table 3.

Figure 20:
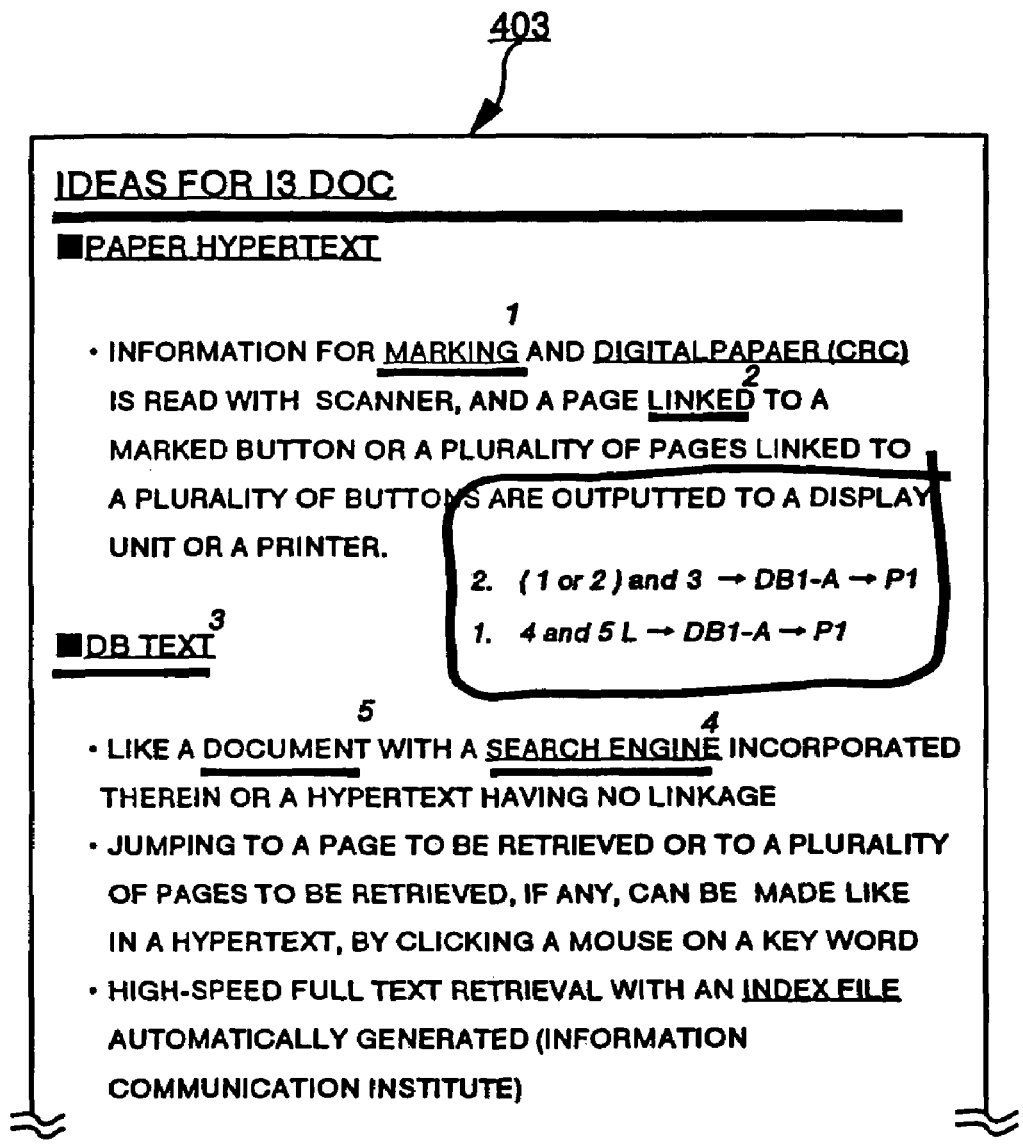
FIG. 20 is an explanatory view showing an example of using a marking command according to Embodiment 5.

In FIG. 20, the following identification numbers are given to the following commands respectively:
- "1" as an identification number to "Marking",
- "2" as an identification number to "Link",
- "3" as an identification number to "DB text",
- "4" as an identification number to "Search engine", and
- "5" as an identification number to "Document".

After the above operation, the retrieval conditions and output conditions are described in the command description area set by the dialog marking command by using the retrieval/output condition marking command.

The following conditions are described in the command description area as the retrieval conditions and output conditions in FIG. 20:

2. (1 or 2) and 3→DB1-A→P1
1. 4 and 5L→DB1-A→P1

Wherein 2 and 1 of 2. and 1. indicate an output order, L in the retrieval condition indicates specification of a bibliographic item for related information, DB1 indicates a type of data base, A indicates specification of a category, and P1 indicates specification of an output unit (first printer 412).

When the medium form 403 with the dialog marking command, identification marking command, and retrieval/output condition marking command given thereto is read by the scanner 405, the personal computer (marking command analyzing unit 406) 411 identifies a command description area according to the dialog marking command, analyzes the retrieval conditions and output conditions according to the retrieval/output condition marking command described in the command description area, and identifies described information and/or word information described in the retrieval conditions and output conditions according to the identification marking command and selection marking command.

Then, the personal computer (second retrieval unit 408) 411 retrieves, according to a result of analysis, a corresponding related information file (document file) from the file server (file unit 402) using corresponding described information and/or word information as a key word under the corresponding retrieval condition, and transfers the file to a corresponding output unit according to the output condition.

The output unit (first printer 412, second printer 413 and/or display unit 411a) having received the related information file outputs the received related information file or a bibliographic item as related information.

With Embodiment 5 as described above, in addition to the same effect as that of Embodiment 4, more complicated retrieval conditions and output conditions can further be specified.

A document information management system according to Embodiment 6 has the same configuration as that of the document information management system according to Embodiment 4, and in the document information management system, a retrieval sheet specification column for specifying output of a retrieval sheet is provided on a medium form, which provides a mode (described as a retrieval sheet mode hereinafter) to enable output of a retrieval sheet and to write retrieval conditions and output conditions in the outputted retrieval sheet for entry. It should be noted that the basic configuration and operations in Embodiment 6 are the same as those in Embodiment 4, and description is made herein only for different portions.

Figure 21:
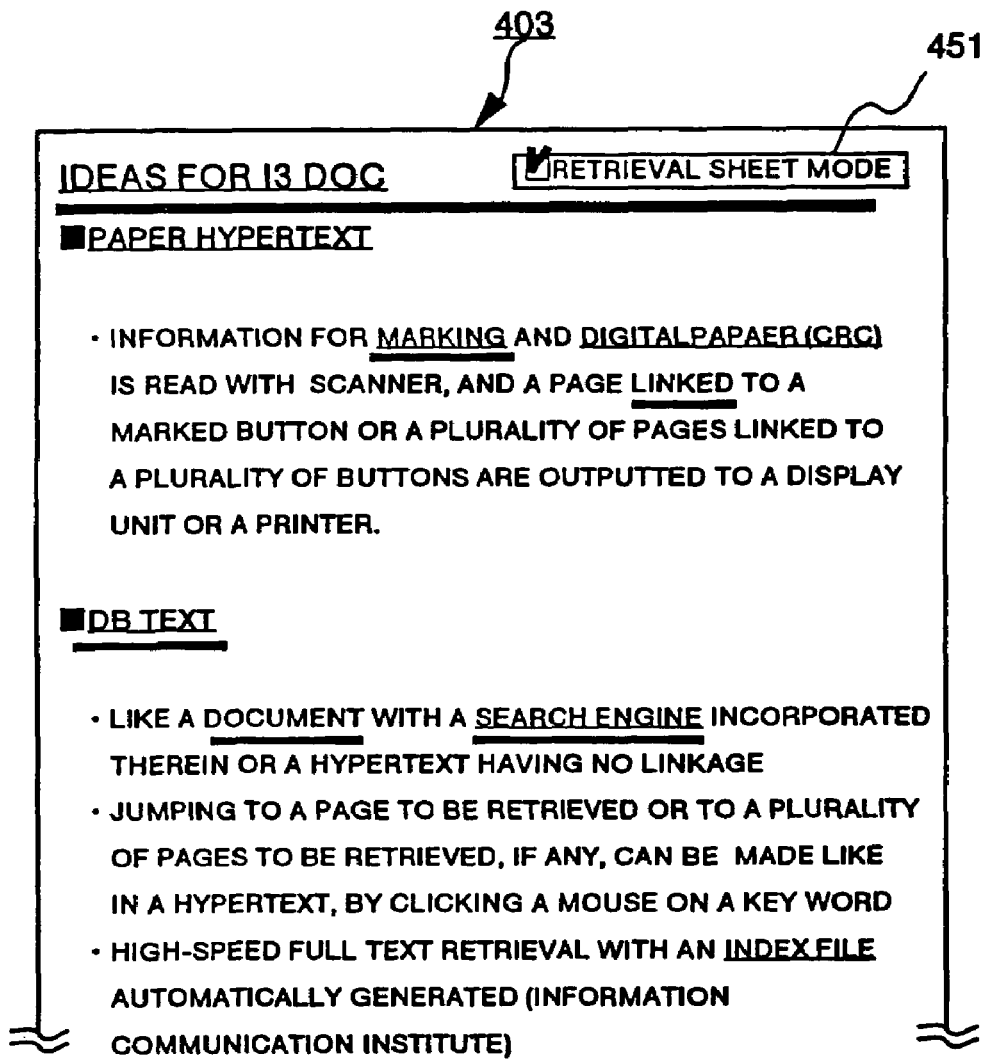
FIG. 21 is an explanatory view showing a retrieval sheet specification column according to Embodiment 6.

Provided on the medium form 403 according to Embodiment 6 is a retrieval sheet specification column (retrieval sheet mode check box) 451 for specifying output of a retrieval sheet to enter therein retrieval conditions and output conditions used for retrieval using a key word as shown in FIG. 21.

Figure 22:
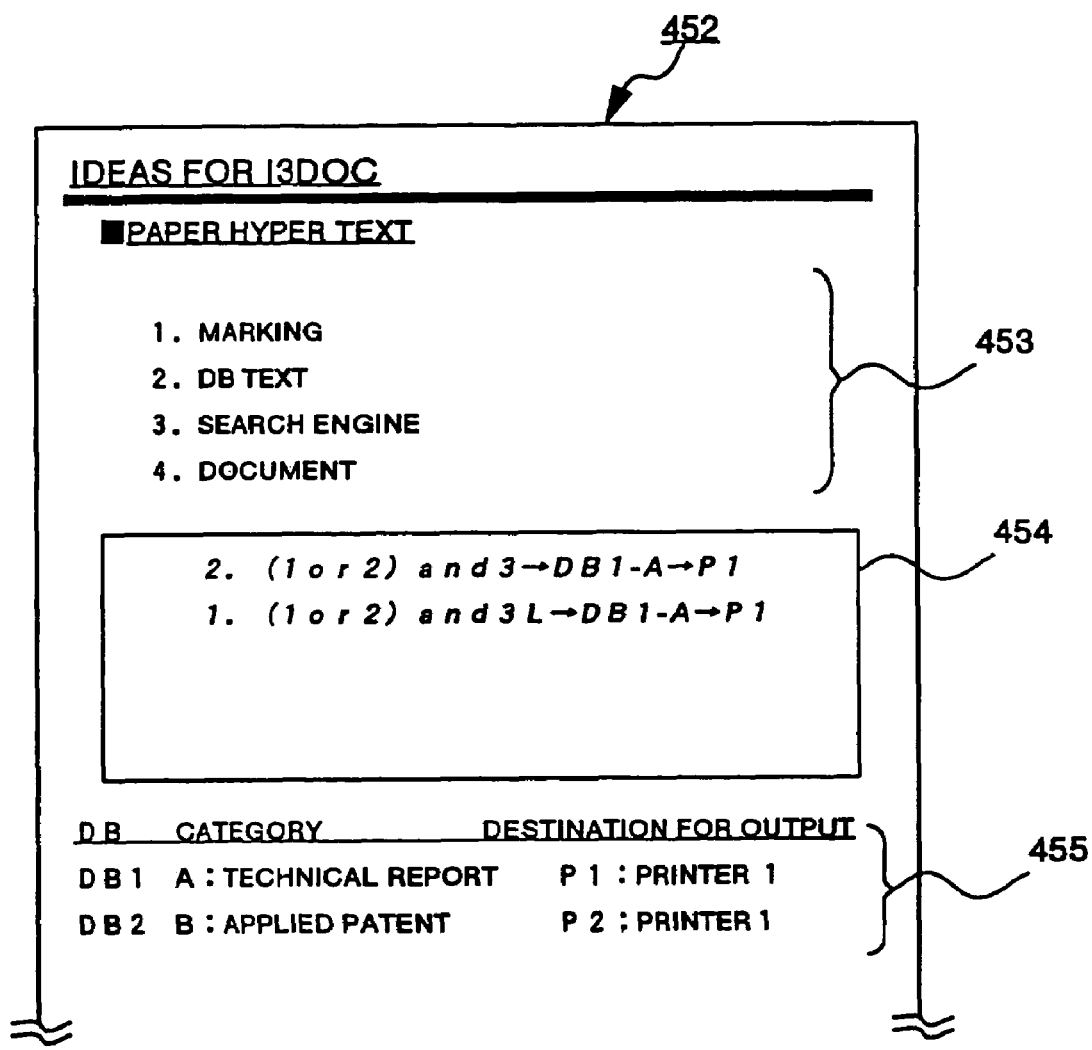
FIG. 22 is an explanatory view showing an example of retrieval sheet according to Embodiment 6.

When a marking command (a mark ✓) is written in this retrieval sheet specification column 451, word information (key word) for retrieval with a selection marking command is selected, and the selected word information is entered into the personal computer (marking command analyzing unit 406) 411 through the scanner 405, determination is made as to whether output of a retrieval sheet is specified or not according to whether the marking command has been given to the retrieval sheet specification column 451 or not, and if it is determined that specification has been made, the retrieval sheet 452 as shown in FIG. 22 is outputted through the first printer 412.

Outputted onto the retrieval sheet 452 are, as shown in the figure, a key word section 453 for automatically allocating a number to word information with a selection marking command given thereto; an entry area 454 for entering there into retrieval conditions such as an equation of retrieval, specification of a data base as an object for retrieval, and specification of a category, and output conditions such as specification of output of related information or a bibliographic item for the related information, specification of an output destination, and specification of an output order; and a list 455 with the retrieval conditions and output conditions therein.

When a user enters retrieval conditions and output conditions with the pen 404 into the entry area 454 of the retrieval sheet 452 and the conditions are read by the scanner 405, the personal computer (marking command analyzing unit 406) 411 analyzes the read retrieval conditions and output conditions, and the personal computer (second retrieving unit 408) 411 retrieves, according to a result of analysis, a corresponding related information file (document file) from the file server (file unit 402) 410 using corresponding described information and/or word information as a key word under the corresponding retrieval conditions, and transfers the file to a corresponding output unit according to the output conditions.

The output unit (first printer 412, second printer 413 and/or display unit 411a) having received the related information file outputs the received related information file or a bibliographic item as related information.

With Embodiment 6, in addition to the same effect as that of Embodiment 4, more complicated retrieval conditions and output conditions can further be specified. Also, the key word section 453 and the list 455 with retrieval conditions and output conditions therein are outputted onto the retrieval sheet, so that retrieval conditions and output conditions can be entered therein using abbreviations, which allows an easier operation.

A document information management system according to Embodiment 7 has the same configuration as that of the document information management system according to Embodiment 4, and further comprises an operating display unit enabling display thereon and operations of various information, and in the document information management system, a retrieval dialog specification column for specifying retrieval conditions and output conditions by using the operating display unit is provided on a medium form, which provides a mode (described as a display dialog mode hereinafter) to enter retrieval conditions and output conditions therein through the operating display unit. It should be noted that the basic configuration and operations in Embodiment 7 are the same as those in Embodiment 4, and description is made herein only for different portions.

Figure 23:
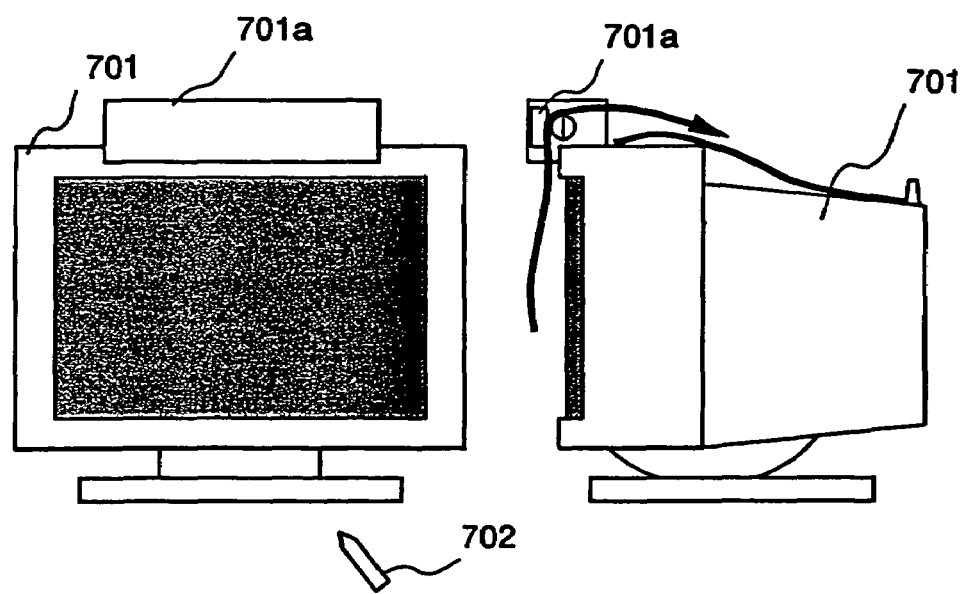
FIG. 23 is an explanatory view showing an operating display unit according to Embodiment 7.
Figure 24:
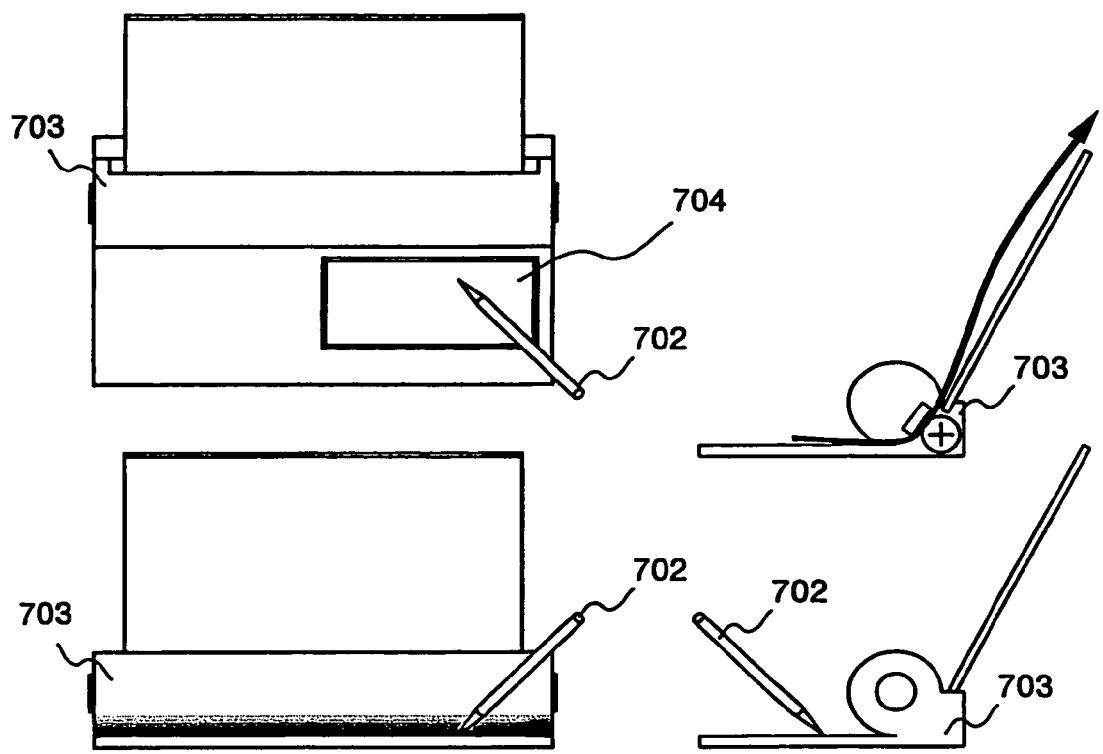
FIG. 24 is an explanatory view showing an operating display unit according to Embodiment 7.

As the operating display unit according to Embodiment 7, for instance, a display unit 701 with a scanner 701*a* incorporated therein and a marking pen 702 as one of pointing devices can be used as shown in FIG. 23. Also, as shown in FIG. 24, a scanner 703 with an LCD panel 704 incorporated therein and the marking pen 702 may be used. Herein, a touch panel is provided in the display unit 701 as well as LCD panel 704, and the touch panel is desired to be transparent, so that a resistance coated type or a surface elastic wave (ultrasonic) type of touch panel is used. A dedicated marking pen with a tip thereof made of soft material for attenuating ultrasonics is used for the surface elastic wave type thereof.

It should be noted that the scanner 405 and the personal computer 411 shown in FIG. 15 can also be used as the operating display unit, but it is preferable that those devises are configured as shown in FIG. 23 and FIG. 24 for a case where the operating display unit can be provided at an arbitrary position on a network Net apart from the personal computer 411.

Also, the operating display unit plays a roll of the reading unit 405 and output unit 409 as required.

Figure 25:
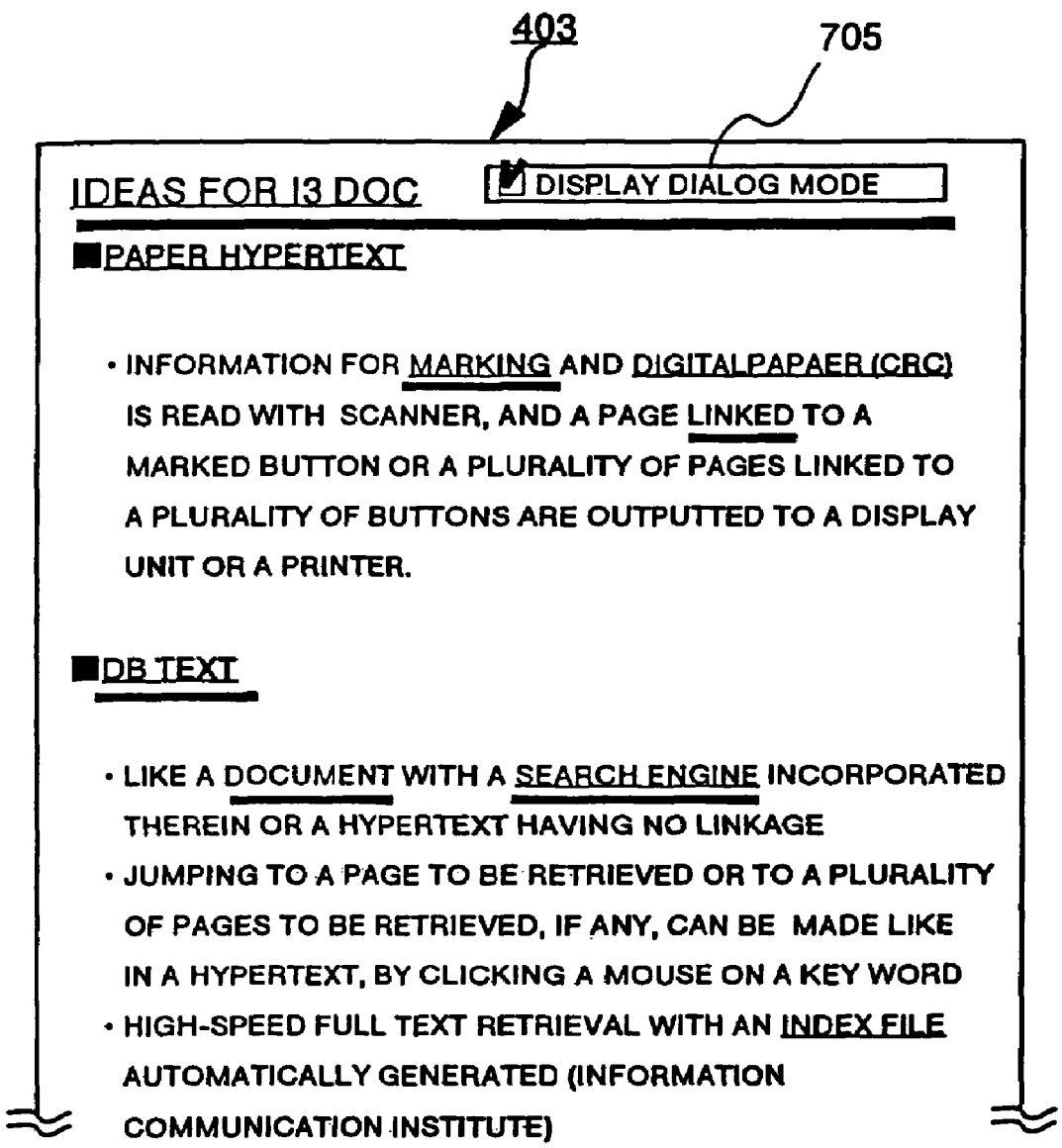
FIG. 25 is an explanatory view showing a retrieval dialog specification column according to Embodiment 7.

Provided on the medium form 403 according to Embodiment 7 is a retrieval dialog specification column (display dialog check box) 705 for specifying a display dialog mode as shown in FIG. 25.

When a marking command (a mark $\nu$) is written in this retrieval dialog specification column 705, word information (key word) for retrieval with a selection marking command is selected, and the selected word information is entered into the personal computer (marking command analyzing unit 406) 411 through the scanner 703 (or the scanner 701*a*, scanner 405), determination is made as to whether a display dialog mode has been specified or not according to whether the marking command has been given to the retrieval dialog specification column 705 or not, and if it is determined that the specification has been made, the LCD panel 704 (or the display unit 701, display unit 411*a*) displays the retrieval dialog thereon into which retrieval conditions such as an equation of retrieval, specification of a data base as an object for retrieval, and specification of a category, and output conditions such as specification of output of related information or a bibliographic item for the related information, specification of an output destination, and specification of an output order can be entered.

Figure 26:
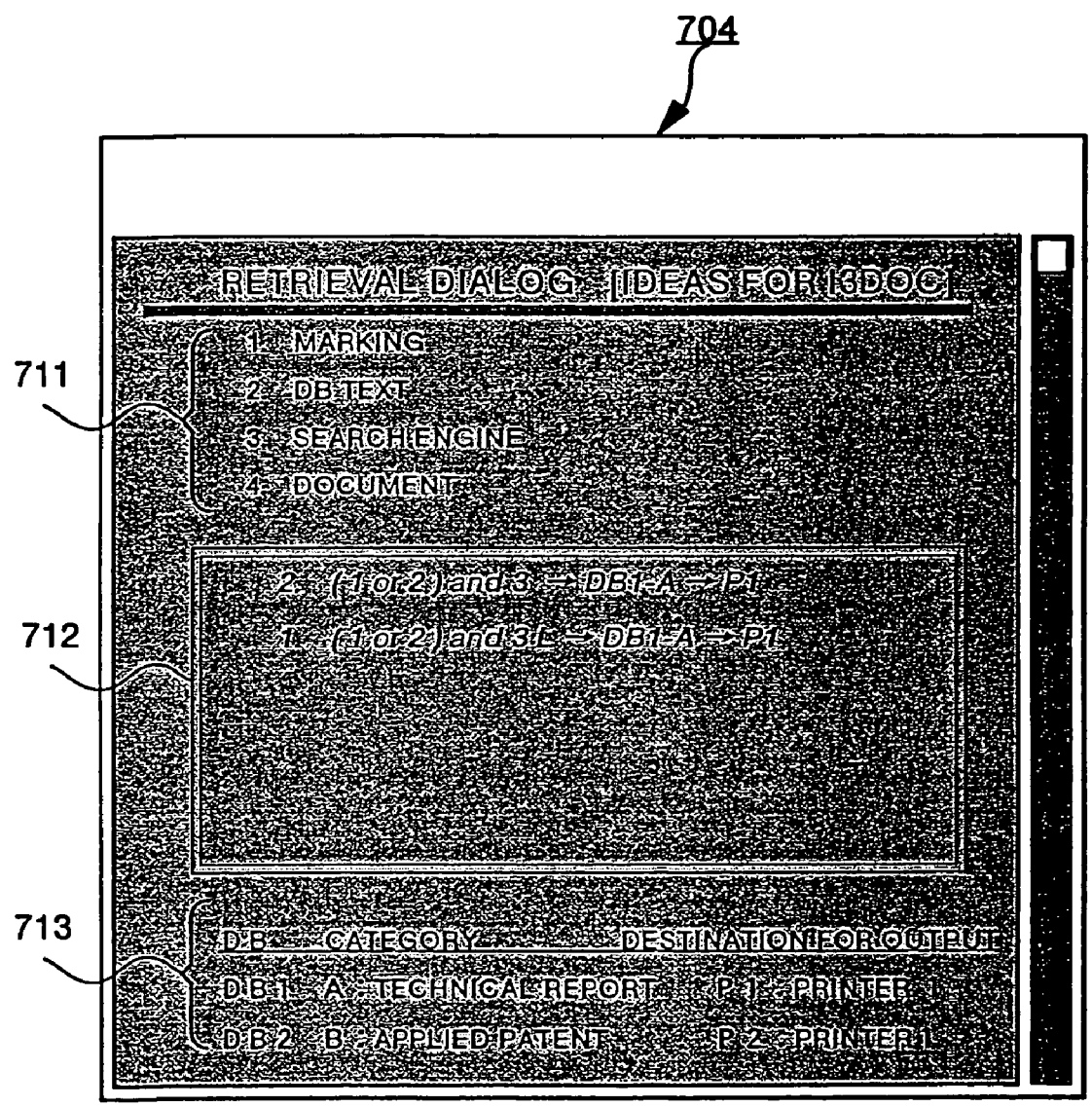
FIG. 26 is an explanatory view showing an example of displaying a retrieval dialog in the operating display unit in Embodiment 7.

FIG. 26 shows an example of displaying a retrieval dialog in the operating display unit, and there are displayed thereon, as shown in the figure, a key word section 711 for automatically allocating a number to word information with a selection marking command given thereto; an entry area 712 for entering there into retrieval conditions such as an equation of retrieval, specification of a data base as an object for retrieval, and specification of a category, and output conditions such as specification of output of related information or a bibliographic item for the related information, specification of an output destination, and specification of an output order; and a list 713 with the retrieval conditions and output conditions therein.

When a user enters retrieval conditions and output conditions with the marking pen 702 into the entry area 712 and the conditions are read by the scanner 703 (which plays a roll of the reading unit 405 herein), the personal computer (marking command analyzing unit 406) 411 analyzes the read retrieval conditions and output conditions, and the personal computer (second retrieving unit 408) 411 retrieves, according to a result of analysis, a corresponding related information file (document file) from the file server (file unit 402) 410 using corresponding described information and/or word information as a key word under the corresponding retrieval conditions, and transfers the file to a corresponding output unit according to the output conditions.

The output unit (first printer 412, second printer 413, display unit 411*a*, LCD panel 704, or display unit 701) having received the related information file outputs the received related information file or a bibliographic item as related information.

Figure 27:
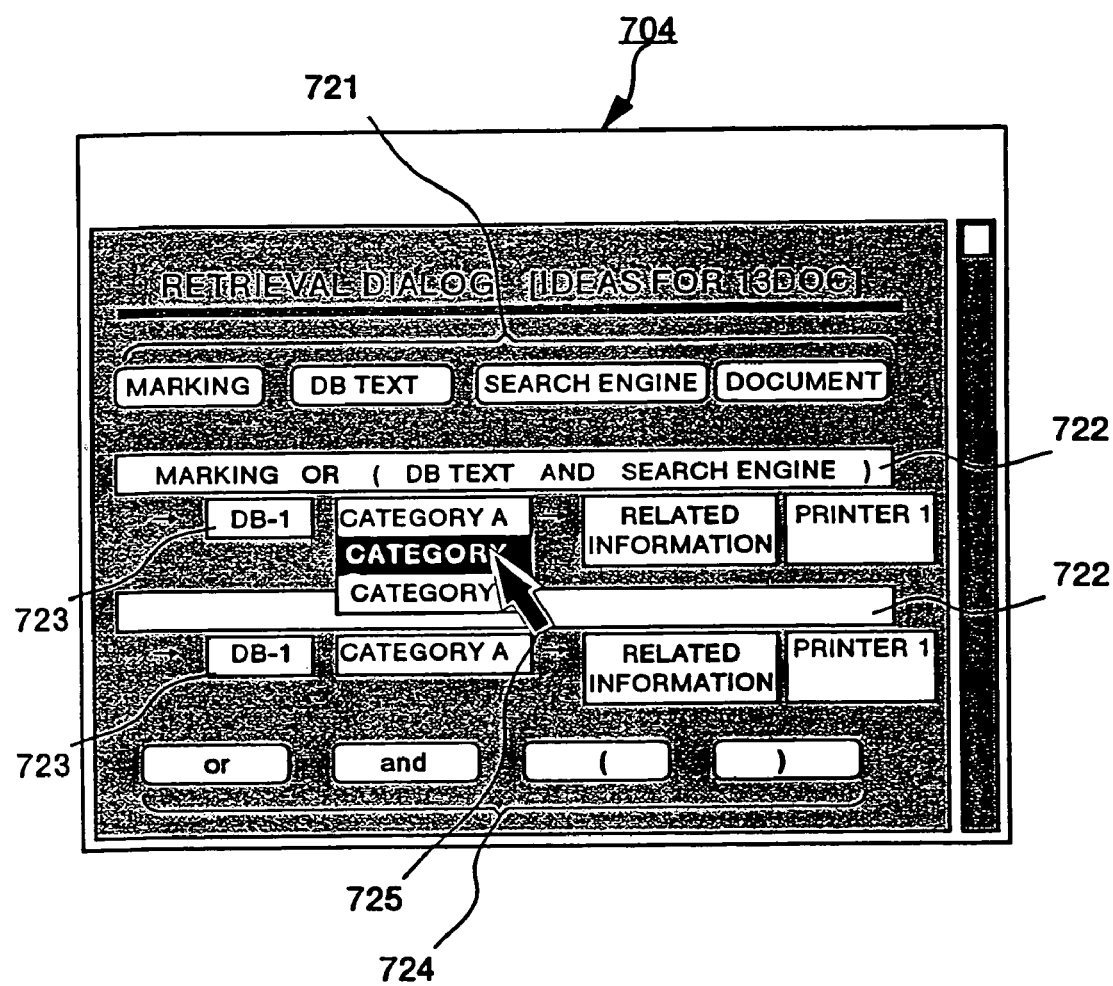
FIG. 27 is an explanatory view showing another example of displaying a retrieval dialog in the operating display unit in Embodiment 7.

FIG. 27 shows another example of displaying a retrieval dialog in the operating display unit, and there are displayed thereon icons 721 automatically generated for word information with selection marking commands given thereto; an entry area 722 for entering there into retrieval conditions such as an equation of retrieval, specification of a data base as an object for retrieval, and specification of a category, and output conditions such as specification of output of related information or a bibliographic item for the related information, specification of an output destination, and specification of an output order; menu icons 723 for selecting retrieval conditions and output conditions; retrieval-equation parts icons 724 each used for creating an equation of retrieval; and a cursor 725.

It is assumed herein that various operations are carried out using drag & drop with a mouse as a pointing device to an operating display unit.

At first, by pointing, on the display screen, the cursor 725 to any of the icons 721 for a desired word information, turning ON the mouse button, moving the icon 721 to an arbitrary position in the entry area 722 by dragging, and turning OFF (dropping) the mouse, a key word constituting an equation of retrieval is specified (set). Similarly, any of the retrieval equation parts icons 724 is moved by drag & drop to complete the equation of retrieval.

Then, by pointing the cursor 125 to the menu icon 723 indicating the default, an item for the default (DB-1, Category-A, Related information, Printer-1 in the figure) to be clicked on with the mouse button is specified. On the other hand, when the cursor 725 is pointed to the menu icon 723 indicating the default and the mouse button is ON, the menu is pulled down. The cursor 725 is moved as far as an item to be specified in this pulled-down menu and the mouse button is OFF thereon, so that a corresponding item is specified.

As described above, retrieval conditions and output conditions can be specified similarly to FIG. 26.

With Embodiment 7, in addition to the same effect as that of Embodiment 4, more complicated retrieval conditions and output conditions can further be specified. Also, it is possible to provide a variety of operational environments such as drag & drop and a pop-up menu by using a marking pen and a mouse or the like.

Especially, when a marking pen is used, a method of handling work on a medium form and that on a display are unified, so that the workability, operability, and convenience can be enhanced.

A document information management system according to Embodiment 8 has the same configuration as that of the document information management system according to Embodiment 7, and in the document information management system, a medium form direct mode, a medium form dialog mode, a retrieval sheet mode, and a display dialog mode can be specified on a sheet of medium form. It should be noted that the basic configuration and operations in Embodiment 8 are the same as those in Embodiments 4 to 7, and description is made herein only for different portions.

The medium form direct mode indicates a mode for specifying retrieval conditions and output conditions by directly giving marking commands on the medium form 403 as described in relation to the document information management system according to Embodiment 4.

The medium form dialog mode indicates a mode for directly writing, by setting an arbitrary area (dialog) on the medium form 403 as described in relation to the document information management system according to Embodiment 5, retrieval conditions or output conditions in the area.

The retrieval sheet mode indicates a mode in which a retrieval sheet specification column for specifying output of a retrieval sheet is provided on the medium form 403 for enabling output of the retrieval sheet as described in relation to the document information management system according to Embodiment 6 and retrieval conditions or output conditions are written for input on the outputted retrieval sheet.

Further the display dialog mode indicates a mode for inputting retrieval conditions or output conditions via the operation display unit as described in relation to the document information management system according to Embodiment 7.

Figure 28A:
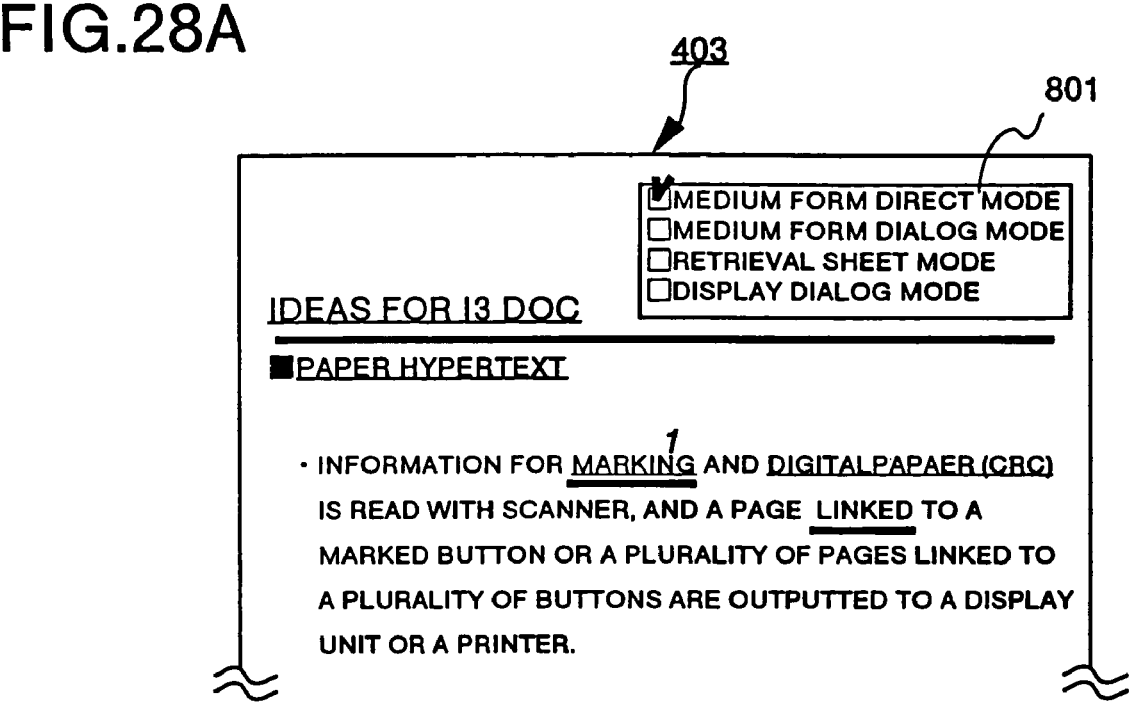
FIG. 28A and FIG. 28B are explanatory views each showing an example of a mode specification column provided on a medium form according to Embodiment 8.
Figure 28B:
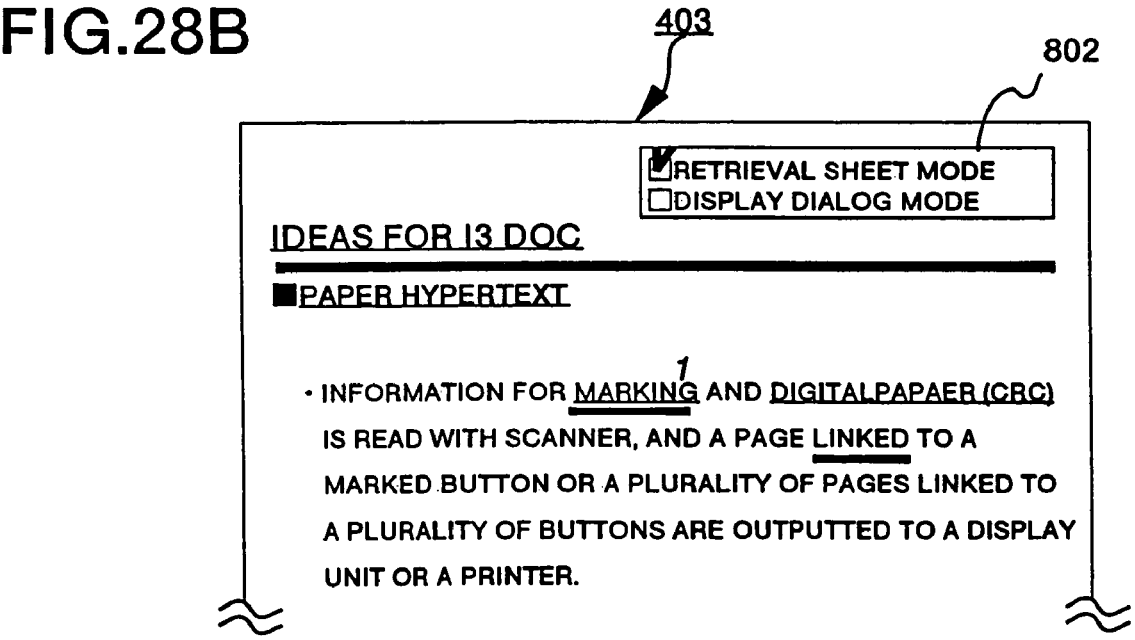

FIG. 28A and FIG. 28B each show a mode specification column provided on the medium form 403 according to Embodiment 8, and the configuration, in which a desired mode is selected from a mode specification column 801 having 4 check boxes as shown in FIG. 28A, is allowable, and also the configuration, in which either one of the retrieval sheet mode and display dialog mode is selected from a mode specification column 802 having 2 check boxes for the retrieval sheet mode and display dialog mode and also in which the medium form direct mode is set as the default and the medium form dialog mode is determined by analyzing a marking command as shown in FIG. 28B, is allowable.

In Embodiment 8, various operation modes can be selected for use, so that various operations can be executed according to user's needs, which insure further improved convenience and operability.

Figure 29:
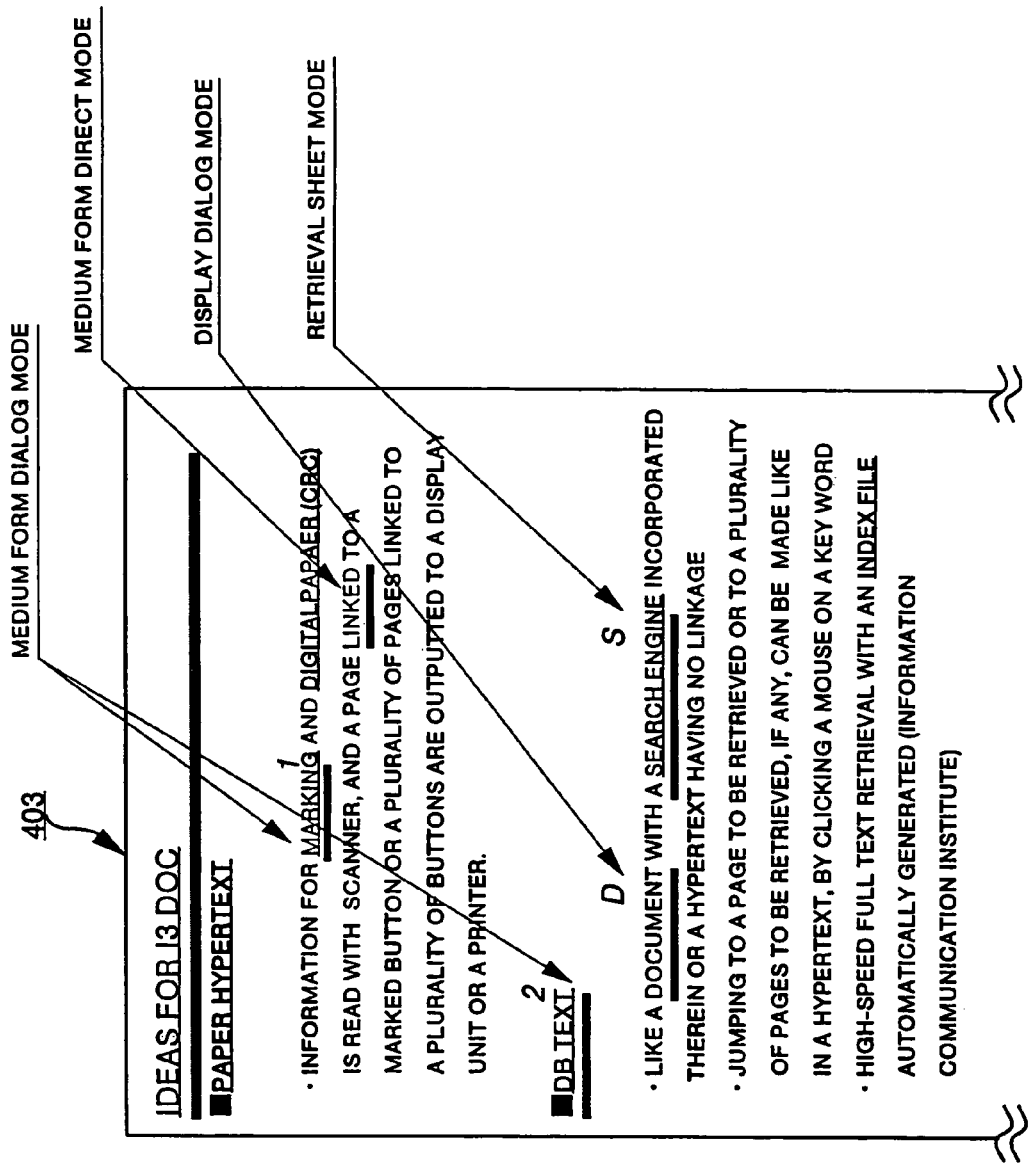
FIG. 29 is an explanatory view showing another example of a method of specifying a mode in Embodiment 8.

It should be noted that, as other method of specifying any of the medium form direct mode, medium form dialog mode, retrieval sheet mode, and display dialog mode on a sheet of medium form, for instance, the method of determining a mode by analyzing a marking command as shown in FIG. 29 is conceivable. In this case, the determination can easily be made by newly defining a marking pattern (S in the figure) for specifying the retrieval sheet mode and a marking pattern (D in the figure) for specifying the display dialog mode as mode specification marking commands and giving the patterns around the selection marking command. It should be noted that, in a case of the medium form dialog mode, determination can be made also by using the identification marking command shown in Table 3.

For the reasons as described above, when the mode specification marking command or identification marking command has not been given, it is determined that the current mode is the medium form direct mode.

A document information management system according to Embodiment 9 of the present invention is a document information management system in which a desired document can be retrieved and read by using a linking function of the conventional type of hyper text document, and in this embodiment, key word retrieval can be made by using a word or words other than a button on a hypertext and batch processing can be made by specifying a plurality of buttons on the hypertext.

Figure 30:
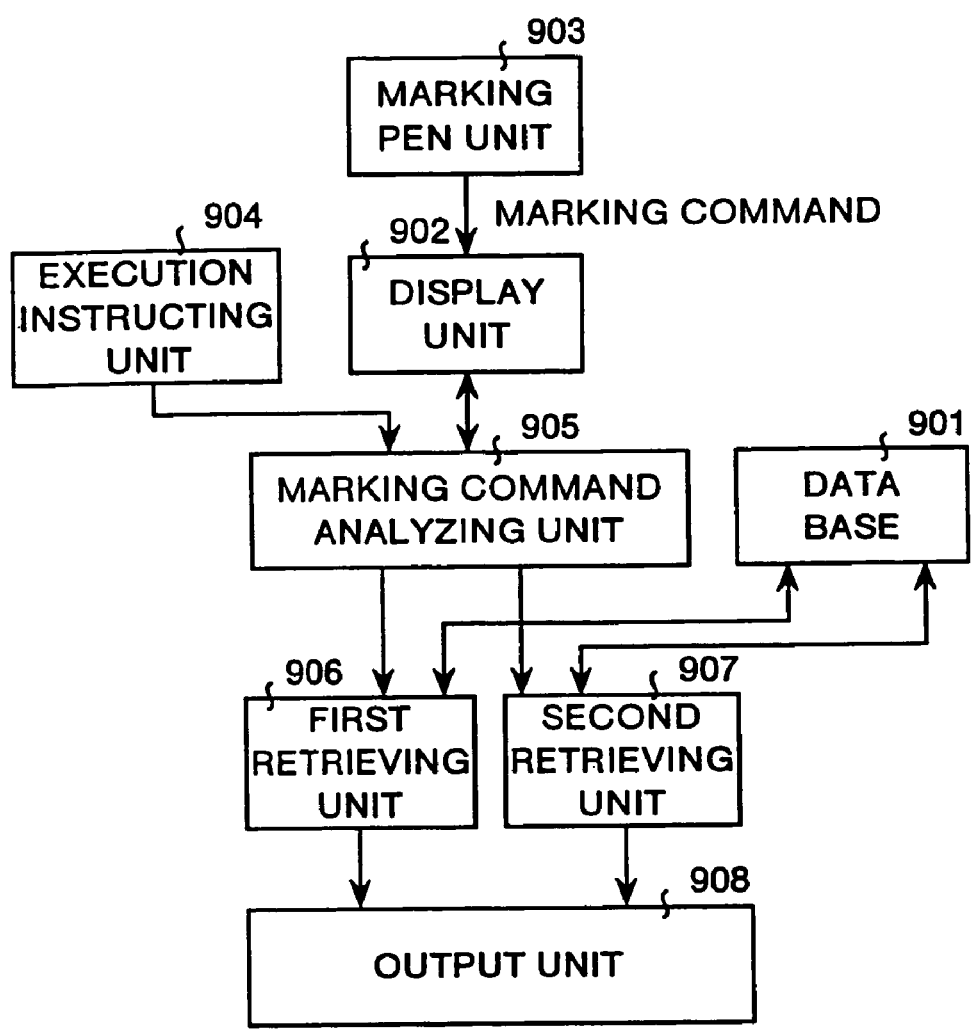
FIG. 30 is a view showing a document information management system according to Embodiment 9.

Detailed description is made below for the document information management system according to Embodiment 9 in the following order:
1) General configuration of the system
2) Method of specifying a linking function of a hypertext
3) Specification of the text direct mode and menu mode
4) Specification of retrieval conditions and output conditions in retrieval using a button (linking function)
5) Specification of retrieval conditions and output conditions in retrieval using a key word
6) General operations 1) General Configuration of the System FIG. 30 is a view showing the document information management system according to Embodiment 9, and this document information management system comprises a data base 901 with a plurality of document files previously stored therein; a display unit 902 for displaying hypertext document and non-hypertext documents other than the hypertext documents; a marking pen unit 903 having a marking pen for giving at least one marking command comprising a previously prepared pattern to a button for a hypertext document, a word other than the button for a hypertext document, or a word in a non-hypertext document each displayed on the display unit 902; an execution instructing unit 904 for instructing execution of a marking command given with the marking pen unit 903; a marking command analyzing unit 905 for analyzing contents of a marking command according to a marking command given with the marking pen unit 903, a button, a word other than the button, or a word in a non-hypertext document each with a marking command given thereto; a first retrieving unit 906 for retrieving, when it is determined by the marking command analyzing unit 905 that a marking command has been given to a button in a hypertext document, related information linked to the button with a marking command given thereto from a data base; a second retrieving unit 907 for retrieving, when it is determined by the marking command analyzing unit 905 that a marking command has been given to a word other than a button in a hypertext document or to a word in a non-hypertext document, related information from a data base using the word with the marking command given thereto as a key word; and an output unit 908 for outputting related information retrieved by the first retrieving unit 906 and/or second retrieving unit 907.

Figure 31:
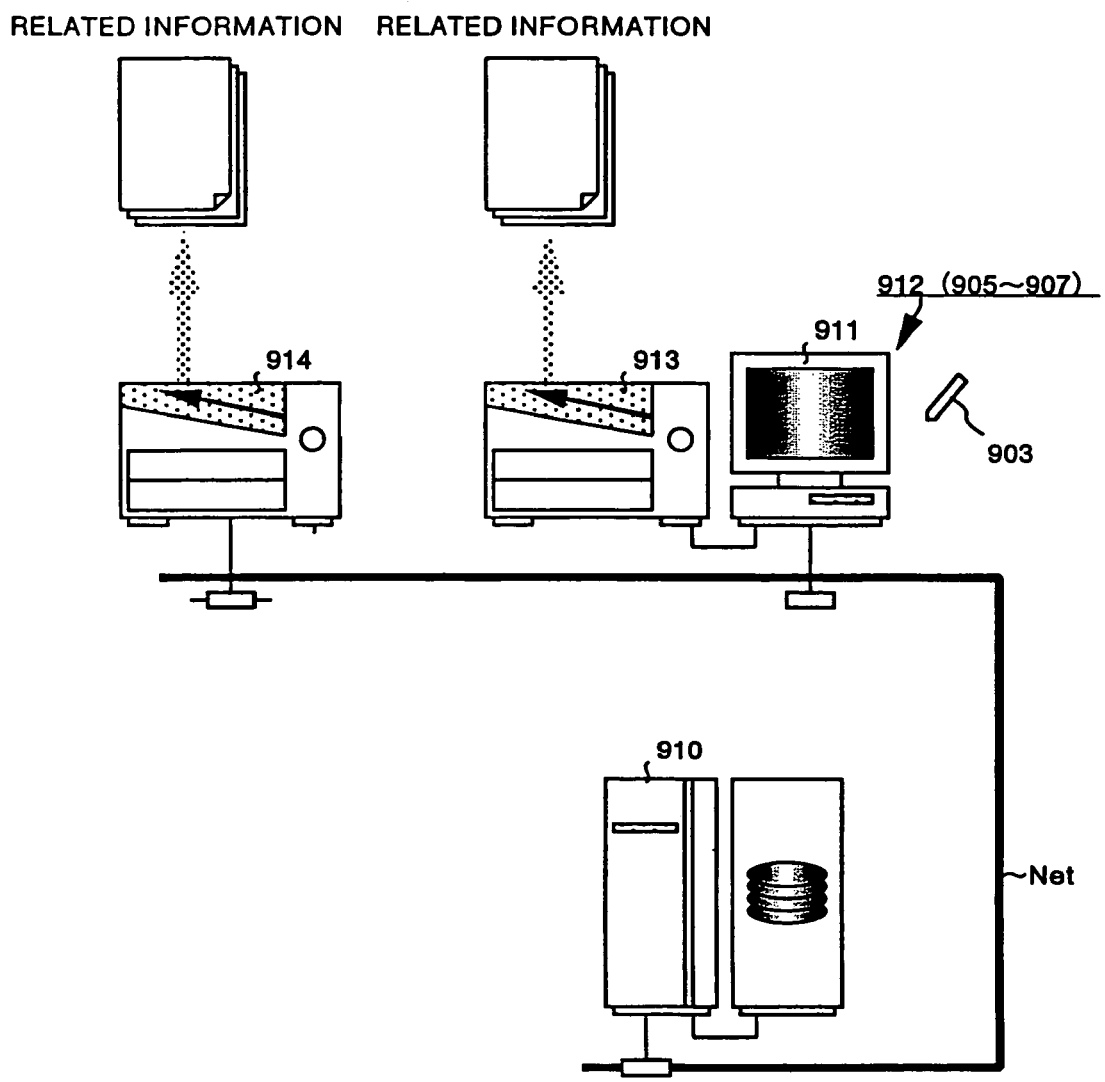
FIG. 31 is an explanatory view showing particular hardware configuration of the document information management system according to Embodiment 9.

FIG. 31 shows particular hardware configuration of the document information management system according to Embodiment 9, and in this document information management system, a file server 910 connected to a network Net such as Intranet can be used as the data base 901. This file server 910 has a large capacity hard disk unit, and hypertext documents and non-hypertext documents used in the system are stored in this hard disk unit.

As the display unit 902, a display unit 911 of an ordinary personal computer or the like may be used. It should be noted that a touch panel for executing pen operations with the marking pen unit 903 is provided in the display unit 911 in Embodiment 9.

As the marking pen unit 903, a dedicated marking pen 903 for describing a marking command on the display unit 902 (display unit 911) is used.

The execution instructing unit 904 is specified by having the execution specifying button described later displayed on the display unit 911 and using the marking pen 903. In other words, the display unit 911 and marking pen 903 play a role for the execution instructing unit 904 in Embodiment 9.

As the marking command analyzing unit 905, first retrieving unit 906, and second retrieving unit 907, an ordinary personal computer 912 comprising the display unit 911, a storage device such as a hard disk or a floppy disk, and a basic system of the personal computer (control unit) may be used.

Also a plurality of output devices are provided as the output unit 908, and the output unit 908 comprises a first printer 913 connected to the personal computer 912, a second printer 914 connected to a network Net, and further the display unit 911 of the personal computer 912.

As clearly understood from the description above, in Embodiment 9, the display unit 911 is used as the display unit 902, execution instructing unit 904, and output unit 908, but this configuration is not limited to this one, and separate display units may be provided for the units respectively.

2) Method of Specifying a Linking Function of a Hypertext

Figure 32:
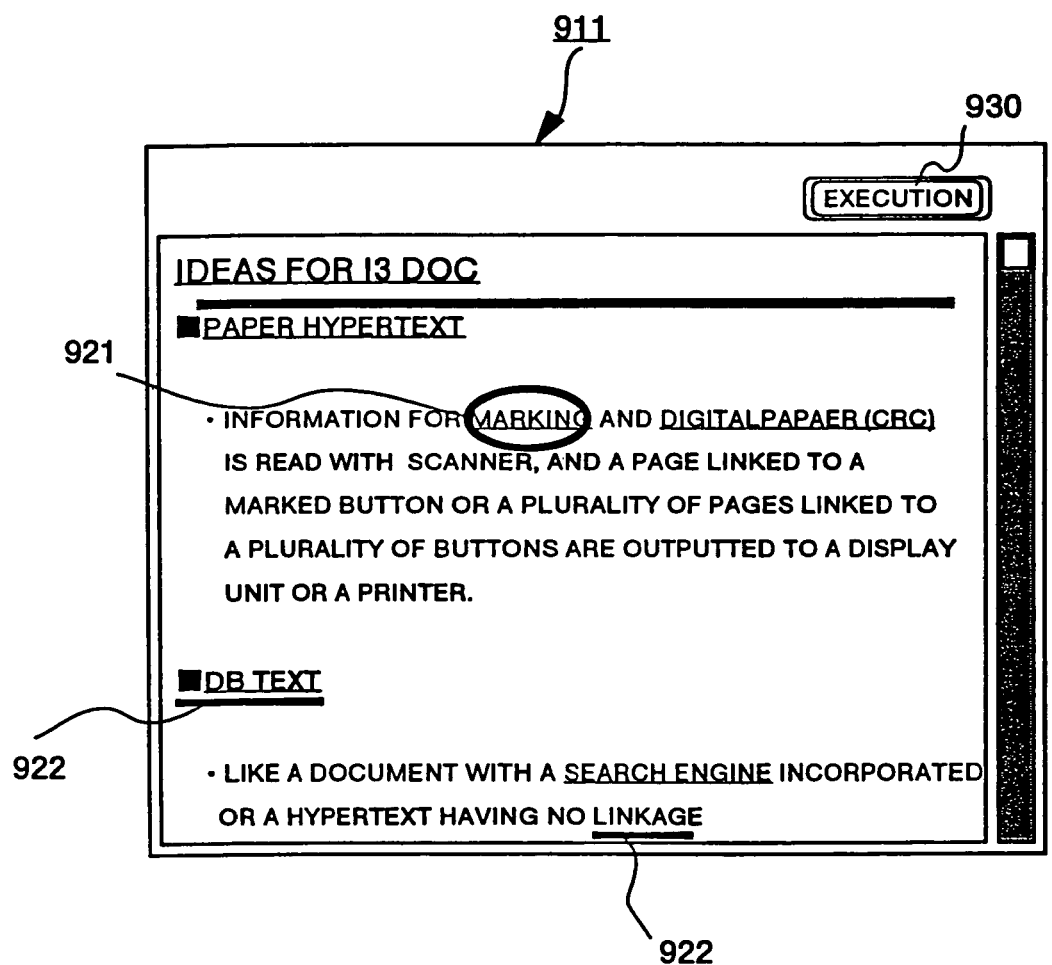
FIG. 32 is an explanatory view showing a method of specifying whether a button (linking function) on a hypertext is used or not in Embodiment 9.
Figure 33:
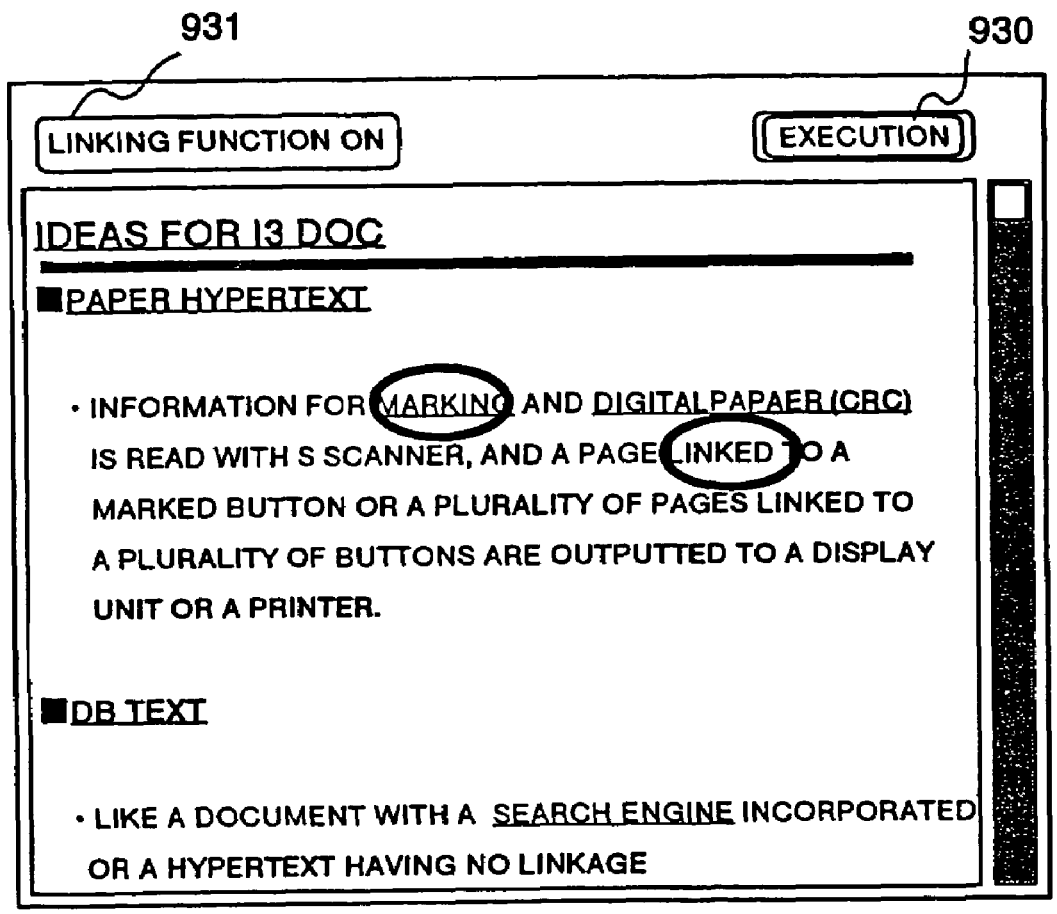
FIG. 33 is an explanatory view showing another method of specifying whether a button (linking function) on a hypertext is used or not in Embodiment 9.

Next description is made for a method of specifying whether a button (linking function) of a hypertext should be used or not with reference to FIG. 32 and FIG. 33.

FIG. 32 shows an example of display of a hypertext shown on the display unit 911. Marking commands in Embodiment 9 include a first selection marking command 921 for executing retrieval with the first retrieving unit 906 by using a linking function of a button, and a second selection marking command 922 for executing retrieval with the second retrieving unit 907 by using a button, a word other than the button in a hypertext, or a word in a non-hypertext.

In other words, the button "marking" with the first selection marking command 921 given thereto indicates that retrieval using the linking function has been specified, and the button "DB text" and word "link" each with the second selection marking command 922 given thereto indicate that retrieval using the button and word as key words has been specified.

When an execution button 930 is touched with the marking pen 903 after the marking command is given thereto as described above, retrieval specified by each marking command is executed.

The marking command analyzing unit 905 determines, when the first selection marking command is given thereto, that a marking command has been given to a button in a hypertext document, and analyzes, when the second selection marking command is given, that a marking command has been given to a word other than the button in a hypertext document or to a word in a non-hypertext document. Namely, in FIG. 32, the button "DB text" with the second selection marking command 922 given thereto is treated as a word.

Also the configuration is allowable, as shown in FIG. 33, where a linking function of a button of a hypertext document is disables, a specification item (linking function ON) 931 for specifying use of a hypertext as a non-hypertext is made displayed, and it is specified by giving a marking command to this specification item 931 whether the button is used as a button or as a word.

In this case, the marking command analyzing unit 905 determines, when a marking command has been given with the marking pen 903 to the specification item 931, that a marking command has been given to a word other than a button in a hypertext document or to a word in a non-hypertext document, and analyzes, when a marking command has not been given to the specification item 931, that a marking command has been given to a button in a hypertext document.

3) Specification of the Text Direct Mode and Menu Mode

Figure 34:
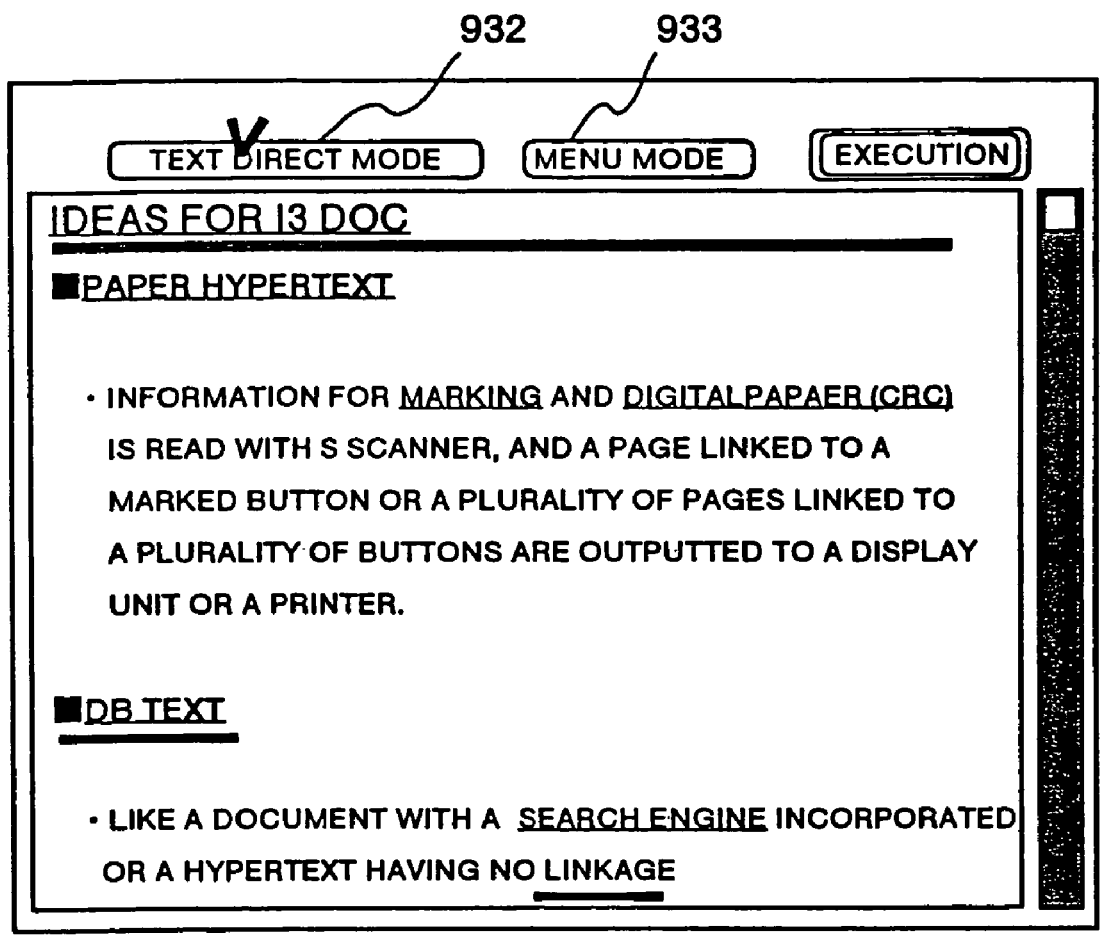
FIG. 34 is an explanatory view showing an example of a method of specifying a mode in Embodiment 9.

In Embodiment 9, there are two modes available; the text direct mode for giving a desired marking command by directly describing the marking command on a display screen, and the menu mode for selecting a desired marking command from a selection menu displayed on the display unit and giving the marking command, and as shown in FIG. 34, mode selection items 932, 933 are displayed for selection thereof on a display screen of the display unit 911. Herein, when a marking command is given to the mode selection item 932, the text direct mode is specified. Also, when a marking command is given to the mode selection item 933, the menu mode is specified.

Figure 35A:
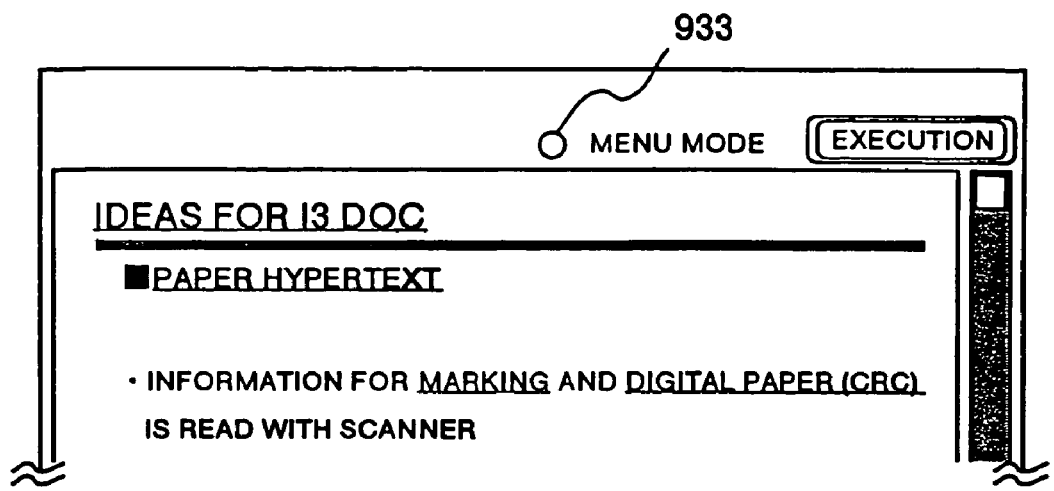
FIG. 35A and FIG. 35B are explanatory views each showing another example of the method of specifying a mode in Embodiment 9.
Figure 35B:
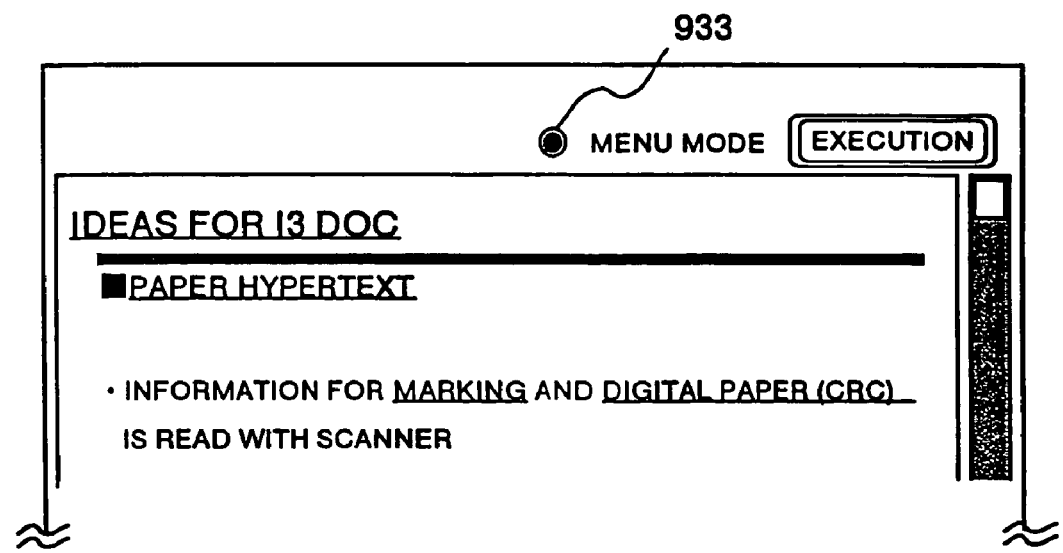

Further only a specification column 933 may be provided as shown in FIG. 35A and FIG. 35B by setting the text direct mode as default and menu mode as an option. In this case, FIG. 35A shows a specification of the text direct mode (default), while FIG. 35B shows specification of the menu mode (option).

4) Specification of Retrieval Conditions and Output Conditions in Retrieval Using a Button (Linking Function)

Next description is made for specification of retrieval conditions and output conditions in retrieval using a button (a linking function) in the order of 4)-1: text direct mode, and 4)-2: menu mode.

4)-1 Text Direct Mode

FIG. 36 is an explanatory view showing specification of retrieval conditions and output conditions in retrieval using a button (a linking function) in the text direct mode. In the text direct mode, the marking commands shown in Table 4 are used.

TABLE 4

| Type of marking command | Marking pattern and meaning of command |
|---|---|
| Selection marking command |  : Selection of described information |
| Output destination marking command |  : Display unit |
| | P1 : First printer |
| | P2 : Second printer |
| Output condition marking command |  : Output of related information |
| |  : Output of a bibliographic item for related information |

Although detailed description is not made herein because the types of marking command are the same as those in Table 1 in Embodiment 4, the output order marking commands shown in Table 1 are not used herein. As an order of specification can be recognized on real time in an operation for giving a selection marking command with the display unit 911 and marking pen 903, the order of specification is an output order (namely, that specified in the order of output).

Figure 36A:
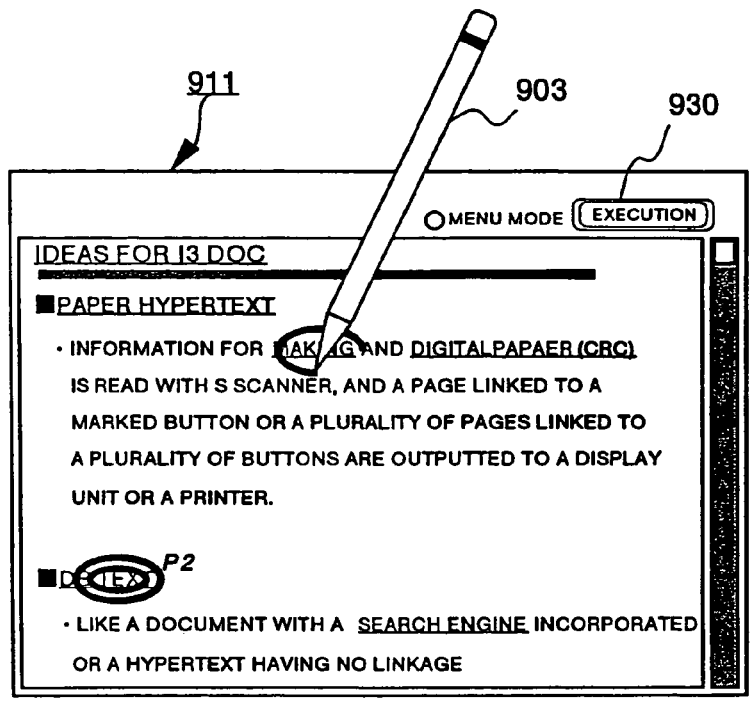
FIG. 36A and FIG. 36B are explanatory views each showing specification of retrieval conditions and output conditions for retrieval using a button (linking function) in a text direct mode.
Figure 36B:
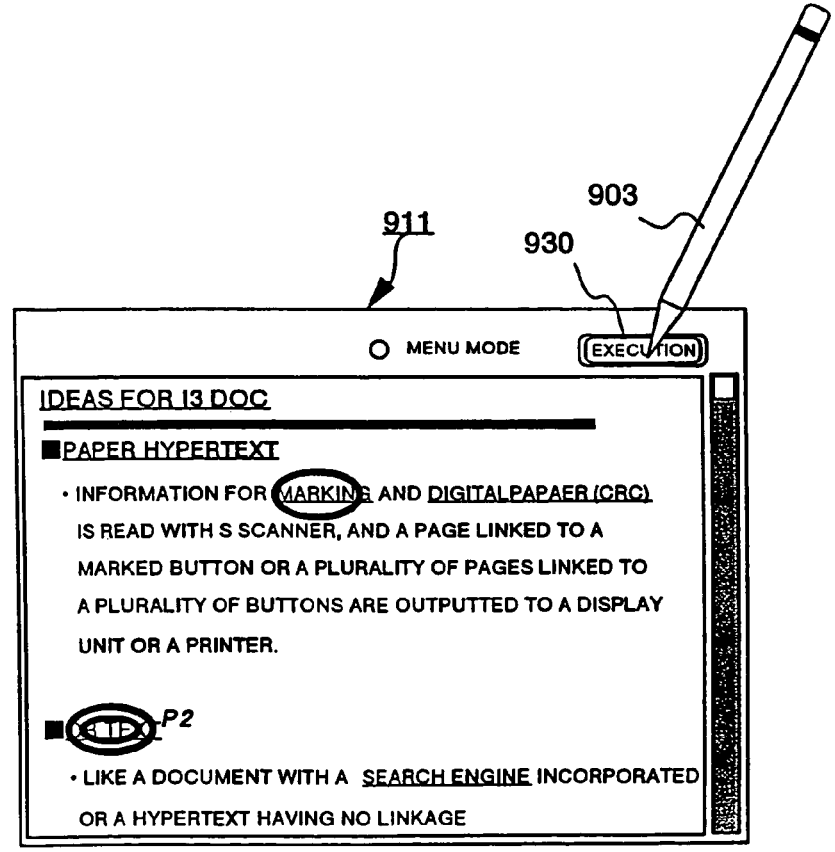

After a marking command is given with the marking pen 903 to all of desired buttons as shown in FIG. 36A, when an execution button 930 is touched with the marking pen 903 as shown in FIG. 36B, retrieval is executed according to the selected button (herein, the two buttons of "marking" and "DB text"). In other words, retrieval according to a plurality of buttons is simultaneously started as batch processing.

4)-2: Menu Mode

FIG. 37 is an explanatory view showing specification to retrieval conditions and output conditions in retrieval using a button (a linking function) in the menu mode.

In the menu mode, at first when a selection marking command is given with the marking pen 903 to a desired button, when a selection menu is displayed around the button with the selection marking command given thereto.

Displayed in this selection menu are two selection items: an output condition selection item (Default: related information) for specifying which of related information and a bibliographic item for the related information is to be outputted as information corresponding to the selected button, and an output destination selection item (Default: Display unit 911) for selecting an output device as a destination for output of the information corresponding to the selected button.

Figure 37A:
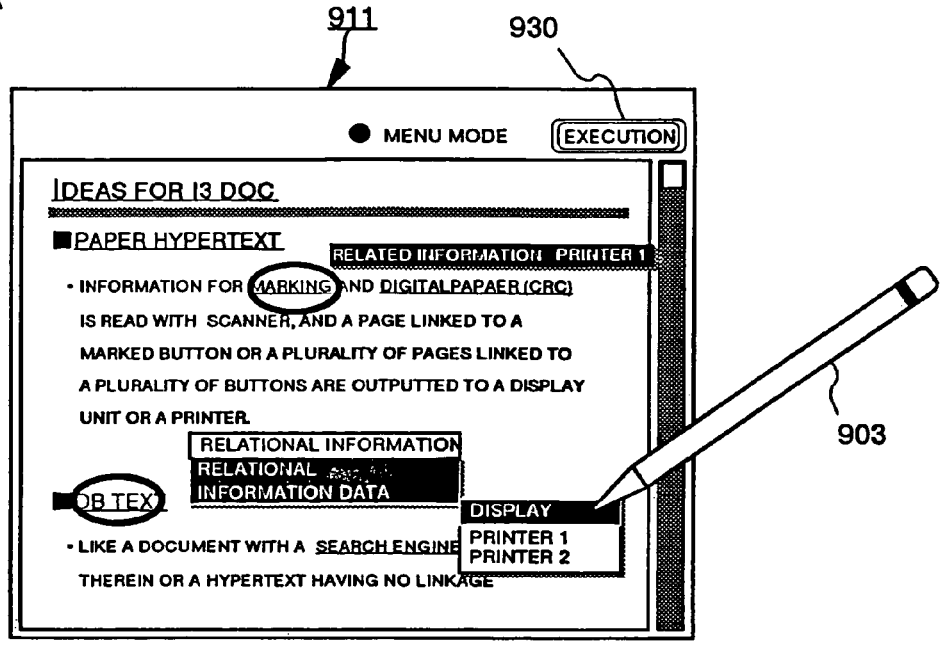
FIG. 37A and FIG. 37B are explanatory views each showing specification of retrieval conditions and output conditions for retrieval using a button (linking function) in a menu mode.

As shown in FIG. 37A, when a selection item to be changed in selection items in the selection menu is touched with the marking pen 903, a pop-up menu are displayed. Herein, a pop-up menu for the output destination selection items (Default: display unit 911) is displayed, and when an item to be specified is touched with the marking pen 903, the touched item is selected.

Figure 37B:
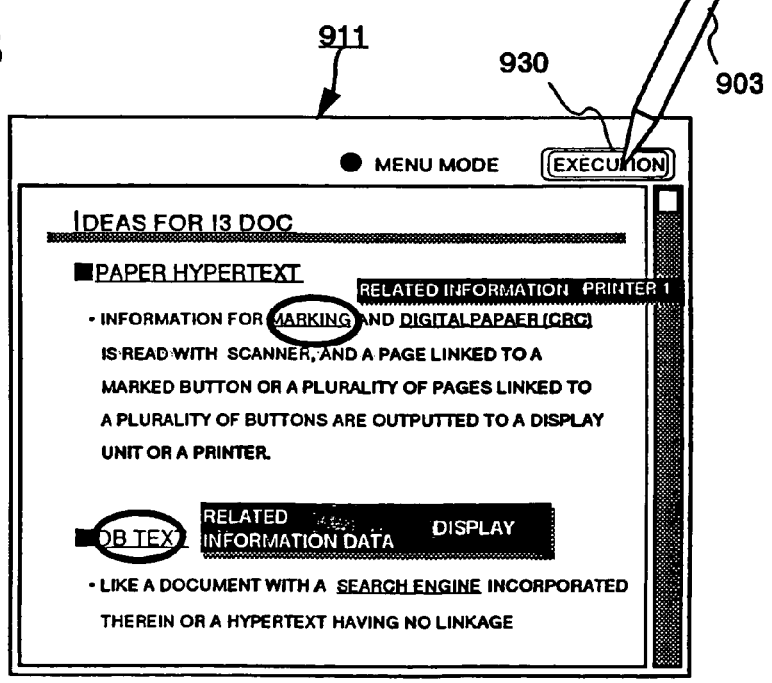

After all of desired items are selected, when the execution button 930 is touched with the marking pen 903 as shown in FIG. 37B, retrieval is executed according to the selected buttons (herein, two buttons of "Marking" and "DB text") as well as to a selected item in the selection menu displayed therearound. In other words, retrieval according to a plurality of buttons is simultaneously started as batch processing.

5) Specification of Retrieval Conditions and Output Conditions in Retrieval Using a Key Word Next description is made for specification of retrieval conditions and output conditions in retrieval using a key word in the order of 5)-1: text direct mode, and 5)-2: menu mode.

5)-1: Text Direct Mode

Figure 38:
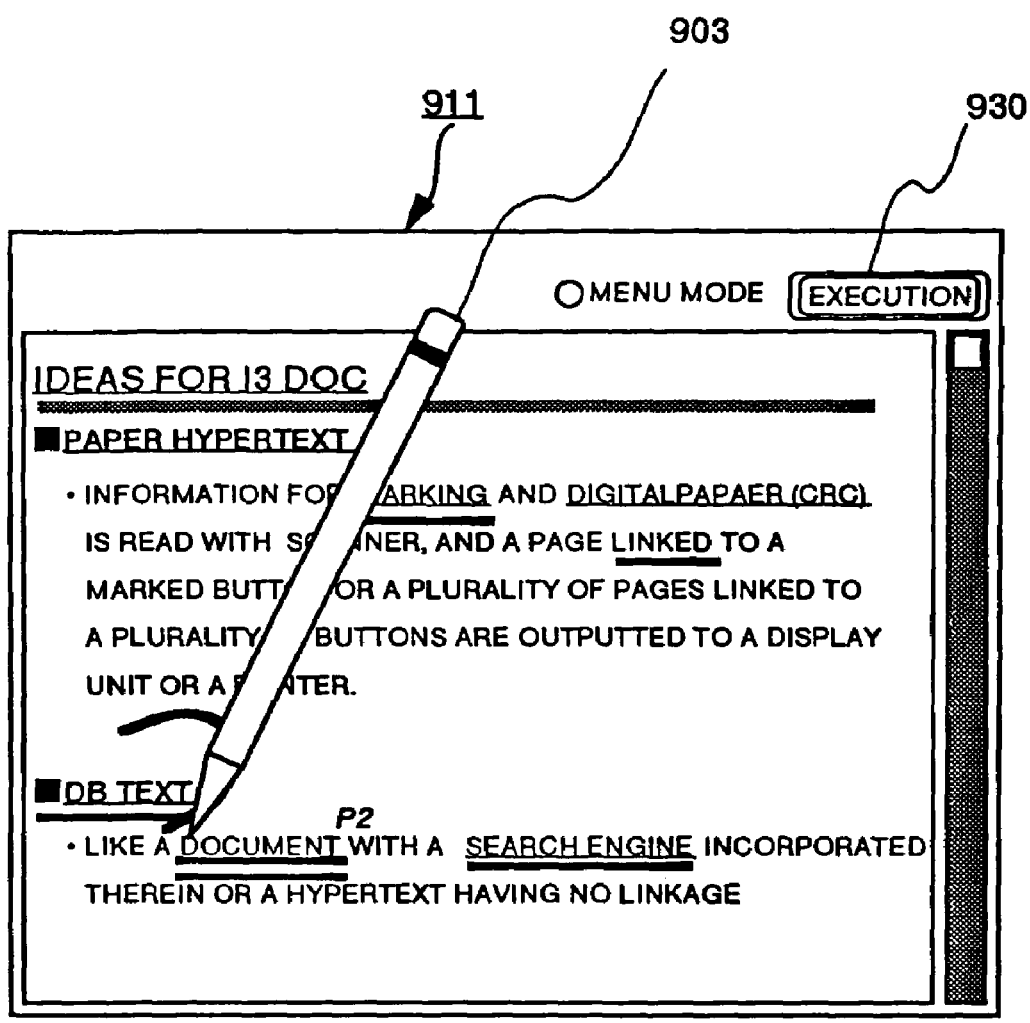
FIG. 38 is an explanatory view showing specification of retrieval conditions and output conditions for retrieval using a key word in the text direct mode.

FIG. 38 is an explanatory view showing specification of retrieval conditions and output conditions in retrieval using a key word in the text direct mode.

In the text direct mode, the marking commands shown in Table 5 are used.

TABLE 5

| Type of marking command | Marking pattern and meaning of command | |
|---|---|---|
| Selection marking command | —— | : Selection of described information |
| Output destination marking command | —— | : Display unit |
| | ——P1 | : First printer |
| | ——P2 | : Second printer |
| Output condition marking command | —— | : Output of related information |
| | ═══ | : Output of a bibliographic item for related information |
| AND retrieval marking command | ■∩■ | : Two key words linked to each other with AND |
| | ■∩■∩■ | : A plurality of key words linked to each other with AND |
| | ■ | : OR retrieval in default (Independent processing) |

The marking commands shown in Table 5 are basically the same as those in Table 2 in Embodiment 4, so that detailed description thereof is not made herein, but in this configuration, as a specification order can be recognized on real time in an operation for giving selection marking commands with the display unit 911 and marking pen 903, so that an output order marking command is not used.

After a marking command has been given with the marking pen 903 to each of all desired items as shown in FIG. 38, when the execution button 930 is touched with the marking pen 903, retrieval using key words is executed according to the selected words (Herein, 5 words of "Marking", "Link", "DB text", "Search engine", and "Document" are selected, and "DB text" and "Search engine" are key words for AND retrieval using key words).

5)-2: Menu Mode

Figure 39:
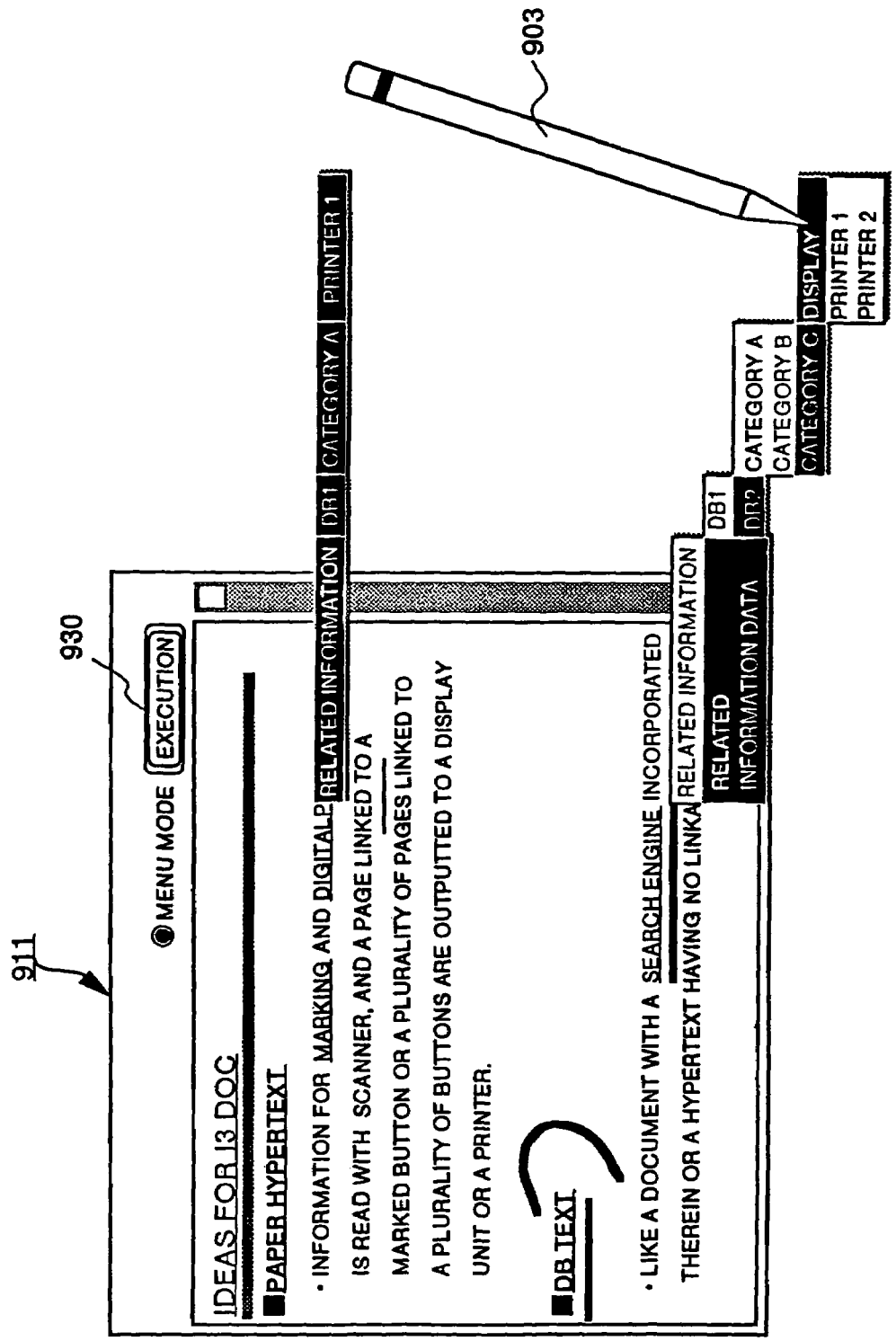
FIG. 39 is an explanatory view showing specification of retrieval conditions and output conditions for retrieval using a key word in the menu mode.
Figure 40:
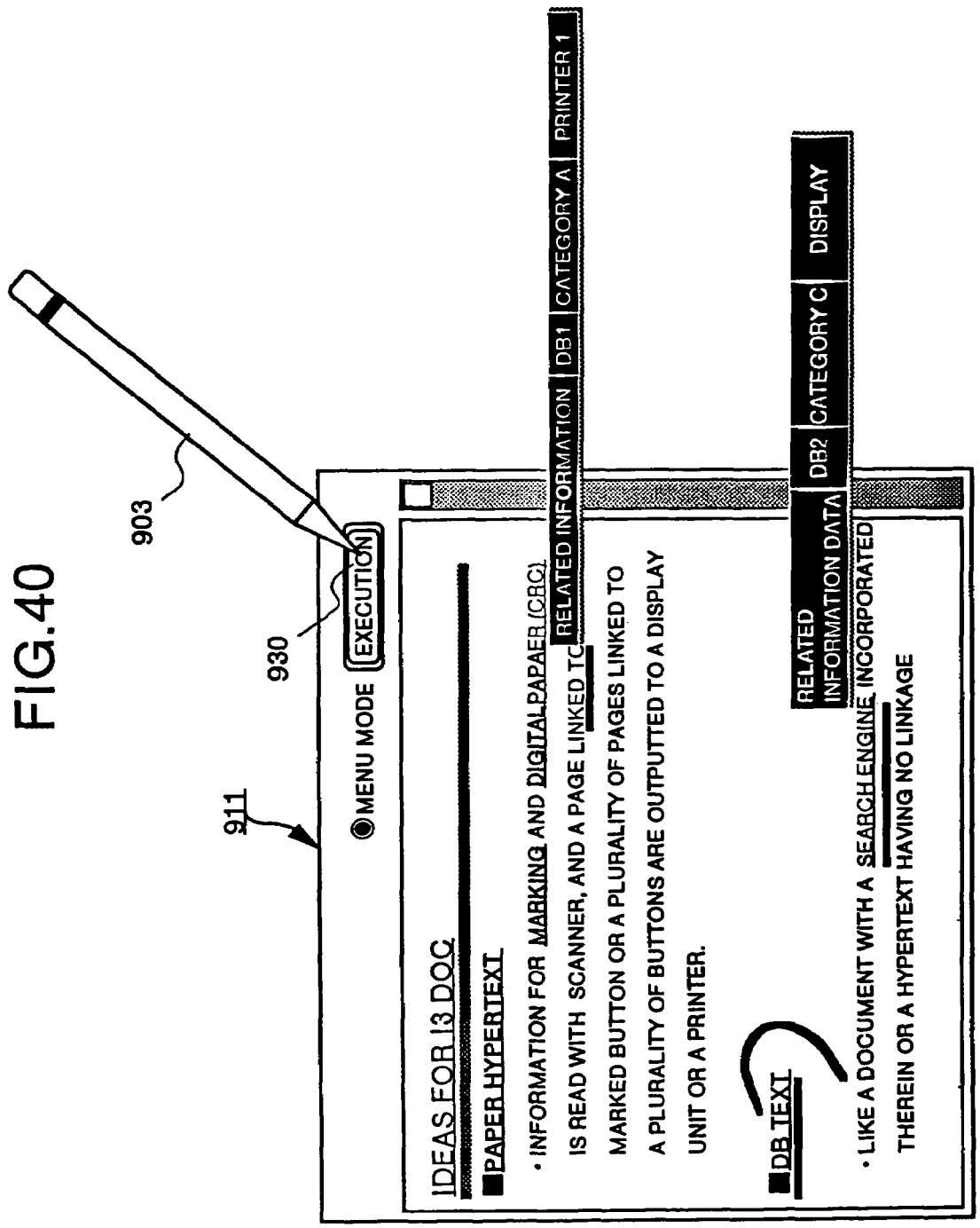
FIG. 40 is an explanatory view showing specification of retrieval conditions and output conditions for retrieval using a key word in the menu mode.
Figure 41:
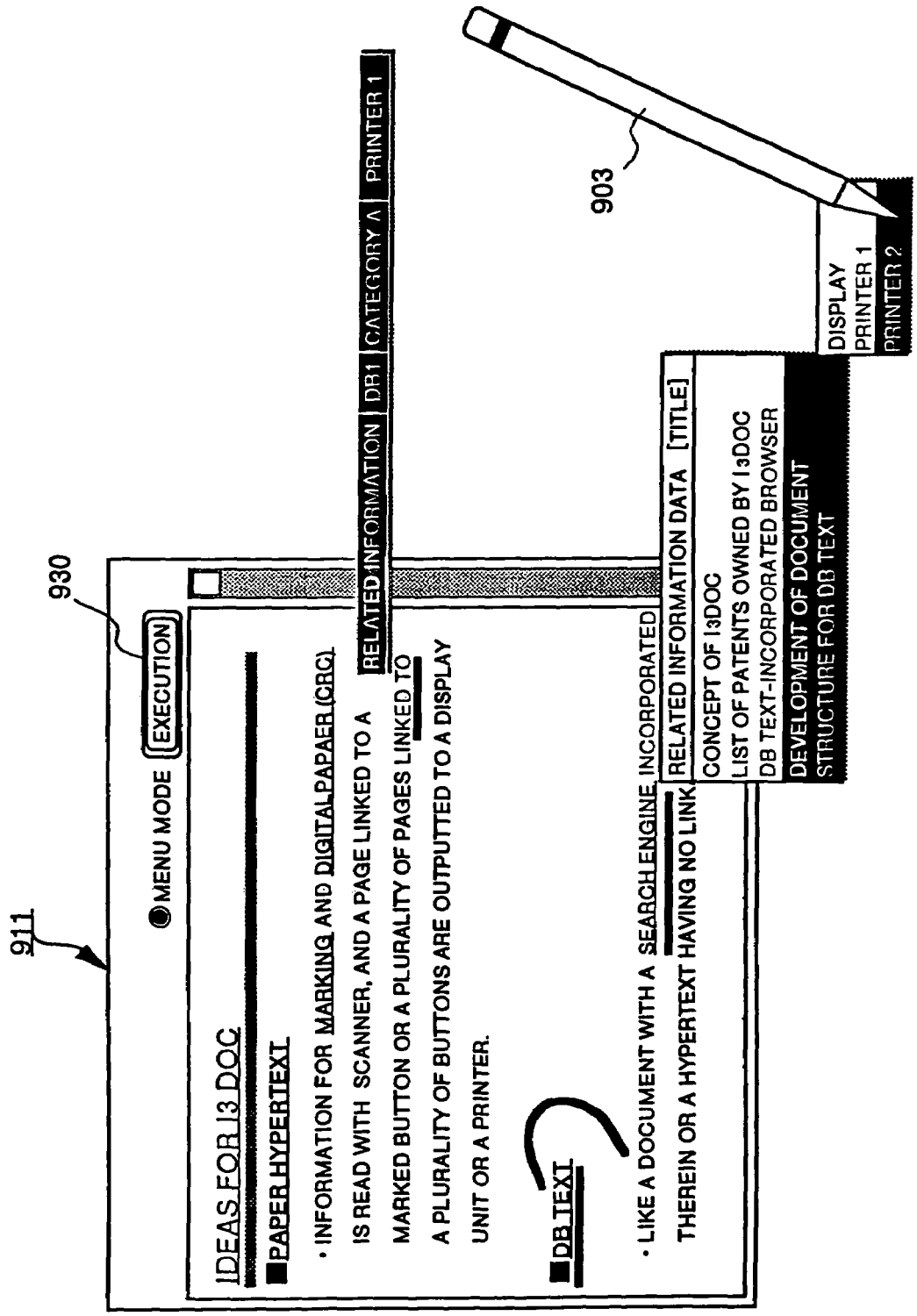
FIG. 41 is an explanatory view showing specification of retrieval conditions and output conditions for retrieval using a key word in the menu mode.

FIG. 39 to FIG. 41 are explanatory views each showing specification of retrieval condition and output conditions in retrieval using a key word in the menu mode.

In the menu mode, at first when a selection marking command is given with the marking pen 903 to a desired word, a selection menu is displayed around a word with the selection marking command given thereto.

In this selection menu, the following 4 selection items are displayed: an output condition selection item (Default: related item) for specifying which of related information and a bibliographic item for related information is to be outputted as information corresponding to the selected word; two retrieval range selection items (Default in one selection item: DB1, that in another one: Category A) for selecting a range of retrieval; and an output destination selection item (Default: display unit 911) for selecting an output device as a destination for output of information corresponding to the selected word. It is assumed herein that an object for the DB1 and that for category A are previously defined. Herein, DB1 indicates a type of data base as an object for retrieval, and category A indicates a type of category as an object for retrieval in the DB1.

As shown in FIG. 39, when a selection item to be changed in selection items in the selection menu is touched with the marking pen 903, a pop-up menu is displayed. Herein a pop-up menu of output destination selection items (Default: display unit 911) is displayed, and when an item to be specified is touched with the marking pen 903 in this state, the touched item is selected.

As shown in FIG. 40, after all desired items are selected, when the execution button 930 is touched with the marking pen 903, retrieval using a key word is executed according to the selected words (herein, "link", and, AND retrieval for "DB text" and "Search engine") as well as to the selected item in the selection menu shown around the words.

When related information data (a bibliographic item for related information) is selected in the output condition selection item in the selection menu, if the display unit 911 is specified as a destination for output of related information data, processing different from that in other output destination (such as a printer) can be executed.

More specifically, a bibliographic item selection menu for selecting output of desired related information from a plurality of corresponding related information data (a bibliographic item for related information) can be displayed around the key word with the selection marking command given thereto. This processing is executed before the execution button 930 is touched with the marking pen 903, and related information data (titles, abstracts, etc) are displayed in the form of pop-up menu.

The related information data is useful, when, for instance, a memory space required for related information is vast, in checking whether the data is truly desired information. Also there are a plurality of related information which can be retrieved according to one key word, so that the related information data is useful in selection to desired related information.

6) General Operations

Figure 42:
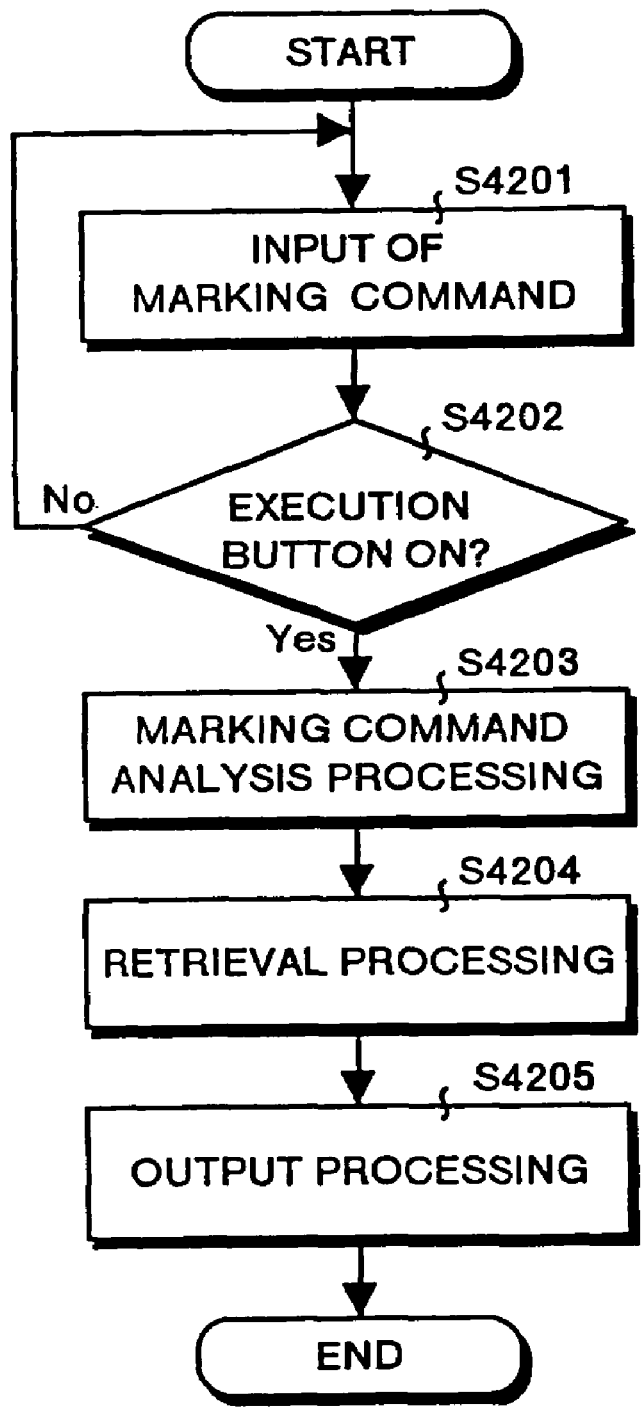
FIG. 42 is a flow chart showing schematic operations of Embodiment 9.

Next description is made for general operations with reference to the general flow chart in FIG. 42. At first, specification is made as to whether a marking command is given in the direct mode or in the menu mode to a hypertext document or a non-hypertext document displayed on the display unit (display unit 902) 911, and then a marking command is given in a corresponding mode (S4201).

Then determination is made as to whether the execution button 930 has been turned ON or not (S4202), and if it is determined that the execution button 930 has been turned ON, system control shifts to step S4203, and if it is determined that the execution button 930 has not been turned ON, system control returns to step S4201, and input of a marking command is repeated.

In step S4203, the personal computer 912 (marking command analyzing unit 905, first retrieving unit 906, and second retrieving unit 907) executes marking command analyzing processing, identifies the selected button or key word according to the marking command given thereto, identifies retrieval conditions and output conditions, and executes corresponding retrieval processing (retrieval using a linking function or retrieval using a key word) (S4203, S4204). It should be noted that analysis of a marking command is substantially the same as the processing described in Embodiments 4 to 8 and description thereof is omitted herein.

Then, output processing is executed, corresponding related information or a bibliographic item for the related information is transferred to an output device specified as an output destination for each selected button or key word, and the information is outputted by the output device (S4205).

As described above, with Embodiment 9, a document information management system enabling batch processing by specifying a plurality of buttons can be provided as a method of using a hypertext. Also the computer can be operated like handling paper and a pencil in the actual world, so that the operability and convenience can further be enhanced.

Also related information or a bibliographic item for the related information can be taken out from both of a hypertext document and a non-hypertext document, which insures high operability and convenience.

Also retrieval conditions and output conditions can be specified by using a display unit or a marking pen unit, so that more complicated retrieval conditions and output conditions can be specified. Also various types of operating environment such as a pop-up menu can be provided by using a marking pen. When a marking command is directly given (written) with a marking pen on a display screen, an operating manner on paper (a medium form) and that on a display unit are integrated, which insures more improved workability, operability, and convenience.

It should be noted that it is possible to provide a document information management system in which the document information management system according to Embodiment 9 and document information management systems according to Embodiments 1 to 8 are integrated, and it is needless to say that a boarder range of services can be provided with the configuration as described above.

Figure 43:
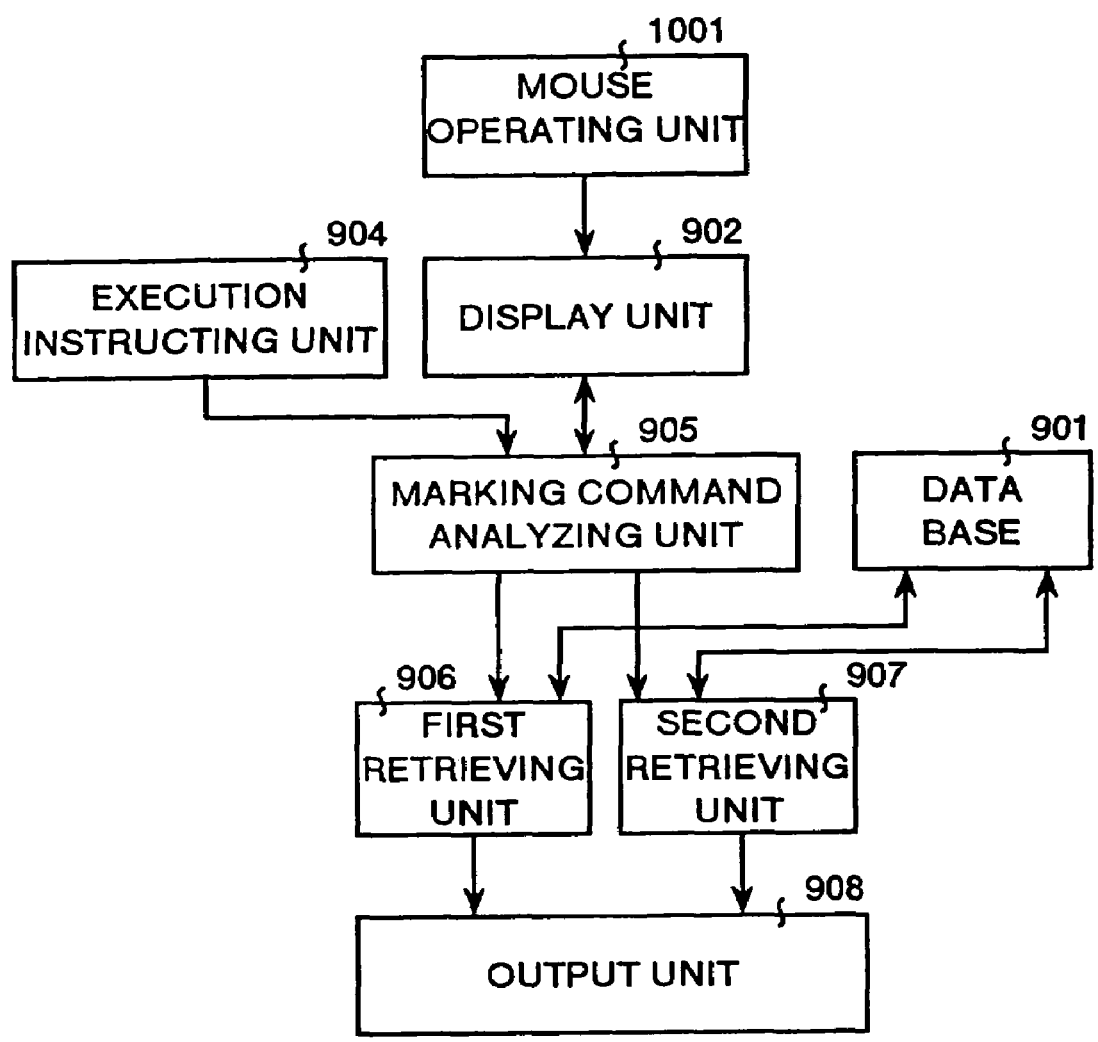
FIG. 43 is a view showing a document information management system according to Embodiment 10.

FIG. 43 is a view showing a document information management system according to Embodiment 10 (document information management system according to claim 25). As shown in the figure, the document information management system according to Embodiment 10 has the same configuration as that according to Embodiment 9 excluding the point that there is provided in place of the marking pen unit 903 a mouse operating unit 1001 having a mouse for giving at least one marking command consisting of a prespecified pattern to a button in the hypertext document, a word other than the button in the hypertext document, or a word in a non-hypertext document. Other portions of the configuration are the same as those in Embodiment 9, so that description thereof is omitted herein.

Figure 44:
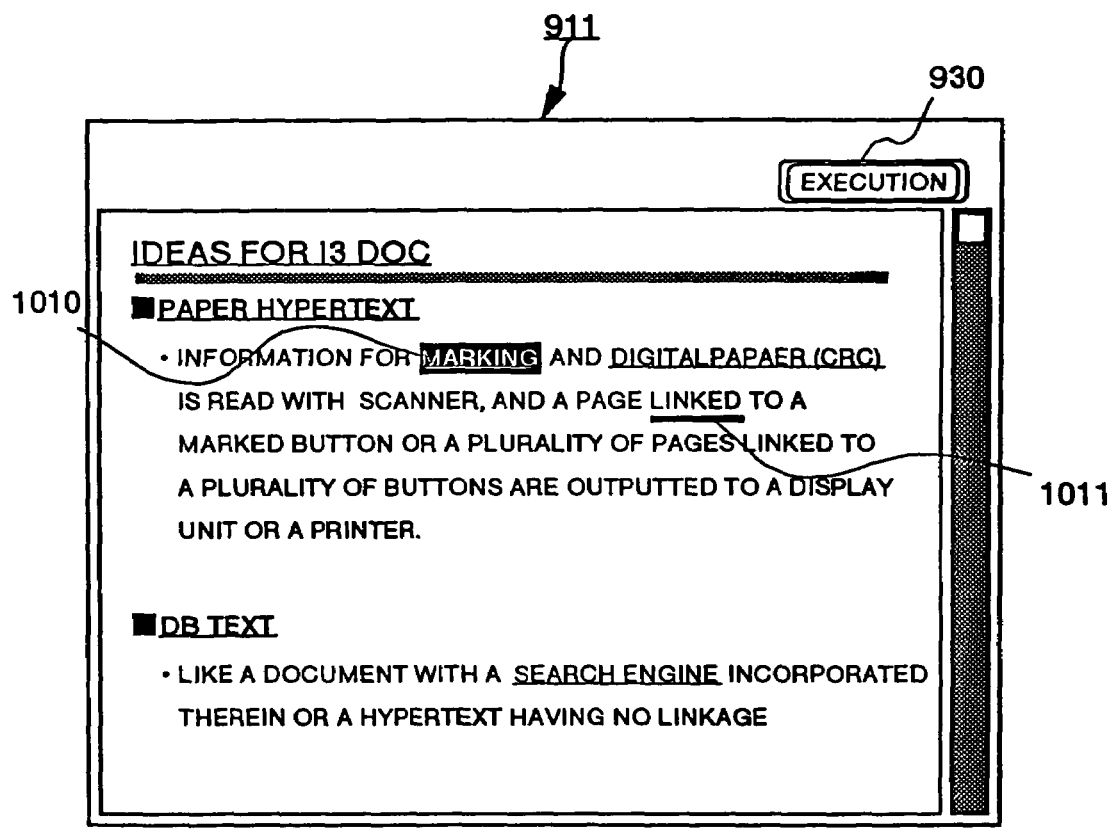
FIG. 44 is an explanatory view showing an example of a display screen of a display device (display unit) according to Embodiment 10.

FIG. 44 shows an example of a display screen of the display unit 911 (display unit 902) according to Embodiment 10. Also in a case where a mouse is used, the marking command like that in Embodiment 9 is realized not by opening a dialog from a menu screen for operations, but by executing operations on a text displayed on a display screen.

In the hypertext document displayed on a display screen, a button is generally displayed with a blue color or with an underline (herein an underline is used).

Whether a cursor was clicked on a button or on other portion in mouse operation with the mouse operating unit 1001 is determined, and retrieval using a button (a linking function) is executed in the former case, and retrieval using a key word in the latter case.

In a hypertext document, it is easy to recognize a button (namely, already known), so that, if a mouse is clicked when the cursor is on a button, the corresponding button is displayed in the reversed mode (Refer to 1010 in the figure).

On the other hand, if the mouse is clicked when the cursor is on other portion, it is necessary to recognize a word at a corresponding position. Namely, it is necessary to recognize a section constituting a word, and in this case the following two methods can be applied. One is a way of marking, and another way is to use the word recognizing technology.

As a way of marking, for instance, after the cursor is set on a first character of a word to be specified, the mouse button is clicked, and then after the cursor is set on a final character of the word, the mouse button is again clicked. With this operation, a length of the word can be specified, and also extraction of the word is enabled. In this case, the corresponding word is underlined (Refer to 1010 in the figure). Also a length of a word can be specified by setting the cursor, for instance, on a first character of a word to be specified and turning OFF the mouse button.

As a way of using the word recognizing technology, there are ways of identifying the best suited word from characters is specified by the cursor as well as other characters around the specified characters and by means of making use of such a technique as, for instance, morphology element analysis, and a way in which a word is extracted from a prepared text with a technology such as morphology element analysis, an index file for retrieval (word table) is prepared, a text file is added thereto, and an optimal word is identified according to a character indicated by the cursor as well as to other character around the character indicated by the cursor with reference to the word table. The latter method has the advantage that the word table can be used for full text retrieval.

Figure 45:
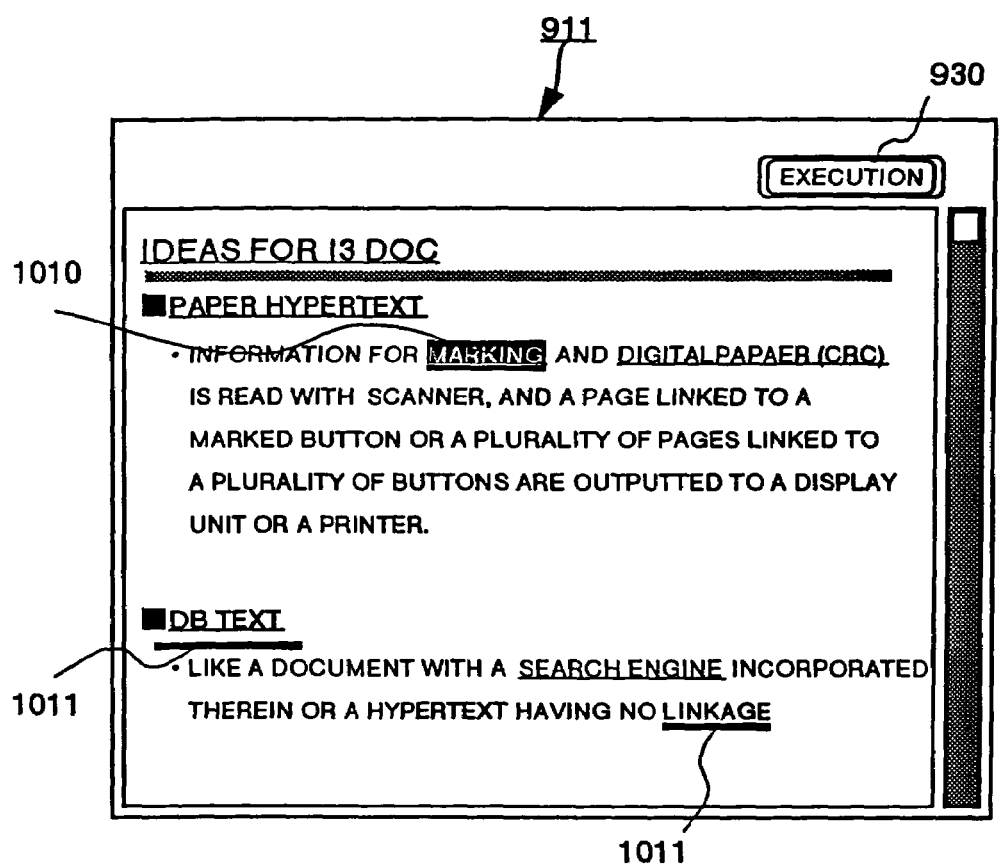
FIG. 45 is an explanatory view showing an operation of specifying a button on a hypertext document as a word (keyword) in Embodiment 10.

FIG. 45 is an explanatory view showing an operation for specifying a button in a hypertext document as a word (a key word). In Embodiment 10, it is possible to specify a button in a hypertext document as a word by means of mouse operation with the mouse operating unit 1001. More specifically, specification is made by clicking a mouse in a different way. For instance, when specifying a button as a button, the mouse is simply clicked, but when specifying a button as a word, the operation is executed, for instance, in the order of pressing Shift key and clicking, long clicking, or then double clicking or second clicking.

When the button "DB text" in a hypertext is specified as a word, an underline 1011 indicating specification of a word is displayed as shown in the figure.

Figure 46A:
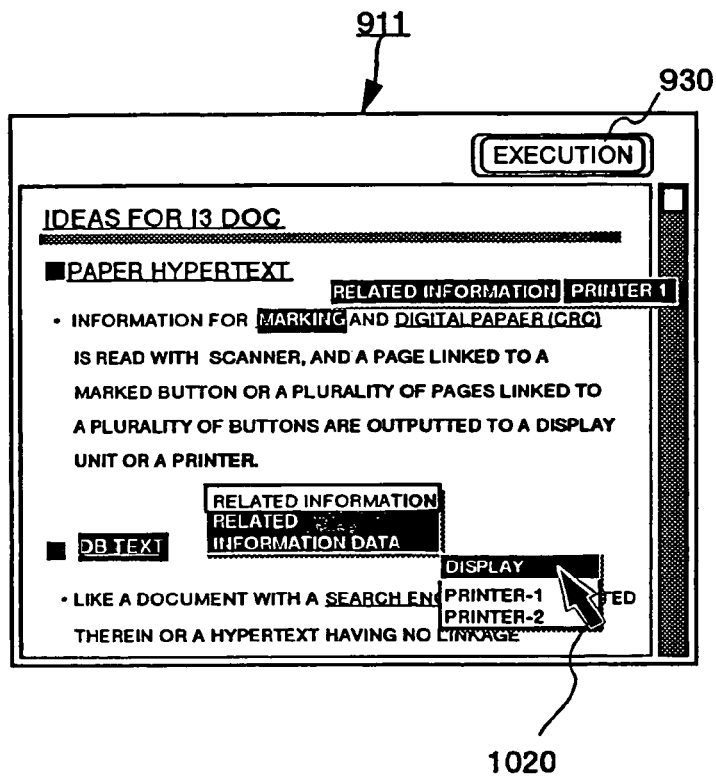
FIG. 46A and FIG. 46B are explanatory views each showing specification of retrieval conditions and output conditions for retrieval using a button (linking function) in Embodiment 10.
Figure 46B:
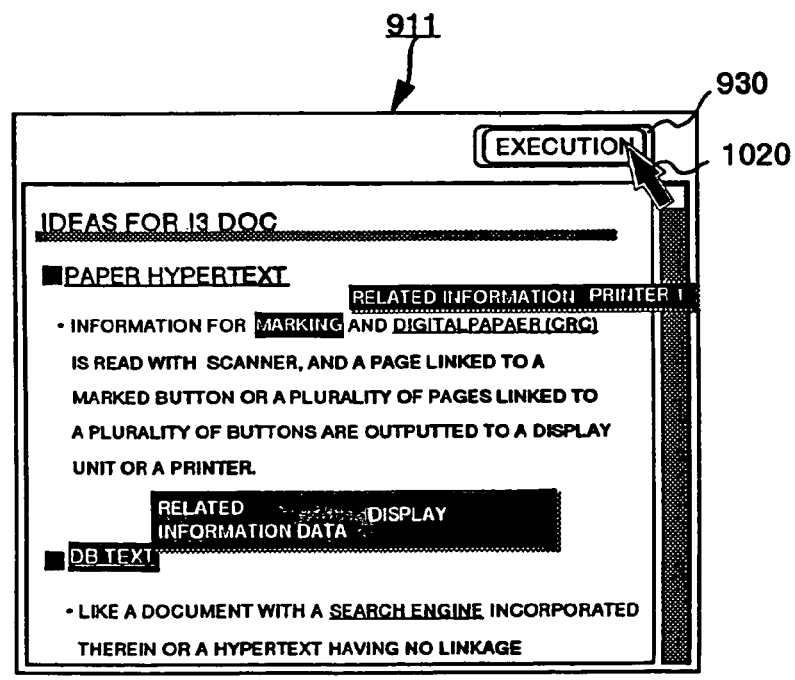
Figure 47:
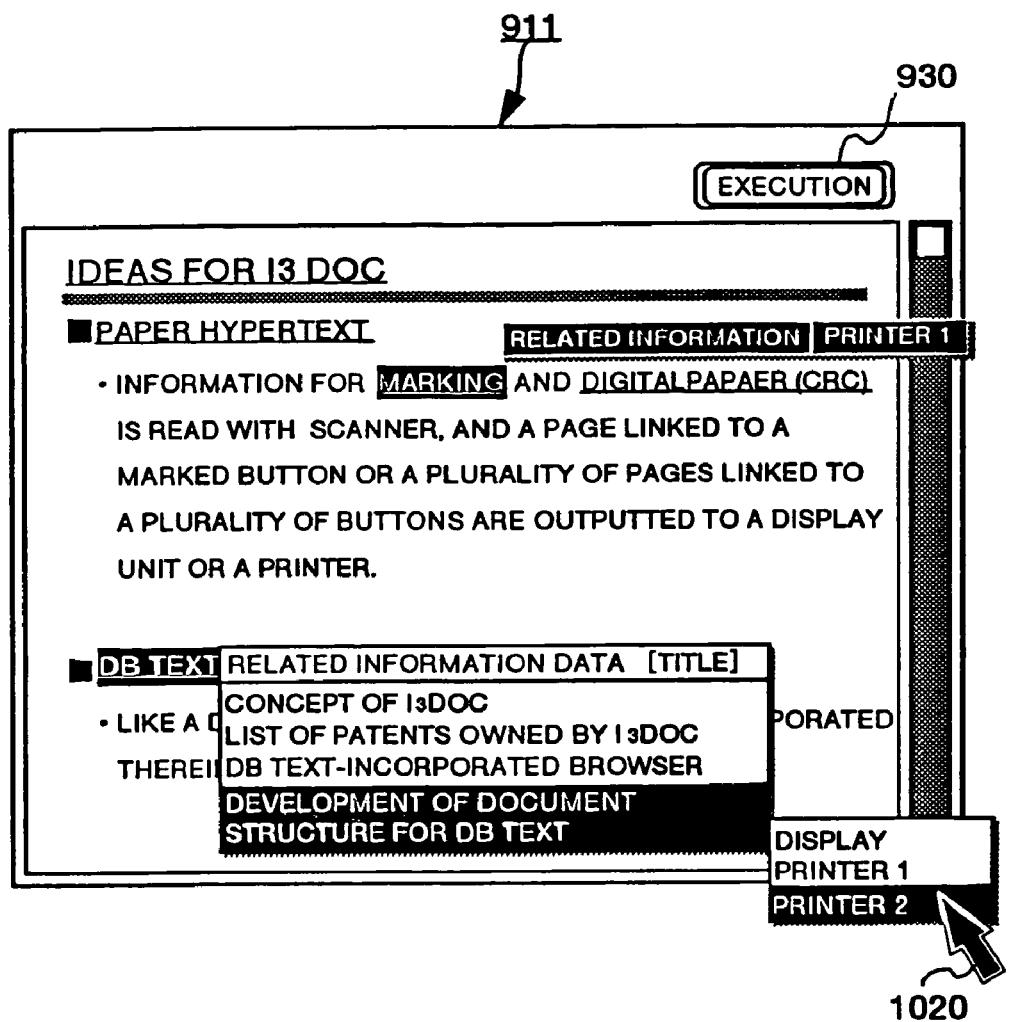
FIG. 47 is an explanatory view showing specification of retrieval conditions and output conditions for retrieval using a button (linking function) in Embodiment 10.

FIG. 46A, FIG. 46B and FIG. 47 are explanatory views each showing specification of retrieval conditions and output conditions using a button (a linking function) in mouse operation. When the cursor is set on a desired button and the mouse button is clicked, a pop-up menu is displayed, and at the same time the button is displayed in the reversed mode (display with a marking command given thereto). Further an item to be specified in the pop-up menu is specified by clicking. Or, when the cursor is set on a desired button and the mouse button is turned ON, a pop-up menu is displayed, and at the same time the button is displayed in the reversed mode (display with a marking command given thereto). Then the cursor 1020 is moved to an item to be specified and then the cursor 1020 is released, when the word is specified.

For modifying specification, when the cursor 1020 is set on a specified menu and then the mouse button is clicked, the pop-up menu is displayed again, thus specification being modified.

When all specifications (selection of a button and selection of a selection item) are made, the cursor 102 is set on the execution button 930 and then clicked, when batch processing for the button is executed.

By the way, if the display unit 911 has been specified as a destination for output of related information data, processing different from that in other output destination (such as a printer) can be executed. More specifically, as shown in FIG. 47, a bibliographic item selection menu for selecting output of desired related information from a plurality of corresponding related information data (a bibliographic item for related information) can be displayed. This processing is executed before the execution button 930 is clicked with a mouse, and related information data (titles, abstracts, etc) is displayed in the pop-up menu.

The related information data is useful for checking whether related information is truly desired one when a memory space required for the related information is vast. Also as there are a plurality of related information retrievable through one key word, the related information data is useful in selection of desired related information.

When the cursor 1020 is set on desired related information data (titles, abstracts, etc) on a pop-up menu and the mouse button is clicked, a pop-up menu for the output destination is displayed, and the desired related information can be outputted at a desired output destination (output device) by setting the cursor 1020 in an item at the output destination and clicking the mouse button.

FIG. 48 to FIG. 52 are views each showing specification of retrieval conditions and output conditions in retrieval using a key word by means of mouse operation. The operation herein are basically the same as those in specification of retrieval conditions and output conditions in retrieval using a key word in the menu mode shown in FIG. 39 to FIG. 41 in Embodiment 9, so that description is made herein only for different portions.

Figure 48:
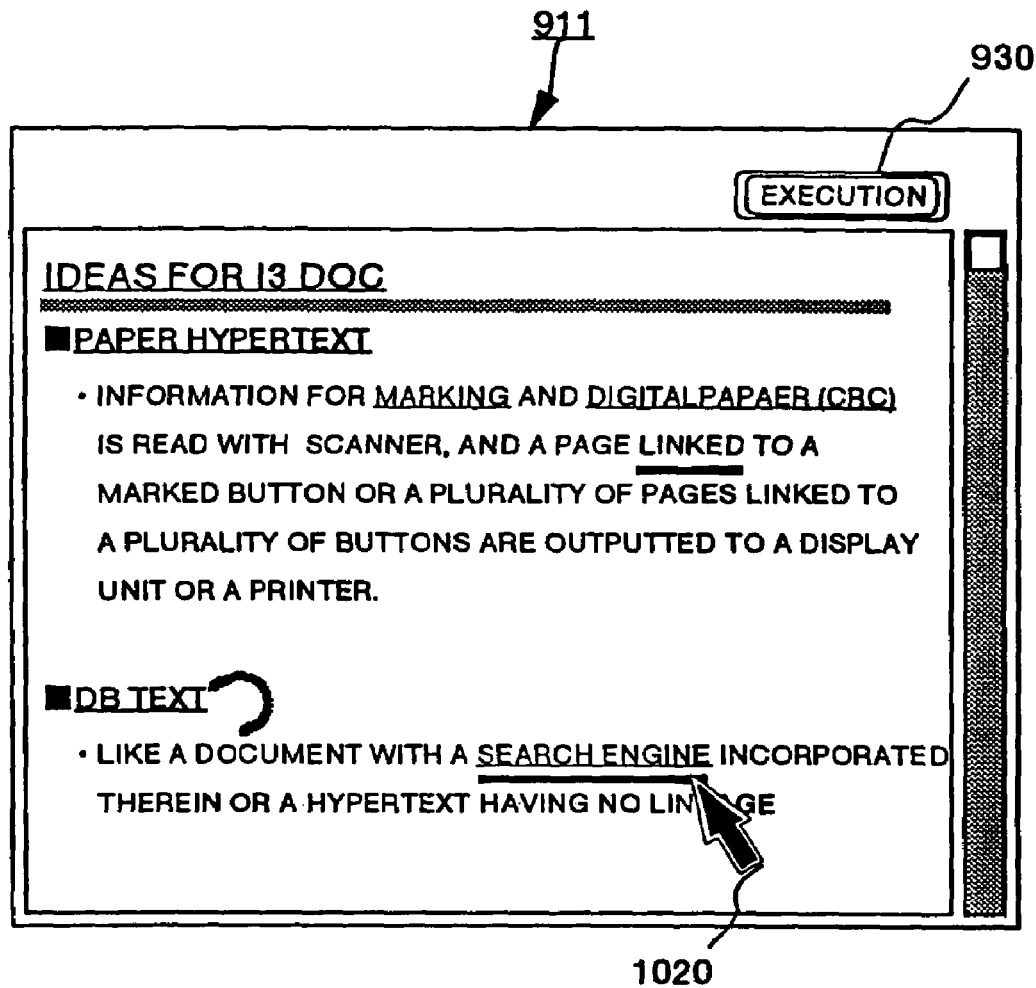
FIG. 48 is an explanatory view showing specification of retrieval conditions and output conditions for retrieval using a key word through a mouse operation.
Figure 49:
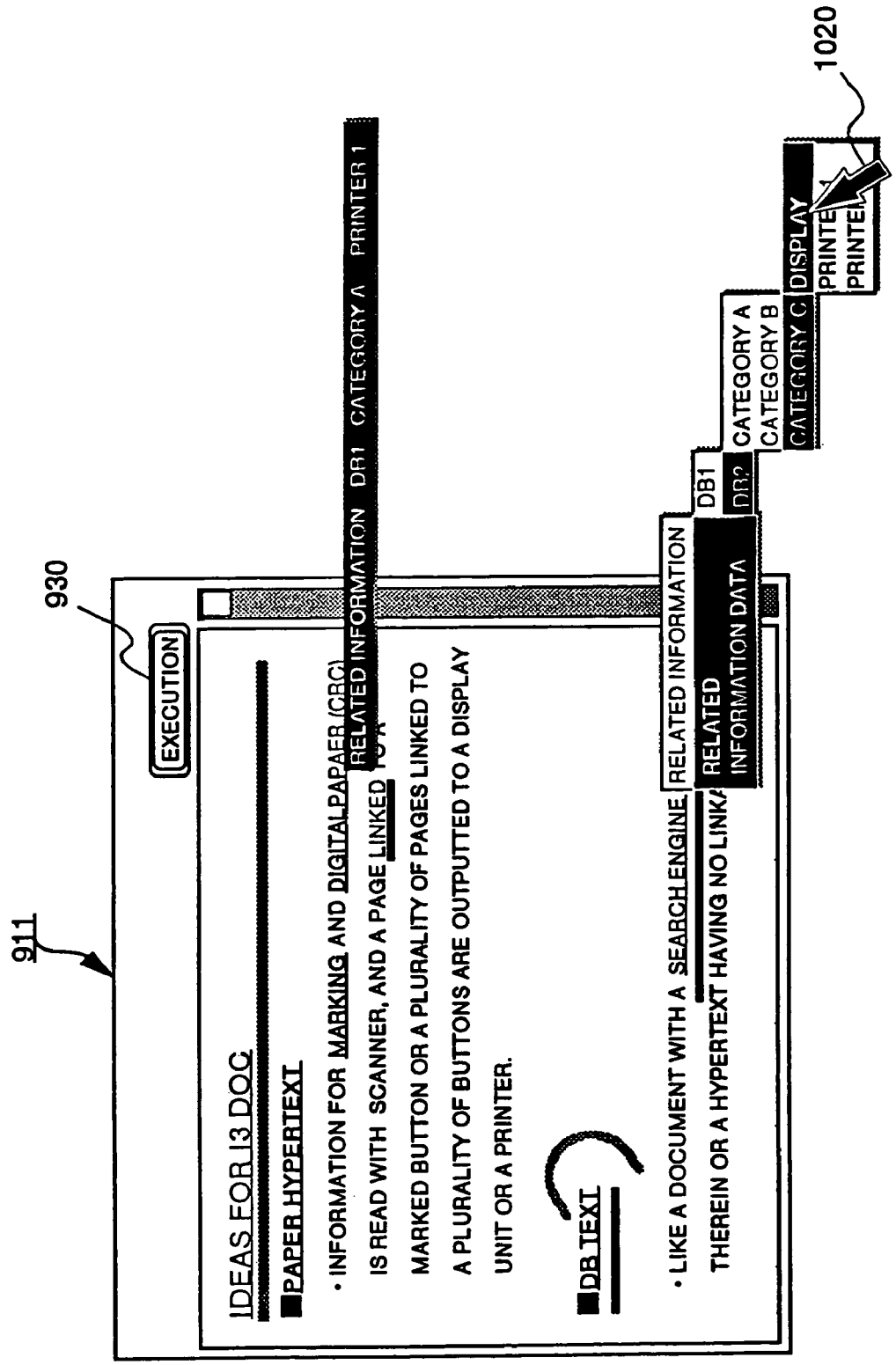
FIG. 49 is an explanatory view showing specification of retrieval conditions and output conditions for retrieval using a key word through a mouse operation.
Figure 50:
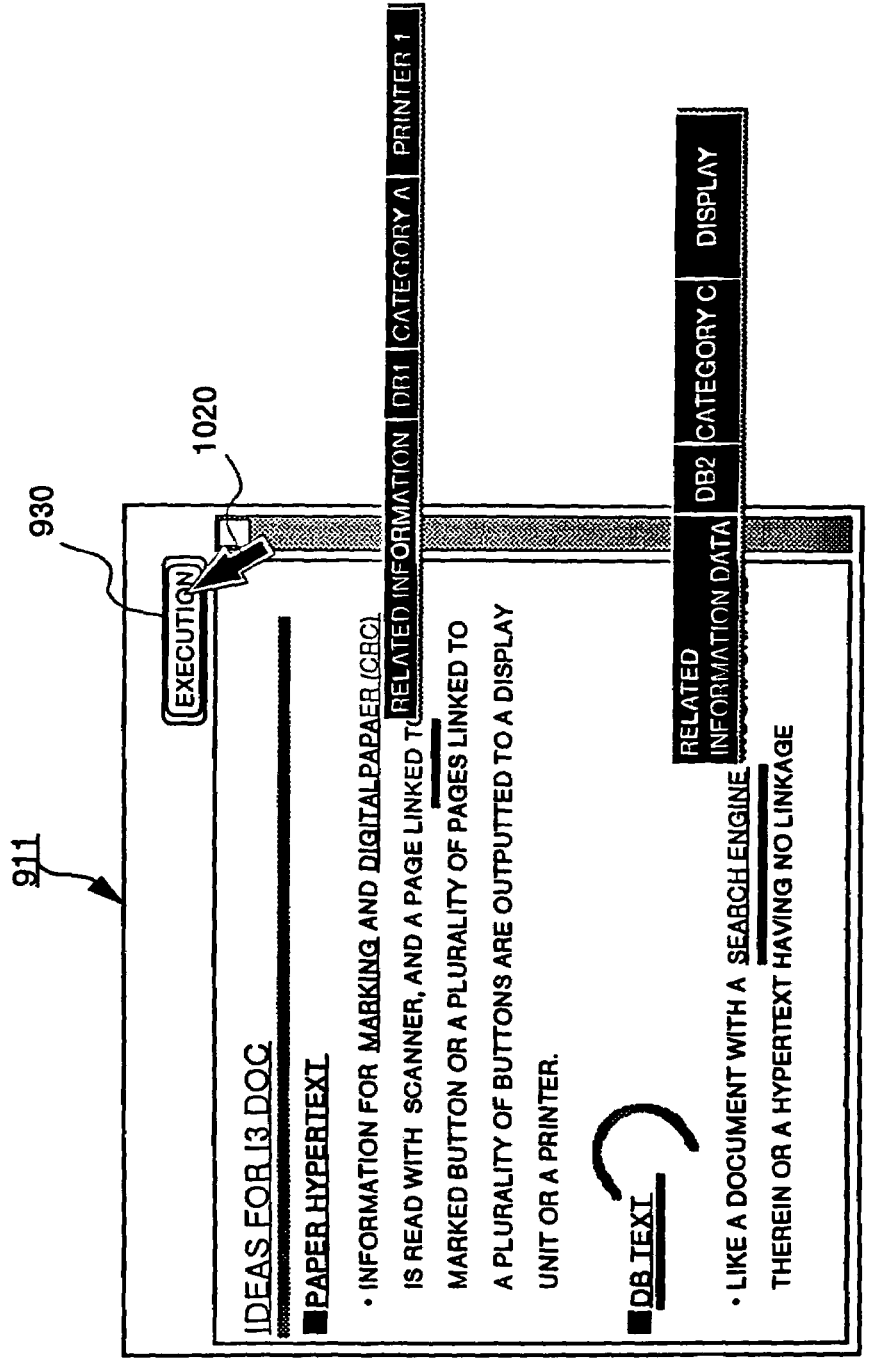
FIG. 50 is an explanatory view showing specification of retrieval conditions and output conditions for retrieval using a key word through a mouse operation.
Figure 51:
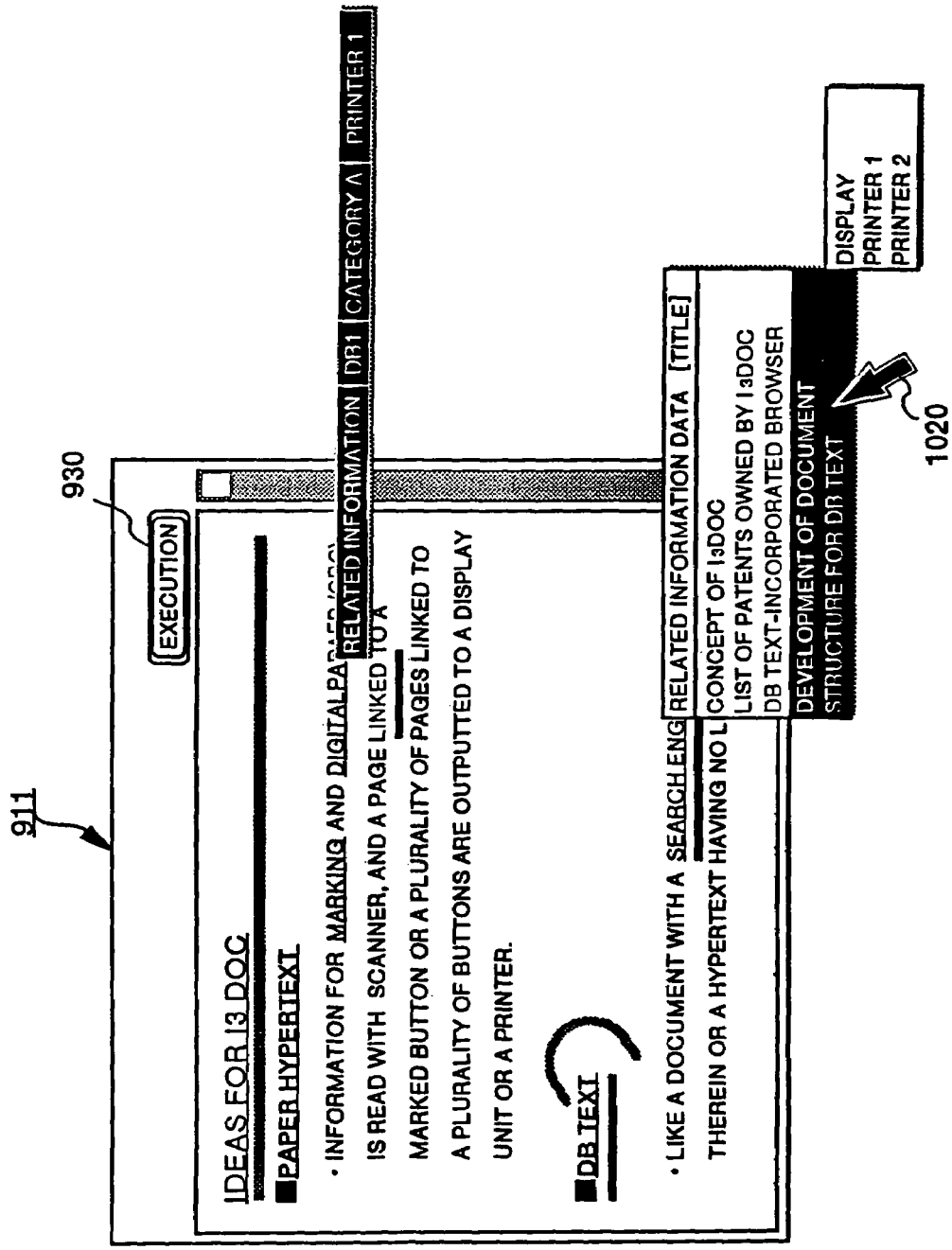
FIG. 51 is an explanatory view showing specification of retrieval conditions and output conditions for retrieval using a key word through a mouse operation.
Figure 52:
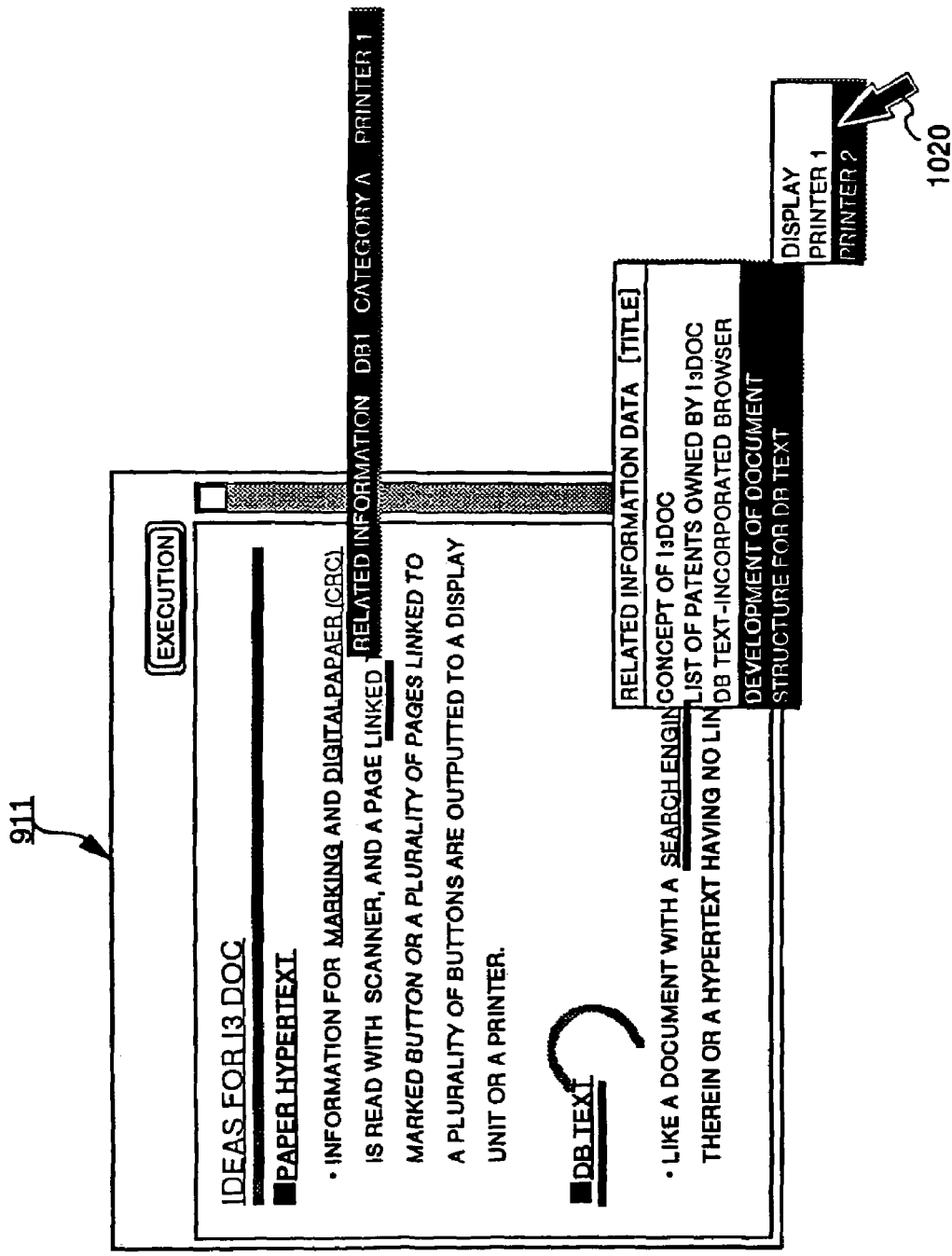
FIG. 52 is an explanatory view showing specification of retrieval conditions and output conditions for retrieval using a key word through a mouse operation.

As shown in FIG. 48, when AND retrieval is to be executed, by superimposing the selected words (a button with the second selection marking command given thereto, a word other than a word in a hypertext document, or a word in a non-hypertext document) to each other by operating a mouse (drug and drop operation), an AND retrieval marking command can be given. Other operations can be executed with a mouse by operating the cursor 1020 like operations by using the marking pen 903 in Embodiment 9.

With Embodiment 1 as described above, the same effects as those in Embodiment 9 can be achieved. It is clear that it is possible to provide a document information management system in which the document information management system according to Embodiment 10 and document information management systems according to Embodiment 1 to Embodiment 8 are integrated, and it is needless to say that a broader range of services can be provided with the configuration as described above.

Embodiment 11 is a simplified version of the document information management system according to Embodiment 10, and there are provided a data base 901, a display unit 902, a mouse (only the mouse in the mouse operating unit 1001) for selecting a desired word or words from words in a displayed hypertext document or a non-hypertext document and also for selecting an item from the selection menu, a retrieving unit (one of functions of the second retrieving unit 907) for retrieving related information from the data base 901 using the word selected with a mouse as a key word, and an output unit 908 for outputting related information.

Figure 53:
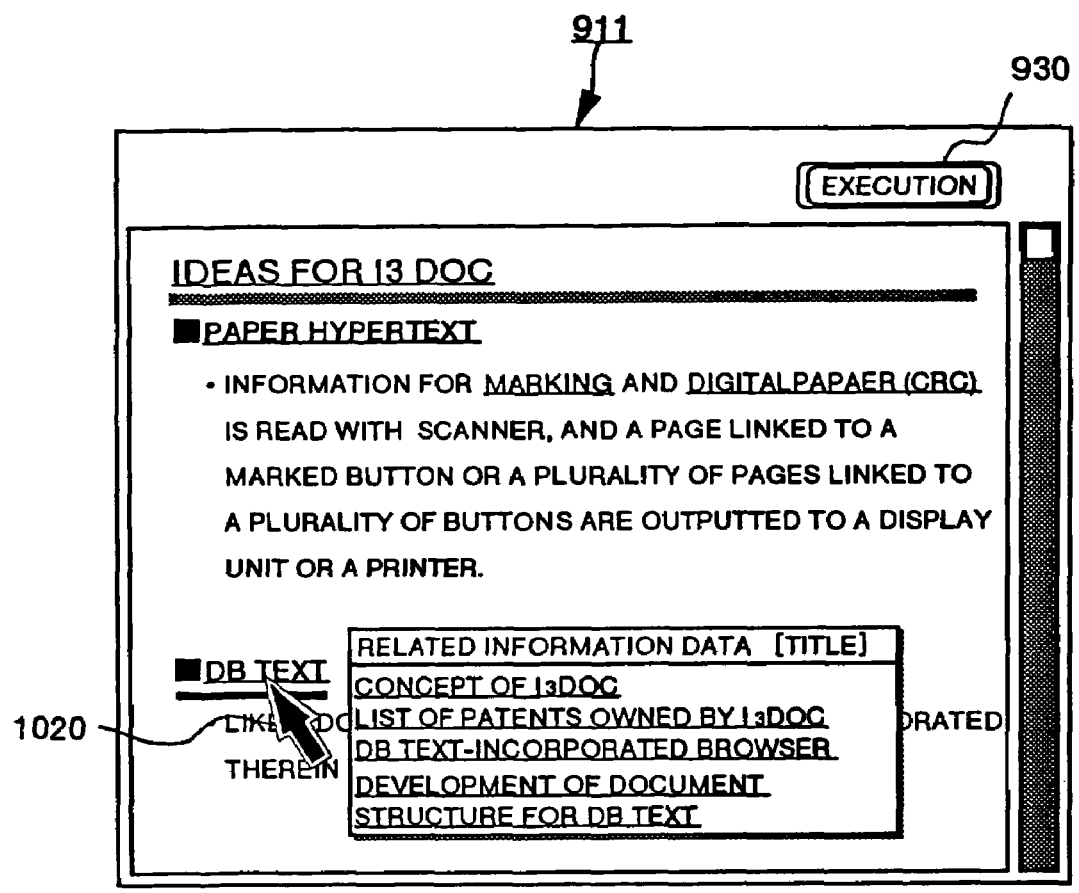
FIG. 53 is an explanatory view showing operations of Embodiment 11.

With the configuration as described above, as shown in FIG. 53, when a word is selected by operating a mouse, the retrieving unit retrieves related information using the selected word as a key word, and the display unit 911 displays a plurality of corresponding related information data (title) according to a result of retrieval by the retrieving unit in the form of pop-up menu (selection menu) around the word selected with the mouse.

Figure 54:
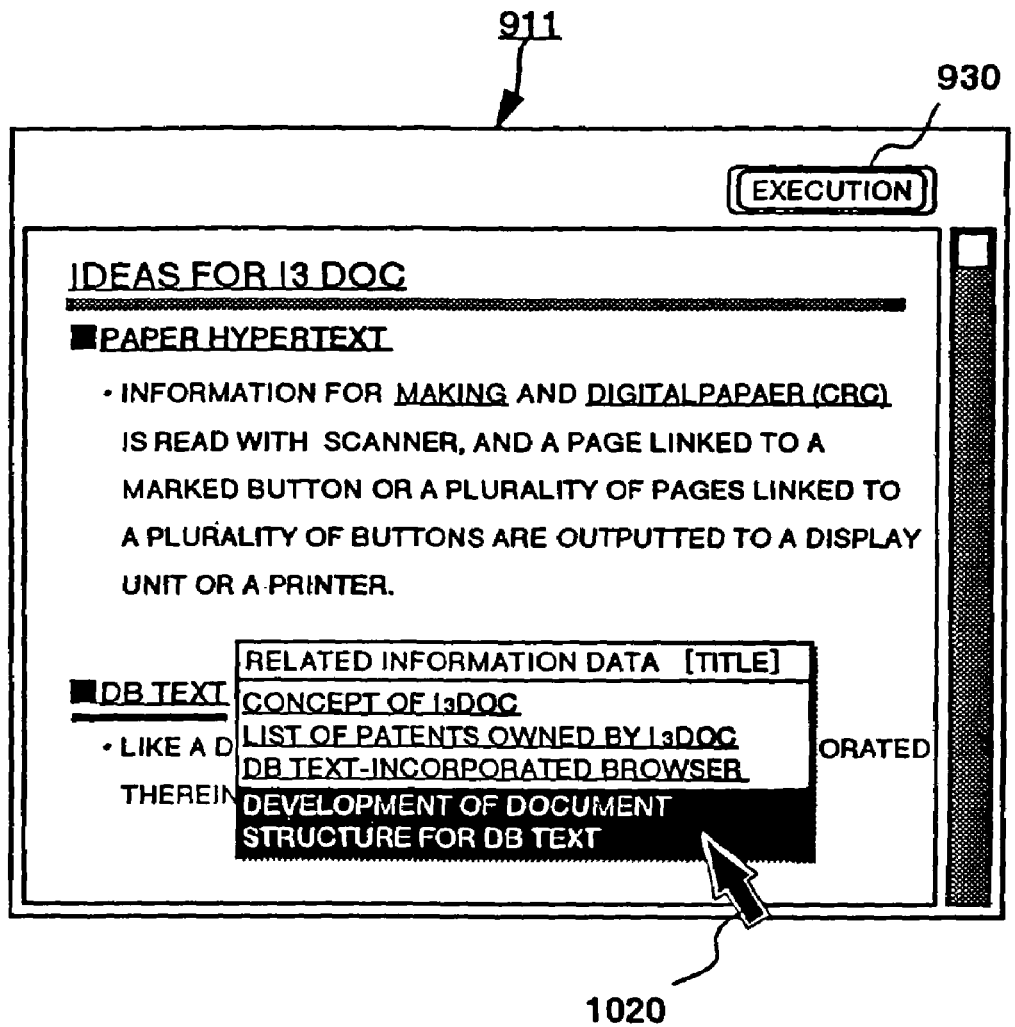
FIG. 54 is an explanatory view showing operations of Embodiment 11.

As shown in FIG. 54, when a desired title is selected with a mouse from this pop-up menu, the output unit 908 outputs corresponding related information.

As clearly understood from the above description, this configuration can simply be applied in use of an existing type of hypertext document described with a conventional type of browser, a search engine, and HTML used in Internet. A search engine interface function is added to the browser with plug-in software. Also a word table is added as an index file to a hypertext document by specifying key words.

With Embodiment 11 described above, a hypertext document can be used as a non-hypertext document with simple configuration. In other words, retrieval using a key word can easily be execute by using a hypertext document and a non-hypertext document.

This application is based on Japanese patent applications No. HEI 9-215869 and No. HEI 10-052522 filed in the Japanese Patent Office on Jul. 25, 1997 and Mar. 4, 1998, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information processing apparatus which receives a search key for inputting an unspecified number of documents on the Internet into a specific search engine which targets the documents for a search, the information processing apparatus comprising:

a storage unit that stores a plurality of pieces of specific information in which information concerning the documents is stored;

a selecting unit that selects any word in the documents as a desired word, wherein information in the desired word is the search key;

an area receiving unit that receives a selecting of the desired word in the documents;

a displaying unit that displays a list of databases relating to the plurality of pieces of specific information stored in the storage unit upon receiving the desired word selection;

a database election receiving unit that receives an election of a desired database from the list of databases displayed; and a searching unit that makes the specific search engine search using the search key by sending the information concerning the desired word received by the area receiving unit as the search key to the search engine for outputting a search result.

2. The apparatus according to claim 1, wherein the plurality of pieces of specific information stored in the storage unit is specified in accordance with a category of the databases.

3. The apparatus according to claim 2, further comprising:
a category displaying unit that displays a list of the category of the desired database from the specific information stored in the storage unit when the database election receiving unit receives the election of the desired database; and a category election receiving unit that receives an election of a desired category from the list of the category of the desired database displayed by the category displaying unit, wherein the searching unit makes the search engine search by sending the search key to the search engine relating to the category which has received the election for outputting a search result.

4. The apparatus according to claim 3, further comprising:
a search result displaying unit that displays search results obtained by the searching unit in proximity to the selected desired word.

5. The apparatus according to claim 4, wherein the search result displaying unit displays the search results as a pop-up screen.

6. The apparatus according to claim 5, wherein the displaying unit displays the list of databases displayed in the proximity to the selected desired word.

7. The apparatus according to claim 1, wherein the information in the desired word includes a word circled by a user.

8. The apparatus according to claim 1, further comprising:
a linking unit that links the search by the specific search engine to the desired word.

9. A computer readable medium, wherein the computer readable medium stores a computer readable program that when executed causes a computer to execute a processing of receiving a search key for inputting an unspecified number of documents on the Internet into a specific search engine which targets the documents for a search, the computer includes a storage unit which stores a plurality of pieces of specific information, wherein the storage unit specifies each of a plurality of databases in which information concerning the documents is stored, the computer readable medium causes the computer to execute:

a selecting unit that selects any word in the documents as a desired word, wherein information in the desired word is the search key;

an area receiving step that receives a selecting of the desired word in the documents;

a displaying step that displays a list of databases relating to the plurality of pieces of specific information stored in the storage unit upon receiving the desired word selection;

a database election receiving step that receives an election of a desired database from the list of databases displayed; and a searching step that makes the specific search engine search using the search key by sending the information concerning the desired word received by the area receiving step as the search key to the search engine for outputting a search result.

10. The computer readable medium according to claim 9, wherein the plurality of pieces of specific information stored in the storage unit is specified in accordance with a category of the databases, the computer readable medium causes the computer to execute:

a category displaying step that displays a list of the category of the desired database from the specific information stored in the storage unit when the database election receiving step receives the election of the desired database by the database election receiving step; and a category election receiving step that receives an election of a desired category from the list of the category of the desired database displayed by the category displaying step, wherein the searching step makes the search engine search by sending the search key to the search engine relating to the category which has received the election for outputting a search result.

11. The computer readable medium according to claim 10, wherein the computer readable medium causes the computer to further execute:

a search result displaying step that displays search results obtained by the searching step in proximity to the selected desired word.

12. The computer readable medium according to claim 11, wherein the search result displaying step displays the search results as a pop-up screen.

13. The computer readable medium according to claim 12, wherein the displaying step displays the list of databases displayed in the proximity to the selected desired word.

14. The computer readable medium according to claim 9, wherein the selecting step includes circling a word as the information in the desired word.

15. The computer readable medium according to claim 9, further comprising:

a linking step that links the search by the specific search engine to the desired word.

* * * * *